(12) United States Patent
Kim et al.

(10) Patent No.: US 10,969,129 B2
(45) Date of Patent: Apr. 6, 2021

(54) APPARATUS AND METHOD FOR CONTROLLING AIR CONDITIONER IN AIR CONDITIONING SYSTEM

(71) Applicant: Samsung Electronics Co., Ltd., Gyeonggi-do (KR)

(72) Inventors: Kyung-Jae Kim, Gyeonggi-do (KR); Kwan-Woo Song, Gyeonggi-do (KR); Byeong-Chan Lee, Seoul (KR); Woon-Sik Lee, Seoul (KR); Je-Hyeon Lee, Gyeonggi-do (KR); Hye-Jung Cho, Gyeonggi-do (KR); Soon-Heum Ko, Gyeonggi-do (KR); Sung-Geun Song, Incheon (KR); Jae-Hong Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 417 days.

(21) Appl. No.: 15/993,010

(22) Filed: May 30, 2018

(65) Prior Publication Data
US 2019/0212026 A1    Jul. 11, 2019

(30) Foreign Application Priority Data

Jan. 10, 2018    (KR) .................. 10-2018-0003597

(51) Int. Cl.
*F24F 11/46* (2018.01)
*F24F 11/54* (2018.01)
(Continued)

(52) U.S. Cl.
CPC ............... *F24F 11/46* (2018.01); *F24F 1/32* (2013.01); *F24F 11/54* (2018.01); *F24F 11/56* (2018.01);
(Continued)

(58) Field of Classification Search
CPC .. G05B 19/19; G05B 19/401; G05B 19/4093; G05B 2219/37576; G05B 2219/50057;
(Continued)

(56) References Cited

U.S. PATENT DOCUMENTS 5,103,896 A    4/1992  Saga
6,044,652 A    4/2000  Nishihara et al.
(Continued)

FOREIGN PATENT DOCUMENTS

CN    1216096    5/1999
CN    1967074    5/2007
(Continued)

OTHER PUBLICATIONS

Hengyang Zhao, et al., "Learning Based Compact Thermal Modeling for Energy-Efficient Smart Building Management", IEEE, 2015.
(Continued)

*Primary Examiner* — Robert E Fennema
*Assistant Examiner* — Christopher W Carter
(74) *Attorney, Agent, or Firm* — The Farrell Law Firm, P.C.

(57) ABSTRACT

The disclosure relates to a sensor network, machine type communication (MTC), machine-to-machine (M2M) communication, and technology for internet of things (IoT). A method of a server is provided. The method includes determining a target temperature range to be applied to a first zone; predicting an indoor temperature for each of a plurality of zones included in a second zone in which the first zone is included; predicting efficiency of at least one first outdoor unit connected to first indoor units installed at the second zone; and controlling operations of the first indoor units based on the target temperature range, the indoor tempera-
(Continued)

INDOOR UNIT A 22 DEGREES, STRONG AIR VOLUME, COOLING →
X LOCATION, 25 DEGREES → 24.1 DEGREES
(CHANGE: LOCATION X, ΔTEMPERATURE = -0.9, WEIGHT: -0.9/-3 = 30%)

INDOOR UNIT B 24 DEGREES, STRONG AIR VOLUME, COOLING →
X LOCATION, 25 DEGREES → 24.6 DEGREES
(CHANGE: LOCATION X, ΔTEMPERATURE = -0.4, WEIGHT: -0.4/-1.0 = 40%)

INDOOR UNIT C 21 DEGREES, STRONG AIR VOLUME, COOLING →
X LOCATION, 25 DEGREES → 22.4 DEGREES
(CHANGE: LOCATION X, ΔTEMPERATURE = -2.6, WEIGHT: -2.6/-4 = 65%)

ture for each of the plurality of zones, and the efficiency of at least one first outdoor unit.

20 Claims, 35 Drawing Sheets

(51) Int. Cl.
*F24F 11/56* (2018.01)
*F24F 11/65* (2018.01)
*F24F 1/32* (2011.01)
*G05B 13/04* (2006.01)
*F24F 11/80* (2018.01)
*F24F 11/61* (2018.01)
*F24F 11/62* (2018.01)
*G06F 1/20* (2006.01)
*F24F 140/60* (2018.01)
*F24F 110/10* (2018.01)
*F24F 120/12* (2018.01)
*F24F 120/20* (2018.01)
*F24F 140/50* (2018.01)
*F24F 110/12* (2018.01)
*F24F 110/20* (2018.01)

(52) U.S. Cl.
CPC ............. *F24F 11/61* (2018.01); *F24F 11/62* (2018.01); *F24F 11/65* (2018.01); *F24F 11/80* (2018.01); *G05B 13/048* (2013.01); *G06F 1/20* (2013.01); *F24F 2110/10* (2018.01); *F24F 2110/12* (2018.01); *F24F 2110/20* (2018.01); *F24F 2120/12* (2018.01); *F24F 2120/20* (2018.01); *F24F 2140/50* (2018.01); *F24F 2140/60* (2018.01)

(58) Field of Classification Search
CPC ........... G05B 2219/45157; G05B 2219/35151; G05B 2219/35261; G05B 13/048; F24F 11/46; F24F 11/62; F24F 11/80; F24F 11/65; F24F 11/56; F24F 11/54; F24F 11/61; F24F 1/32; F24F 2110/20; F24F 2120/20; F24F 2120/12; F24F 2140/60; F24F 2140/50; G06F 1/20

USPC .......................................... 700/44, 291, 277
See application file for complete search history.

(56) References Cited

U.S. PATENT DOCUMENTS

| | | | |
|---|---|---|---|
| 8,958,921 | B2 * | 2/2015 | Xu ..................... G05D 23/1917 700/276 |
| 2006/0243815 | A1 | 11/2006 | Lee et al. |
| 2012/0296480 | A1 | 11/2012 | Raman et al. |
| 2014/0031993 | A1 | 1/2014 | Matsuola |
| 2014/0365017 | A1 | 12/2014 | Hanna et al. |
| 2015/0045967 | A1 | 2/2015 | Mori et al. |
| 2015/0211758 | A1 | 7/2015 | Macek et al. |
| 2016/0209062 | A1 * | 7/2016 | Castillo ............... H04L 12/2836 |
| 2016/0231015 | A1 | 8/2016 | Kumamoto et al. |
| 2017/0030598 | A1 | 2/2017 | Burns et al. |
| 2018/0004171 | A1 | 1/2018 | Patel et al. |

FOREIGN PATENT DOCUMENTS

| | | |
|---|---|---|
| CN | 101910738 | 12/2010 |
| CN | 102901180 | 1/2013 |
| JP | 2015064120 | 4/2015 |
| KR | 20060112913 | 11/2006 |
| KR | 1020080040196 | 5/2008 |
| KR | 20170137356 | 12/2017 |
| WO | WO 2016/138107 | 9/2016 |

OTHER PUBLICATIONS

Enda Barrett, et al., "Autonomous HAVAC Control, A Reinforcement Learning Approach", Conference Paper, ReseachGate, Sep. 2015.
International Search Report dated Oct. 10, 2018 issued in counterpart application No. PCT/KR2018/005977, 3 pages.
Written Opinion dated Oct. 10, 2018 issued in counterpart application No. PCT/KR2018/005977, 10 pages.
European Search Report dated Jul. 28, 2020 issued in counterpart application No. 18899060.0-1008, 10 pages.
Chinese Office Action dated Dec. 28, 2020 issued in counterpart application No. 201880066216.4, 27 pages.

* cited by examiner

FIG.26B

APPARATUS AND METHOD FOR CONTROLLING AIR CONDITIONER IN AIR CONDITIONING SYSTEM

CROSS-REFERENCE TO RELATED APPLICATION(S)

This application is based on and claims priority under 35 U.S.C. § 119(a) to Korean Patent Application Serial No. 10-2018-0003597 filed on Jan. 10, 2018 in the Korean Intellectual Property Office, the entire disclosure of which is incorporated herein by reference.

BACKGROUND

1. Field

The disclosure relates to an apparatus and method for controlling an air conditioner in an air conditioning system.

2. Description of Related Art

The Internet is now evolving into the Internet of things (IoT) where distributed entities, such as things, exchange and process information without human intervention. The Internet of everything (IoE), which is a combination of the IoT technology and the big data processing technology through connection with a cloud server, has emerged.

As technology elements, such as sensing technology, wired/wireless communication and network infrastructure, service interface technology", and security technology, have been demanded for IoT implementation, a sensor network, machine-to-machine (M2M) communication, machine type communication (MTC), and so forth are being studied.

An IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Buildings such as hotels, and/or the like are equipped with an energy control system to effectively control energy. The energy control system must be implemented for satisfying various requirements such as system requirements, energy saving, and management cost reduction. Particularly, a large building with a plurality of zones may use a system air conditioner (SAC) for controlling air conditioners.

The SAC includes one or more outdoor units and one or more indoor units connected to each of the one or more outdoor units. The SAC is connected to a server and operates under the control of the server.

In the SAC, one or more indoor units may be installed at each of a plurality of zones. So, in a certain zone, it is difficult to predict a temperature change according to operation of one or more indoor units installed at zones adjacent to the certain zone among the plurality of zones as well as one or more indoor units installed at the certain zone.

Further, in the certain zone, a temperature is changed according to the operation of the one or more indoor units installed at the zones adjacent to the certain zone among the plurality of zones as well as the one or more indoor units installed at the certain zone, so it is difficult to calculate operation efficiency, e.g., cooling operation efficiency or heating operation efficiency of the one or more indoor units installed at the certain zone.

Operation efficiency of an indoor unit may be changed according to various parameters such as an environment at which the indoor unit is installed, a degree by which the indoor unit has aged, a state of the indoor unit, and/or the like as well as the operation of neighbor indoor units.

However, a current air conditioning system controls air conditioners by considering only a single zone and a single indoor unit, so a conventional scheme of controlling air conditioners does not control air conditioners by considering a plurality of zones and a plurality of indoor units.

SUMMARY

An aspect of the disclosure provides an apparatus and method for controlling an air conditioner in an air conditioning system.

Another aspect of the disclosure provides an apparatus and method for controlling an air conditioner by considering a target temperature range in an air conditioning system.

Another aspect of the disclosure provides an apparatus and method for controlling an air conditioner by considering outdoor unit-efficiency in an air conditioning system.

Another aspect of the disclosure provides an apparatus and method for controlling an air conditioner by considering one or more neighbor zones in an air conditioning system.

Another aspect of the disclosure provides an apparatus and method for controlling an air conditioner by considering a predicted temperature for one or more neighbor zones in an air conditioning system.

Another aspect of the disclosure provides an apparatus and method for controlling an air conditioner by considering indoor unit-efficiency in an air conditioning system.

Another aspect of the disclosure provides an apparatus and method for controlling an air conditioner thereby decreasing consumed power in an air conditioning system.

Another aspect of the disclosure provides an apparatus and method for controlling an air conditioner thereby setting an air conditioning-control zone to provide comfort to a user within the set air conditioning-control zone in an air conditioning system.

Another aspect of the disclosure provides an apparatus and method for controlling an air conditioner by considering target temperature ranges for a plurality of zones in an air conditioning system.

Another aspect of the disclosure provides an apparatus and method for controlling an air conditioner thereby setting an air conditioning-control zone at which one or more indoor units are installed and enhancing outdoor unit-efficiency and indoor unit-efficiency on the air conditioning-control zone basis in an air conditioning system.

Another aspect of the disclosure provides an apparatus and method for controlling an air conditioner thereby guaranteeing comfort per user in an open zone in an air conditioning system.

Another aspect of the disclosure provides an apparatus and method for controlling an air conditioner by setting an air conditioning-control zone based on at least one of a user's location, a user's mobility pattern, and a default zone-use schedule, and considering at least one of a target temperature range, a default zone-predicted temperature, outdoor unit-efficiency, and indoor unit-efficiency in an air conditioning system.

In accordance with an aspect of the disclosure, a method of a server in an air conditioning system is provided. The operating method includes determining a target temperature range to be applied to a first zone as a zone for which air conditioning is to be controlled; predicting an indoor temperature for each of a plurality of zones included in a second zone in which the first zone is included; predicting efficiency of at least one first outdoor unit connected to first indoor units installed at the second zone; and controlling operations of the first indoor units based on the target temperature range, the indoor temperature for each of the plurality of zones, and the efficiency of at least one first outdoor unit.

In accordance with another aspect of the disclosure, a server in an air conditioning system is provided. The server includes a communication unit configured to transmit or receive a signal; and a controller connected to the communication unit, and configured to determine a target temperature range to be applied to a first zone as a zone for which air conditioning is to be controlled, predict an indoor temperature for each of a plurality of zones included in a second zone in which the first zone is included, predict efficiency of at least one first outdoor unit connected to first indoor units installed at the second zone, and control operations of the first indoor units based on the target temperature range, the indoor temperature for each of the plurality of zones, and the efficiency of at least one first outdoor unit.

BRIEF DESCRIPTION OF THE DRAWINGS

The above and other aspects, features and advantages of the disclosure will be more apparent from the following detailed description, taken in conjunction with the accompanying drawings, in which:

FIGS. 26A and 26B are illustrations of a user interface (UI) provided based on outdoor unit-operation efficiency in a server in an air conditioning system according to an embodiment;

DETAILED DESCRIPTION OF EMBODIMENTS OF THE PRESENT DISCLOSURE

Figure 1:
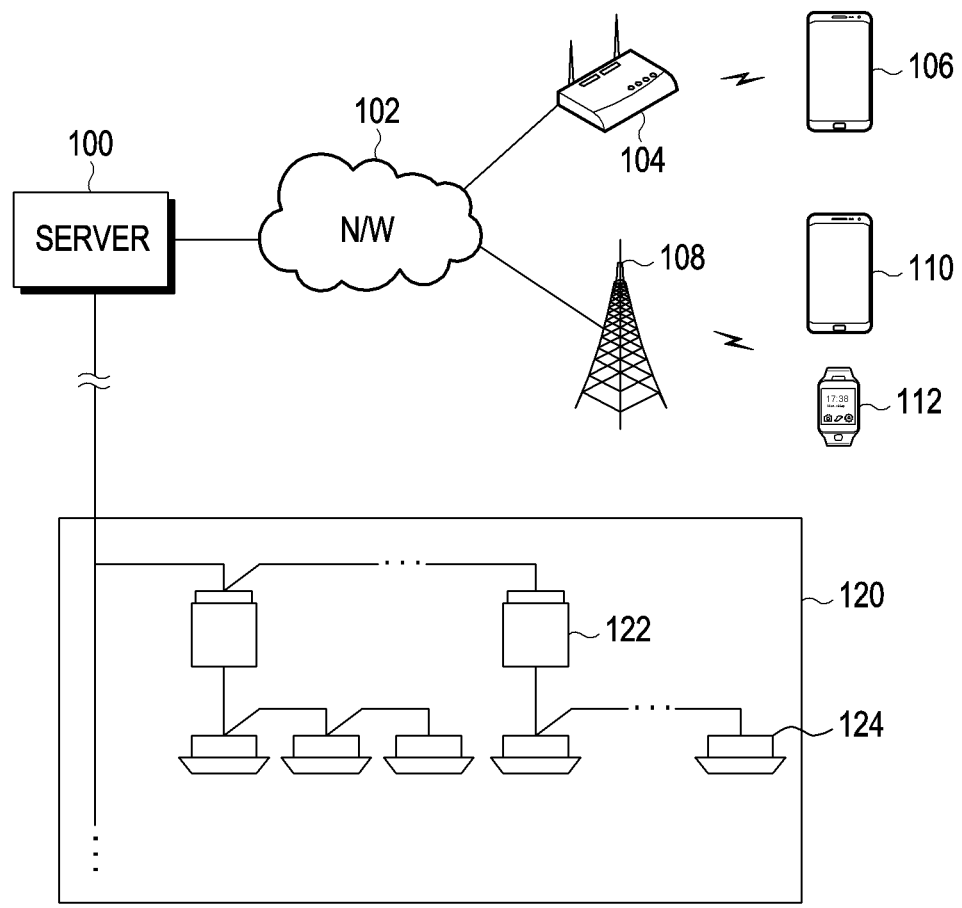
FIG. 1 is an illustration of an air conditioning system according to an embodiment.

Embodiments of the disclosure are described below with reference to the accompanying drawings. However, the scope of the disclosure is not intended to be limited to the particular embodiments and it is to be understood that the disclosure covers various modifications, equivalents, and/or alternatives falling within the scope of the disclosure as defined by the appended claims and their equivalents. In relation to a description of the accompanying drawings, like reference numerals denote the same components.

In the disclosure, the terms "include" and "comprise," as well as derivatives thereof, indicate inclusion without limitation. The term "or" is inclusive and indicates "and/or." The phrases "associated with" and "associated therewith," as well as derivatives thereof, may indicate "to include," "be included within," "interconnect with," "contain," "be contained within," "connect to or with," "couple to or with," "be communicable with," "cooperate with," "interleave," "juxtapose," "be proximate to," "be bound to or with," "have," "have a property of," or the like. The term "controller" indicates any device, system or part thereof that controls at least one operation, where such a device may be implemented in hardware, firmware or software, or some combination of at least two of the same. It should be noted that the functionality associated with any particular controller may be centralized or distributed, whether locally or remotely. Definitions for certain words and phrases are provided throughout the disclosure. Those of ordinary skill in the art should understand that in many, if not most instances, such definitions apply to prior, as well as future uses of such defined words and phrases.

In the disclosure, the terms "have," "may have," "include," or "may include" signify the presence of a certain feature (for example, a number, a function, an operation, or a component such as a part), not excluding the presence of one or more other features.

In the disclosure, the terms "A or B," "at least one of A or/and B," or "one or more of A or/and B" may cover all possible combinations of enumerated items. For example, "A or B," "at least one of A and B," or "at least one of A or B" may represent all of the cases of (1) inclusion of at least one A, (2) inclusion of at least one B, and (3) inclusion of at least one A and at least one B.

The terms "first" and "second" used in the disclosure may modify the names of various components irrespective of sequence and/or importance, but are not intended to limit the components. These terms are used to distinguish one component from another component. For example, a first user device and a second user device may indicate different user devices irrespective of sequence or importance. For example, a first component may be referred to as a second component and vice versa without departing from the scope of the disclosure.

When it is described that a component (for example, a first component) is "operatively or communicatively coupled with/to" or "connected to" another component (for example, a second component), it should be understood that the one component is connected to the other component directly or through any other component (for example, a third component). On the other hand, when it is said that a component (for example, a first component) is "directly connected to" or "directly coupled to" another component (for example, a second component), it may be understood that there is no other component (for example, a third component) between the components.

The term "configured to" as used herein may be used interchangeably with, for example, the terms "suitable for," "having the capacity to," "designed to," "adapted to," "made to," or "capable of" under circumstances. The term "configured to" may not necessarily indicate "specifically designed to" in hardware. Instead, the term "configured to" may indicate that a device may be "capable of" with another device or part. For example, the phrase "a processor configured to execute A, B, and C" may indicate a dedicated processor (for example, an embedded processor) for performing the corresponding operations or a general purpose processor (for example, a central processing unit (CPU) or an application processor (AP)) for performing the operations.

The terms as used in the disclosure are provided to merely describe certain embodiments, but are not intended to limit the scope of the disclosure. It is to be understood that singular forms include plural referents unless the context clearly dictates otherwise. Unless otherwise defined, the terms used in the disclosure may have the same meanings as generally understood by those skilled in the art. The terms as generally defined in dictionaries may be interpreted as having the same or similar meanings as or to contextual meanings of related technology. Unless otherwise defined, the terms are not intended to be interpreted as having ideally or excessively formal meanings. When needed, even the terms as defined in the disclosure may not be interpreted as excluding embodiments of the disclosure.

According to embodiments of the disclosure, an electronic device may be a user device equipped with communication functionalities, which should be able to detect its position and generate position information based on the detected position. Electronic devices may be classified into, for example, a portable type, a wearable type, a cradle type, an installed type, and/or the like.

The portable electronic device may include at least one of a smart phone, a tablet personal computer (PC), a mobile phone, a video phone, an e-Book reader, a personal digital assistant (PDA), a portable multimedia player (PMP), a moving picture expert group audio layer 3 (MP3) player, a mobile medical equipment, an electronic dictionary, a camcorder, a camera, or an electronic picture frame.

An example of the wearable electronic device is a wearable device. According to embodiments of the disclosure, the wearable device may be at least one of an accessory type (for example, a watch, a ring, a bracelet, an ankle bracelet, a necklace, glasses, contact lenses, swimming goggles, or a head-mounted device (HMD)), a fabric or clothes type (for example, electronic clothes or sportswear), an attached type (for example, a skin pad or a tattoo), or an implantable type (for example, an implantable circuit).

The cradle electronic device may be at least one of a navigator, a laptop PC, or a netbook computer, and the installed electronic device may be at least one of a desktop PC, a workstation, a medical equipment, or a surveillance camera such as a closed circuit television (CCTV).

According to some embodiments, an electronic device may be at least one of furniture, part of a building/structure, an electronic board, an electronic signature receiving device, a projector, or various measuring devices (for example, water, electricity, gas, electro-magnetic wave measuring devices, and/or the like). An electronic device may be one or a combination of two or more of the foregoing devices. An electronic device may be a flexible electronic device. In addition, it will be apparent to one having ordinary skill in the art that an electronic device according to the disclosure is not limited to the foregoing devices, but may be an electronic device according to the development of new technology.

An embodiment of the disclosure provides an apparatus and method for controlling an air conditioner in an air conditioning system.

An embodiment of the disclosure provides an apparatus and method for controlling an air conditioner by considering a target temperature range in an air conditioning system.

An embodiment of the disclosure provides an apparatus and method for controlling an air conditioner by considering outdoor unit-efficiency in an air conditioning system.

An embodiment of the disclosure provides an apparatus and method for controlling an air conditioner by considering one or more neighbor zones in an air conditioning system.

An embodiment of the disclosure provides an apparatus and method for controlling an air conditioner by considering a predicted temperature for one or more neighbor zones in an air conditioning system.

An embodiment of the disclosure provides an apparatus and method for controlling an air conditioner by considering indoor unit-efficiency in an air conditioning system.

An embodiment of the disclosure provides an apparatus and method for controlling an air conditioner by decreasing power consumption in an air conditioning system.

An embodiment of the disclosure provides an apparatus and method for controlling an air conditioner by setting an air conditioning-control zone to provide comfort to a user within in the set air conditioning-control zone in an air conditioning system.

An embodiment of the disclosure provides an apparatus and method for controlling an air conditioner by considering target temperature ranges for a plurality of zones in an air conditioning system.

An embodiment of the disclosure provides an apparatus and method for controlling an air conditioner by setting an air conditioning-control zone at which one or more indoor units are installed and enhancing outdoor unit-efficiency and indoor unit-efficiency on the air conditioning-control zone basis in an air conditioning system.

An embodiment of the disclosure provides an apparatus and method for controlling an air conditioner by guaranteeing comfort per user in an open zone in an air conditioning system.

An embodiment of the disclosure provides an apparatus and method for controlling an air conditioner by setting an air conditioning-control zone based on at least one of a user's location, a user's mobility pattern, and a default zone-use schedule, and considering at least one of a target temperature range, a default zone-predicted temperature, outdoor unit-efficiency, and indoor unit-efficiency in an air conditioning system.

In an embodiment of the disclosure, an air conditioning system includes a server and one or more air conditioners. The air conditioning system may further include a manager terminal, where the manager terminal denotes a user device of a manager who manages the server. The manager terminal may be connected to the server in a wired or wireless scheme, and a function of the manager terminal may be performed by the server.

In an embodiment of the disclosure, an air conditioner includes one or more outdoor units and one or more indoor units connected to each of the one or more outdoor units.

In an embodiment of the disclosure, an apparatus and method provides an air conditioning environment that offers comfort to a user by controlling "on," "off," a temperature setting, and/or the like for at least one air conditioner included in an air conditioning-control zone set in one zone, e.g., a default zone. In this case, an air conditioning environment where a user feels comfortable denotes an environment where temperature control is performed to satisfy a preset temperature comfort condition. In this case, the temperature comfort condition may be set based on an indoor temperature at a current location of a user device, e.g., a target temperature range, e.g., a comfortable temperature range.

In an embodiment of the disclosure, a scheme of setting an air conditioning-control zone provides a user with comfort, provides efficiency of an air conditioner, and controls the air conditioner based on the set air conditioning-control zone.

In an embodiment of the disclosure, a scheme of setting an air conditioning-control zone provides a user with comfort and reduces power consumption of an air conditioner and controls the air conditioner based on the set air conditioning-control zone.

In an embodiment of the disclosure, comfort may indicate a temperature which satisfies a set target temperature range. Thus, comfort may indicate a subjective sense of comfort. In this case, to provide user-desired comfort, embodiments of the disclosure may generate a control setting table per air conditioning-control zone which stores a control setting extracted by a comfortable temperature range which is detected based on an indoor temperature, indoor humidity, a metabolic rate (Met), a clothing insulation index (Clo), an outdoor temperature, and/or the like, a predicted temperature of each of one or more neighbor zones of the air conditioning-control zone, and outdoor unit-efficiency in advance.

The control setting may be a condition to satisfy a subjective sense of comfort of each user caused by an effect of an air conditioner in relation to the target temperature range of the air conditioning-control zone, the predicted temperature of the one or more zones of the air conditioning-control zone, the outdoor unit-efficiency, and/or the like. In embodiments of the disclosure, comfort may be expressed with, for example, a predicted mean vote (PMV) value. Generally, when a PMV value is within a preset range, e.g., −0.5 to 0.5, a user may feel comfortable. In embodiments of the disclosure, a comfort degree denotes a degree of comfort, and a comfortable temperature range may be set based on, for example, a comfort degree-prediction model which is based on a climate zone. The comfort degree-prediction model may include, for example, a comfort degree-prediction model disclosed by the American Society of Heating, Refrigerating and Air-Conditioning Engineers (ASHRAE). The comfort degree-prediction model disclosed by the ASHRAE classifies the world into 11 climate zones, i.e., a desert-climate zone, a semi desert-climate zone, a west coast marine-climate zone, a Mediterranean-climate zone, a humid mid latitude-climate zone, a continental subarctic-climate zone, a tundra/ice cap-climate zone, a humid subtropical-climate zone, a tropical savanna-climate zone, a wet equatorial-climate zone, and a high altitude-climate zone, and predicts a comfortable temperature for each climate zone.

In addition, a zone may refer to an independent space which may be affected by a temperature according to an installed air conditioner, such as an office, a meeting room, a living room, a bedroom, a bath room, a dining room, a swimming pool, a patient room, a lecture room, and/or the like. Further, a default zone may refer to a space including a plurality of zones. For example, a building may be a default zone, where the building may include a plurality of zones, and where each zone is one of an office space, a lounge, a meeting room, and/or the like. For example, a house may be a default zone, where the house may include a plurality of zones, and where each zone is one of a room, a living room, a kitchen, a dining room, a bathroom, and/or the like. For example, a hotel may be a default zone, where the hotel may include a plurality of zones, and where each zone is one of a room, a lobby, a restaurant, a bar, a swimming pool, a fitness center, and/or the like. For example, a school may be a default zone, where the school may include a plurality of zones, and where each zone is one of a classroom, a library, a cafeteria, and/or the like. For example, a retailer/mall may be a default zone, where the retailer/mall may include a plurality of zones, and where each zone is one of a showroom, a digital signage, a food court, and/or the like. For example, a stadium may be a default zone, where the stadium may include a plurality of zones, and where each zone is one of a stand, a score board, a stage, and/or the like. For example, a factory may be a default zone, where the factory may include a plurality of zones, and where each zone is one of an automated facility (e.g., a manufacture line), a manual workplace, a warehouse, and/or the like. For example, a hospital may be a default zone, where the hospital may include a doctor's office, a patient's room, an emergency room, and/or the like.

In addition, terms used in the disclosure may be defined as follows.

(1) Air Conditioning-Control Zone

The air conditioning-control zone denotes a zone where an air conditioning operation is controlled by a server or a user device in an air conditioning system. The air conditioning-control zone may be, for example, an office zone, and a default zone in which the air conditioning-control zone is included may be, for example, a building. The default zone may include a plurality of zones, and the plurality of zones may include the air conditioning-control zone, one or more zones which are adjacent to the air conditioning-control zone, and one or more zones which are not adjacent to the air conditioning-control zone. In the disclosure, the term "user device" may be used interchangeably with the terms "terminal," "user equipment," "mobile device," "device," "mobile terminal," "mobile station," and/or the like.

(2) Target Temperature Range

The target temperature range denotes a temperature range which an air conditioning-control zone targets, and may be, for example, a temperature range which may provide comfort to a user within the air conditioning-control zone, i.e., a comfortable temperature range. In embodiments of the disclosure, the term "comfort" may indicate, for example, a case where a PMV value is within a preset range, e.g., −0.5 to 0.5. In embodiments of the disclosure, a comfortable temperature range may be determined based on a comfort degree-prediction model which is based on a climate zone, e.g., a comfort degree-prediction model disclosed by the ASHRAE. In embodiments of the disclosure, a target temperature range may be determined based on various parameters such as a climate zone, an indoor temperature, indoor humidity, a Met, a Clo, an outdoor temperature, a use of a zone, and/or the like. In embodiments of the disclosure, a target temperature range may be determined based on indicating a difference between PMV per climate zone provided in a climate zone based-comfort degree-prediction model disclosed by the ASHRAE and practical thermal vote per climate zone ($D_{PMV}$).

A case where a target temperature range is applied to an air conditioning-control zone is described below. However, a target temperature, instead of a target temperature range, may be applied.

(3) Neighbor Zone-Predicted Temperature

The neighbor zone-predicted temperature denotes a predicted temperature for each of one or more zones which are adjacent to an air conditioning-control zone among a plurality of zones included in a default zone in which the air conditioning-control zone is included.

(4) Default Zone-Predicted Temperature

The default zone-predicted temperature includes a predicted temperature for each of a plurality of zones included in a default zone in which an air conditioning-control zone is included. The air conditioning-control zone may be identical or not to one of the plurality of zones included in the default zone. A case where the air conditioning-control zone is not identical to the one of the plurality of zoned included in the default zone may be a case where the air conditioning-control zone includes at least two of the plurality of zones included in the default zone or a case where the air conditioning-control overlaps with the at least two of the plurality of zones included in the default zone.

(5) Outdoor Unit-Efficiency

The outdoor unit-efficiency includes outdoor unit-operation efficiency and an outdoor unit-operating ratio. The outdoor unit-operation efficiency is determined based on a coefficient of performance. For example, the outdoor unit-operation efficiency may be acquired by multiplying a coefficient of performance (COP) and a constant value or by adding the constant value to the COP. For example, the outdoor unit-operation efficiency may be determined as a ratio of power amount consumed in an outdoor unit and a difference between a non-air conditioning (NAC)-temperature change and an air conditioning-temperature change (AC) temperature change of all indoor units connected to the outdoor unit. The NAC-temperature change denotes a temperature change of a zone at which an indoor unit is installed during preset time if the indoor unit does not operate, and the AC-temperature change denotes a temperature change of the zone at which the indoor unit is installed during the preset time if the indoor unit operates.

(6) Control Setting

The control setting is used for controlling an operation of an indoor unit, and may include a plurality of control setting parameters. The plurality of control setting parameters may include a set temperature, an operation mode, a fan speed, a fan direction, and/or the like. The operation mode may include a cooling mode, a heating mode, a fan mode, a dehumidification mode, and/or the like. The fan speed may include a high speed, a middle speed, a low speed, and/or the like. The fan direction may include an up direction, a down direction, a left direction, a right direction, an up/down direction, a left/right direction, and/or the like.

An example of a structure of an air conditioning system according to an embodiment of the disclosure is described below with reference to FIG. 1.

FIG. 1 is an illustration of a structure of an air conditioning system according to an embodiment.

Referring to FIG. 1, the air conditioning system may include a server 100 and an air conditioner 120 including at least one outdoor unit 122 and a plurality of indoor units 124. The server 100 collects indoor temperatures measured by the plurality of indoor units 124. The server 100 controls a control setting for the plurality of indoor units 124. The control setting may include a plurality of control setting parameters, and the plurality of control setting parameters may include a set temperature, an operation mode, a fan speed, a fan direction, and/or the like. The operation mode may include a cooling mode, a heating mode, a fan mode, a dehumidification mode, and/or the like. The fan speed may include a high speed, a middle speed, a low speed, and/or the like. The fan direction may include an up direction, a down direction, a left direction, a right direction, an up/down direction, a left/right direction, and/or the like.

The server 100 controls a set temperature for the plurality of indoor units 124, and the plurality of indoor units 124 performs a function of transferring heat introduced by the at least one outdoor unit 122 into an inside according to the set temperature (if a heating scheme is applied) or discharging heat from the inside to the outside according to the set temperature (if a cooling scheme is applied). Illustration of other components, e.g., a circuit breaker, a blower, a compressor, and/or the like of the air conditioning system in FIG. 1 which are not directly related to embodiments of the disclosure are omitted, and it is apparent that an air conditioning system to which an embodiment of the disclosure is applied is not limited to the structure of the air conditioning system in FIG. 1.

The server 100 may have communication functionality that allows access of user devices 106, 110, and 112 through a network (N/W) 102. For example, the user device 106 may communicate with the server 100 through an access point 104 based on a wireless fidelity (WiFi) scheme. For example, the user devices 110 and 112 may communicate with the server 100 through a base station (BS) 108 based on a broadband communication scheme.

The server 100 determines and manages a set temperature for each of the plurality of indoor units 124 in consideration of indoor temperatures collected from the plurality of indoor units 124 and feedback from the user devices 106, 110, and 112. Additionally, the server 100 may further receive sensing data collected from temperature sensors, air flow sensors, and humidity sensors located indoors and use the received sensing data in determining the set temperature. The server 100 may transmit a control command including control setting parameters such as the determined set temperature, and/or the like to a corresponding indoor unit among the plurality of indoor units 124. The control command may be transmitted to the corresponding indoor unit in a wired scheme or in a wireless scheme, for example, by a WiFi scheme, a Bluetooth low energy (BLE) scheme, a Zigbee scheme, a ZigWave scheme, a cellular communication scheme, and/or the like.

The server 100 may be configured so as to store indoor temperatures collected from the plurality of indoor units 124, feedback received from the user devices 106, 110, and 112, and set temperatures determined for the plurality of indoor units 124, and output the indoor temperatures, the feedback, and the set temperatures on an output unit. Further, the server 100 may collect and store location information of the plurality of indoor units 124.

The server 100 may control the air conditioner 120 including the at least one outdoor unit 122 and the plurality of indoor units 124 by considering a target temperature range, e.g., a comfortable temperature range, a default zone-predicted temperature, outdoor unit-efficiency, and/or the like. The outdoor unit-efficiency includes outdoor unit-operation efficiency and an outdoor unit-operating ratio. The comfortable temperature range, the default zone-predicted temperature, the outdoor unit-operation efficiency, and the outdoor unit-operating ratio are described below in greater detail.

The server 100 may be implemented as another device such as a manager terminal, a user device, and/or the like.

Figure 2:
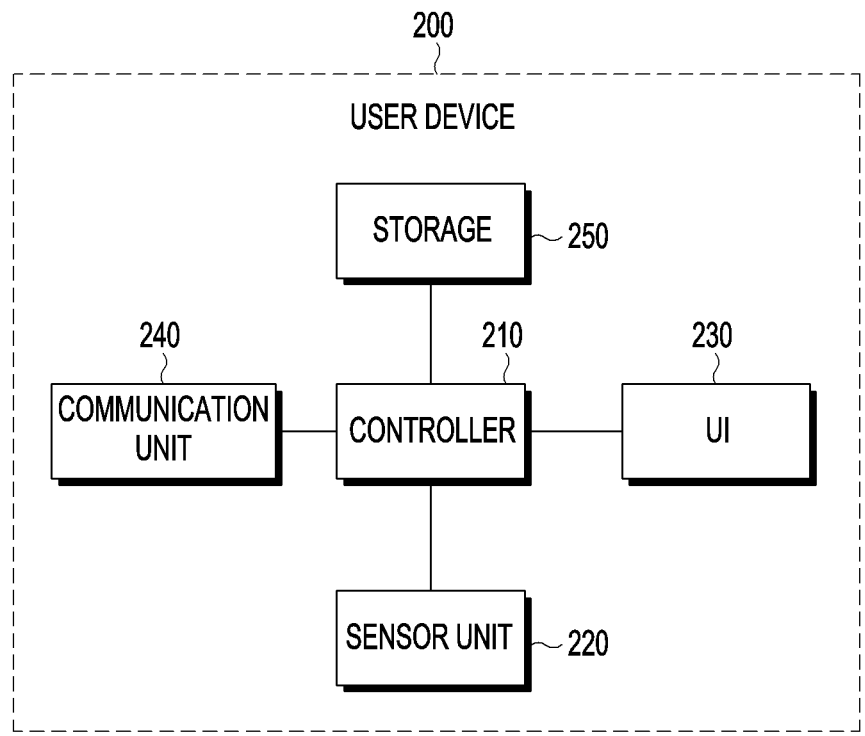
FIG. 2 is a block diagram of a user device in an air conditioning system according to an embodiment.

FIG. 2 is a block diagram of a user device 200 in an air conditioning system according to an embodiment.

Referring to FIG. 2, the user device 200 may include a controller 210, a sensor unit 220, a UI 230, a communication unit 240, and a storage 250. The term "communication unit" may be used interchangeably with the term "transceiver," and/or the like.

The communication unit 240 may communicate with an external device, e.g., a server in at least one communication scheme supported by the user device 200. The communication unit 240 may receive a signal transmitted from one or more wireless devices under the control of the controller 210, and estimate a location of the user device 200 based on signal strength of the signal. The communication unit 240 may provide location information indicating the estimated location of the user device 200 or input location information to the server under the control of the controller 210.

The communication unit 240 may provide feedback information including information related to comfort, e.g., PMV to the server under the control of the controller 210. The communication unit 240 may provide feedback information including information related to measured indoor temperature to the server under the control of the controller 210. The communication unit 240 may receive, from the server, various information, e.g., a comfortable temperature range, a default zone-predicted temperature, an outdoor unit-operation efficiency, an outdoor unit-operating ratio, and/or the like which are generated by the server based on feedback information including a set temperature for an indoor unit related to a space at which the user device 200 is located, e.g., a zone, the PMV, an indoor temperature as information related to control of an air conditioner. The communication unit 240 may transmit a control request to adjust a temperature to the server under the control of the controller 210.

The UI 230 may output necessary information to a user of the user device 200 or provide information input from the user to the controller 210 under the control of the controller 210. For example, the UI 230 may input, from the user, information related to comfort, i.e., comfort information, e.g., information indicating satisfaction or dissatisfaction, e.g., information indicating hot or cold, and provide the input comfort information to the controller 210. The UI 230 may include a display which may be implemented as a touch screen. The display may display information about a zone at which the user device 200 is located and information related to control of an air conditioner under the control of the controller 210. The display may display the input comfort information. The display may display information about the zone at which the user device 200 is located, for example, a layout of the zone, and display the indoor temperature collected through the sensor unit 220 and a set temperature determined by the server on the displayed zone information, under the control of the controller 210. For a default zone in which the zone at which the user device 200 is located is included, the display may display zone information with the same form as the zone at which the user device 200 is located, and display an indoor temperature and a set temperature on the displayed zone information, under the control of the controller 210. The display may display UI information, e.g., a menu for requesting display of various information generated by the sever, receive a user input, e.g., a touch input requesting display of a comfortable temperature range, a default zone-predicted temperature, outdoor unit-operation efficiency, an outdoor unit-operating ratio, and/or the like through the UI information, and notify the controller 210 of the user input. The display may display information about the comfortable temperature range, a default zone-predicted temperature, outdoor unit-operation efficiency, an outdoor unit-operating ratio, and/or the like received from the server under the control of the controller 210.

The sensor unit 220 may include various types of sensors for sensing situation information. The sensor unit 220 may include at least one of, for example, a temperature sensor, an air flow sensor, and a humidity sensor, and provide sensing data received from the sensor to the controller 210. The sensor unit 220 may further include, for example, a global positioning system (GPS) and/or a gyro sensor, and/or the like for acquiring the current location of the user dive 200 and provide sensing data received from the GPS and/or gyro sensor, and/or the like to the controller 210.

The controller 210 may generate feedback information including at least one of various information such as an indoor temperature, a current location, comfort information, and/or the like based on the sensing data collected through the sensor unit 220, information input from the outside, e.g., a user, and/or the like, and transmit the generated feedback information to the server through the communication unit 240, by a preset period, e.g., every hour. However, a period by which the feedback information is transmitted should not be construed as limiting the disclosure.

If comfort information of a user during a previous period is not input through the UI 230 at time at which the feedback information will be transmitted, the controller 210 may transmit the feedback information which includes the location information and the indoor temperature and does not include the comfort information. Alternatively, if the comfort information of the user during the previous period is not input through the UI 230 at time at which the feedback information will be transmitted, the controller 210 may generate comfort information indicating satisfaction and transmit the feedback information including the location information, the indoor temperature, and the generated comfort information.

The controller 210 may generate a control request using the sensing data and input information. The control request may include, for example, information about a set temperature which the user device 200 wants. The controller 210 may transmit the feedback and/or the control request to the server through the UI 240.

The controller 210 may perform a control operation for displaying a set temperature for the user on the display included in the UI 230, using a control command provided by the server. The controller 210 may perform a control operation for displaying an image of a zone at which the user device 200 is located on the display, based on zone information included in the control command provided by the server. The zone information may indicate information about a space occupied by a human being, an object, or a place distinguished from another zone by an arbitrary boundary, in which human activity or object movements take place. The zone information may include information about a per-floor layout of equipment and/or furniture, and/or an indoor map.

The controller 210 may control the display to display a set temperature determined for the user on the zone image displayed on the display. The controller 210 may perform a control operation for receiving, from the server, a result of the feedback information and/or the control request through the communication unit 240, and displaying the received result on the display.

The storage 250 may store comfort information input through the UI 230, sensing data transferred from the sensor unit 220, and information received from the server through the communication unit 240.

Although the controller 210, the sensor unit 220, the UI 230, the communication unit 240, and the storage 250 are described as separate units in the user device 200 in FIG. 2, it is to be understood that the user device 200 may be implemented with at least two of the controller 210, the sensor unit 220, the UI 230, the communication unit 240, and the storage 250.

The user device 200 may be implemented with one processor.

Figure 3:
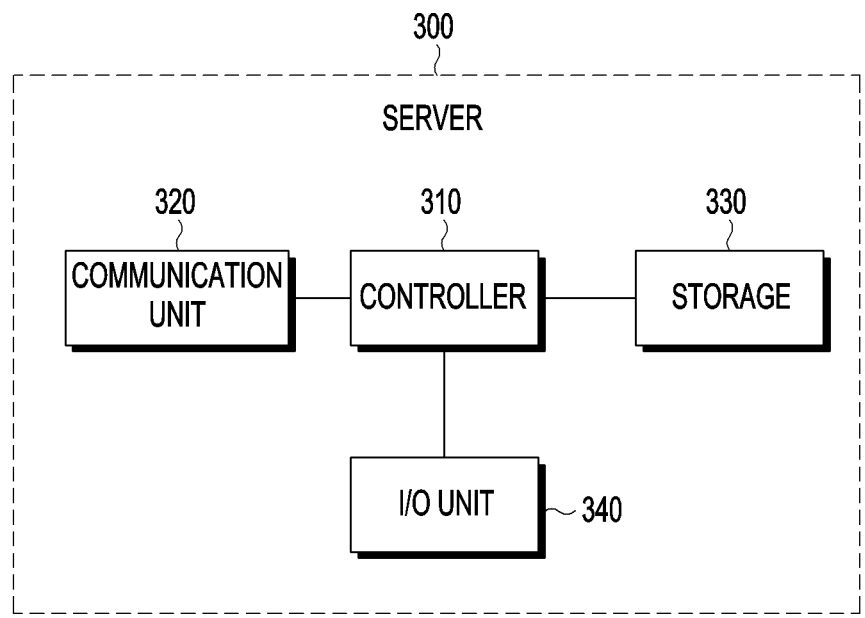
FIG. 3 is a block diagram of a server in an air conditioning system according to an embodiment.

FIG. 3 is a block diagram of a server in an air conditioning system according to an embodiment.

Referring to FIG. 3, the server 300 may include a controller 310, a communication unit 320, a storage 330, and an input/output (I/O) unit 340.

The communication unit 320 may communicate with a plurality of indoor units and user devices. For example, the communication unit 320 may receive feedback information including an indoor temperature, comfort information, and location information from each of the user devices and information about indoor temperatures from the plurality of indoor units and other temperature sensors, and transmit a control command to the indoor units.

The controller 310 may detect a default zone-predicted temperature based on feedback information collected through the communication unit 320, and determine set temperatures for the plurality of indoor units. The controller 310 may transmit a control command including the determined set temperatures to the plurality of indoor units through the communication unit 320. The control command may be transmitted to at least one indoor unit related to air conditioning control of a corresponding zone in order to satisfy comfort of users within each of a plurality of zones included in a default zone. The controller 310 may input information about a desired set temperature using a UI such as a keyboard, a mouse, and/or the like, and detect a set temperature which will be practically applied to the plurality of indoor units based on the desired set temperature. Alternatively, the controller 310 may detect a target temperature range for a certain zone, e.g., a comfortable temperature range, and the comfortable temperature range may be detected based on an indoor temperature and indoor humidity of the corresponding zone, a Met and a Clo applied to the corresponding zone, an outdoor temperature of the corresponding zone, and/or the like.

The controller 310 may detects a default zone-predicted temperature by predicting a temperature for each of a plurality of zones included in a default zone in which an air conditioning-control zone for which air conditioning will be controlled is included. The controller 310 may control the communication unit 320 to transmit a default zone-predicted temperature and a use schedule for a default zone stored at the storage 330 to a corresponding user device. The controller 310 may determine a comfortable temperature range which corresponds to a user device based on feedback information from the user device, based on location information of a zone at which the user device is located, or based on a climate zone at which the user device is located, an indoor temperature and indoor humidity, a Met and a Clo applied to the zone at which the user device is located, an outdoor temperature of the zone at which the user device is located, and/or the like, and control the communication unit 320 to transmit the comfortable temperature range to the user device.

The storage 330 may store various information to be used for determining a set temperature and a target temperature range, e.g., a comfortable temperature per climate zone predicted based on a climate zone, a default zone-predicted temperature, an indoor temperature and indoor humidity for each of a plurality of zones included in a default zone, a Met and a Clo applied to each of the plurality of zones, an outdoor temperature of each of plurality of zones, and/or the like. The storage 330 may store various information occurred while the server 300 operates under the control of the controller 310.

The I/O unit 340 includes a display for displaying information related to determination of a set temperature or a target temperature range under the control of the controller 310 and an input unit for inputting a desired temperature and providing the input desired temperature to the controller 310. The display may display various information such as a target temperature range, a default zone-predicted temperature, outdoor unit-efficiency, and/or the like detected by the controller 310, and various information for controlling a plurality of indoor units such that outdoor unit-efficiency is increased while a set temperature per indoor unit and an indoor temperature of a certain zone, e.g., an air conditioning-control zone are within a target temperature range.

Although the controller 310, the communication unit 320, the storage 330, and the I/O unit 340 are described as separate units in the server 300 in FIG. 3, it is to be understood that the server 300 may be implemented with at least two of the controller 310, the communication unit 320, the storage 330, and the I/O unit 340.

The server 300 may be implemented with one processor.

Figure 4:
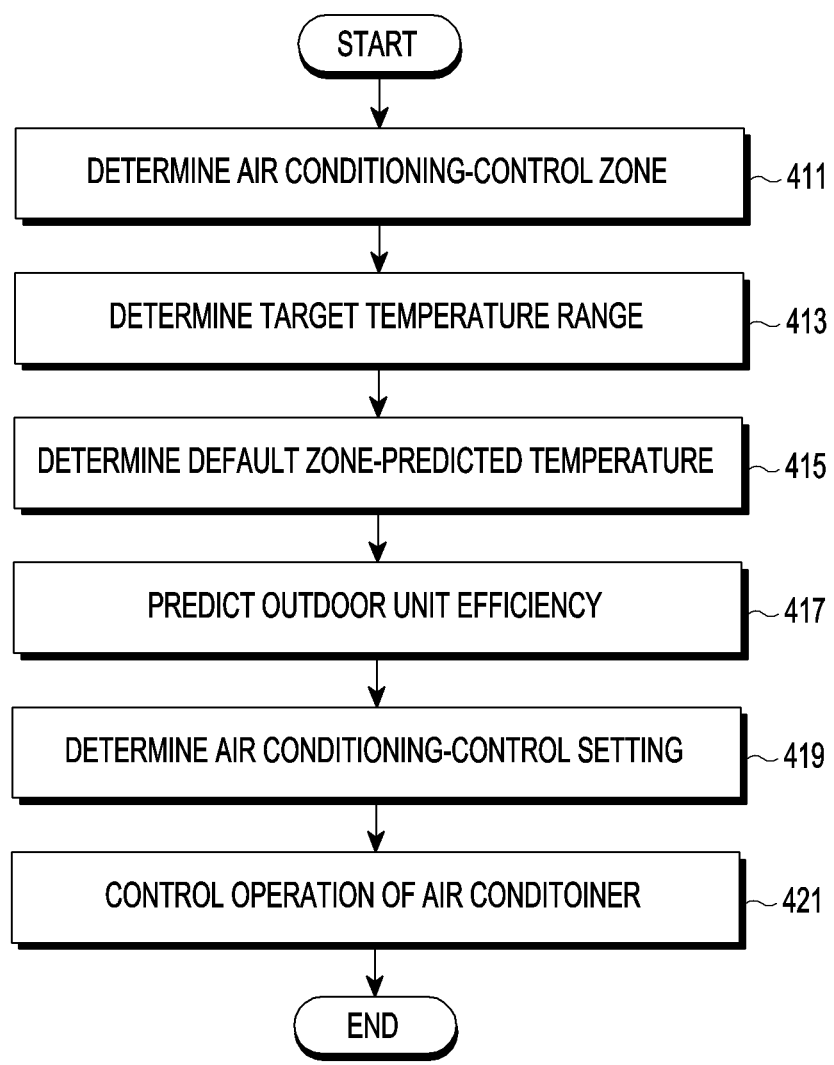
FIG. 4 is a flowchart of a method of controlling an air conditioner in a server in an air conditioning system according to an embodiment.

FIG. 4 a flowchart of a method of controlling an air conditioner in a server in an air conditioning system according to an embodiment.

Referring to FIG. 4, the server determines an air conditioning-control zone at step 411, and proceeds to step 413. The air conditioning-control zone denotes a zone for which an air conditioning-control operation will be performed. The air conditioning-control operation may be performed by the server, however, the air conditioning-control operation may be performed by a manager terminal or a user device. If the air conditioning-control operation is performed by the manager terminal or the user device, the manager terminal or the user device may have authority to perform the air conditioning-control operation. The air conditioning-control zone is described above, so a detailed description thereof is omitted here. The server may store information about the determined air conditioning-control zone, e.g., various parameters such as an air conditioning-control zone identifier (ID) which identifies the determined air conditioning-control zone, environment/device data for the determined air conditioning-control zone, e.g., an air conditioner ID which identifies at least one air conditioner within the determined air conditioning-control zone, a manufacturer and a model name of the at least one air conditioner, and/or the like.

The server may determine an air conditioning-control zone based on a preset initial zone and a location of a user device within the initial zone. The initial zone denotes a zone for which an air conditioning operation will be controlled by the server at a first time, e.g., an initial time, and may be a certain office zone. That is, the server may determine an air conditioning-control zone based on a location of a user device within the certain office zone, and a process of determining the air conditioning-control zone in the server is described below with reference to FIG. 5, so a detailed description thereof is omitted here. The air conditioning-control zone determined at the first time may be an air conditioning-control zone which is stored at the server in advance.

The server may determine an air conditioning-control zone at a second time after the first time as well as at the first time, e.g., the initial time. The server may determine an air conditioning-control zone based on a mobile pattern of a user device within the air conditioning-control zone determined at the first time or a default zone-use schedule at the second time. The default zone-use schedule denotes a use schedule for a preset default zone, the default zone may include the initial zone or might not include the initial zone, and an area of the default zone may be greater than an area of the initial zone or may not be greater than the area of the initial zone. The default zone is described above, so a detailed description thereof is omitted here.

The server may determine an air conditioning-control zone based on a mobile pattern of a user device within the air conditioning-control zone determined at the first time or a default zone-use schedule, i.e., a use schedule for the default zone, e.g., a building at the second time, which is described below with reference to FIG. 5, so a detailed description thereof is omitted here.

The server may determine a target temperature range for the determined air conditioning-control zone at step 413, and proceeds to step 415. The target temperature range may be, for example, a comfortable temperature range, where the comfortable temperature range denotes a temperature range that provides comfort to at least one user located at the determined air conditioning-control zone. The comfortable temperature range may be determined by various parameters such as a climate zone, an indoor temperature, indoor humidity, a Met, a Clo, an outdoor temperature, zone use, and/or the like. The various parameters used for determining the comfortable temperature range, i.e., the climate zone, the indoor temperature, the indoor humidity, the Met, the Clo, the outdoor temperature, the zone use, and/or the like may be stored at the server in advance, or may be input at a time at which the comfortable temperature range is determined. A process of determining the comfortable temperature range in the server is described below with reference to FIGS. 6 to 9, therefore a detailed description thereof is omitted here.

The server predicts a temperature for the default zone to determine a default zone-predicted temperature at step 415, and proceeds to step 417. The default zone-predicted temperature denotes a predicted temperature for the default zone at a time, e.g., time t, at which an air conditioning-control operation for the air conditioning-control zone starts, and where the default zone-predicted temperature includes a predicted temperature for each of a plurality of zones included in the default zone. A process of detecting the default zone-predicted temperature in the server is described below with reference to FIGS. 10 to 20, so a detailed description thereof is omitted here.

The server predicts outdoor unit-efficiency at step 417, and proceeds to step 419. The outdoor unit-efficiency includes outdoor unit-operation efficiency and an outdoor unit-operating ratio. A process of predicting the outdoor unit-operation efficiency and the outdoor unit-operating ratio in the server is described below with reference to FIGS. 21 to 27, so a detailed description thereof is omitted here.

The server determines air conditioning-control setting which may guarantee a temperature within the comfortable temperature range while increasing outdoor unit-efficiency, e.g., while maximizing the outdoor unit-efficiency based on the comfortable temperature range, the default zone-predicted temperature, and the outdoor unit-efficiency at step 419, and proceeds to step 421. The air conditioning-control setting denotes control setting used for controlling an operation of an air conditioner. A process of determining the air conditioning-control setting in the server is described below with reference to FIGS. 28 to 34, so a detailed description thereof is omitted here.

The server controls the operation of the air conditioner based on the determined air conditioning-control setting at step 421. A process of controlling the operation of the air conditioner based on the determined air conditioning-control setting is described below with reference to FIG. 35, therefore a detailed description thereof is omitted here. The process of controlling the operation of the air conditioner based on the determined air conditioning-control setting may be, for example, a process of controlling on, off, or a setting of a temperature of at least one outdoor unit included in the air conditioner, or at least one indoor unit connected to each of the at least one outdoor unit.

Although FIG. 4 illustrates a process of controlling an air conditioner in a server in an air conditioning system according to an embodiment of the disclosure, various changes may be made to FIG. 4. For example, although shown as a series of steps, various steps in FIG. 4 may overlap, occur in parallel, occur in a different order, or occur multiple times.

Figure 5:
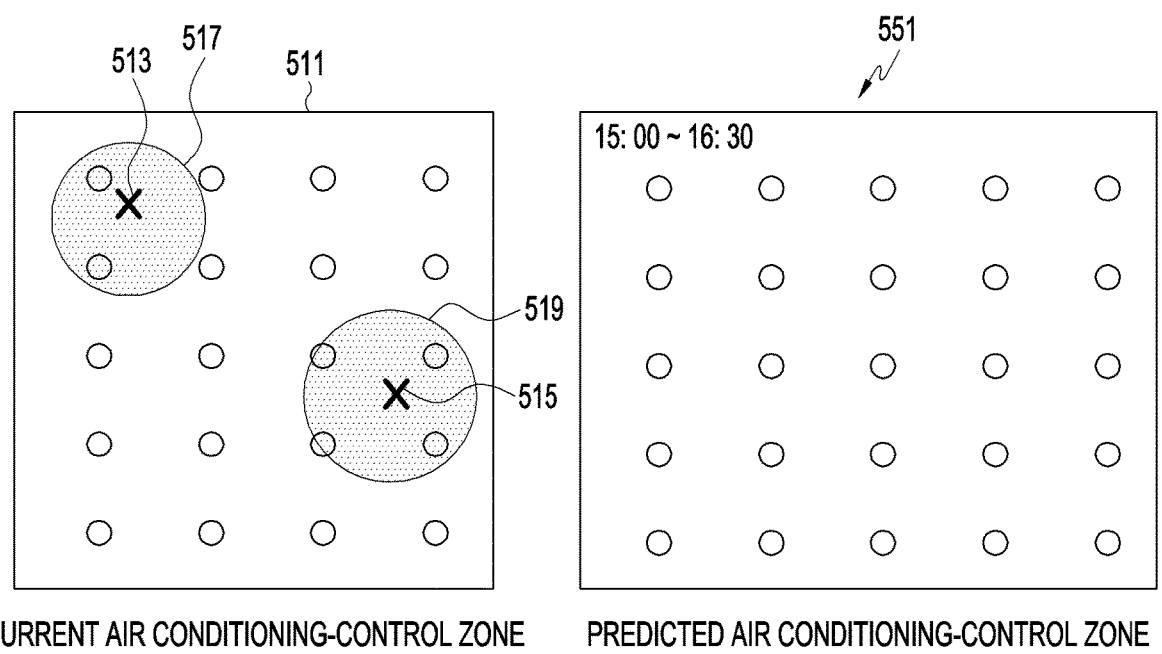
FIG. 5 is an illustration of a method of determining an air conditioning-control zone in a server in an air conditioning system according to an embodiment.

FIG. 5 is an illustration of a method of determining an air conditioning-control zone in a server in an air conditioning system according to an embodiment.

Referring to FIG. 5, the server may determine the air conditioning-control zone based on a preset initial zone and a location of a user device within the initial zone at a first time, e.g., an initial time or a current time. The initial zone may be, for example, a certain office. That is, the server may determine the air conditioning-control zone based on the location of a user device within the certain office. The location of the user device may be identical to a location of the user.

In an embodiment of the disclosure, the air conditioning-control zone at the first time may be determined by a manager terminal. The air conditioning-control zone at the first time is used for providing a user with a temperature within a comfortable temperature range. The air conditioning-control zone at the first time may be referred to as a "current air conditioning-control zone".

The server determines an air conditioning-control zone based on an initial zone 511 and locations of user devices within the initial zone 511, e.g., a user device #1 513 and a user device #2 515 at the first time. There may be a total of 20 indoor units in the initial zone 511. In an embodiment of the disclosure, a location of a user device may be detected by, for example, a plurality of sensors connected to the server, by a communication between the user device and the server, or by a communication between the user device and a manager terminal. A scheme of detecting the location of the user device may be implemented with various forms, and a detailed description thereof is omitted here.

The server determines two zones 517 and 519 within the initial zone 511 as an air conditioning-control zone based on locations of the user device #1 513 and the user device #2 515. The server may determine each of the two zones 517 and 519 as an air conditioning-control zone, or may determine the two zones 517 and 519 as one air conditioning-control zone.

The server may determine an air conditioning-control zone at a second time after the first time, e.g., a future time as well as the first time, e.g., the initial time or the current time. The server may determine an air conditioning-control zone based on a mobility pattern of a user device within an air conditioning-control zone determined at the first time or a default zone-use schedule at the second time. The default zone-use schedule denotes a use schedule for a preset default zone, and the default zone includes the initial zone.

In an embodiment of the disclosure, an air conditioning-control zone at the second time may be directly determined by a manager terminal. The air conditioning-control zone at the second time may be used for pre-heating or pre-cooling. The air conditioning-control zone at the second time may be referred to as a "predicted air conditioning-control zone". If a predicted air conditioning-control zone later becomes identical to a current air conditioning-control zone, the predicted air conditioning-control zone may be the current air conditioning-control zone.

The server may determine a certain space within a default zone as an air conditioning-control zone 551 based on a default zone-use schedule at the second time. The server determines the air conditioning-control zone 551 as a predicted air conditioning-control zone based on a space use schedule for the default zone during a certain time interval, e.g., a time interval which corresponds to 15:00 military time (i.e., 3:00 PM) to 16:30 military time (i.e., 4:30 PM). There may be a total of 25 indoor units within the air conditioning-control zone 551.

Alternatively, the server may determine a certain zone within the default zone as the air conditioning-control zone 551 at the second time by considering mobility patterns of user devices located at the air conditioning-control zones 517 and 519 which are determined at the first time, i.e., the user device #1 513 and the user device #2 515.

Figure 6:
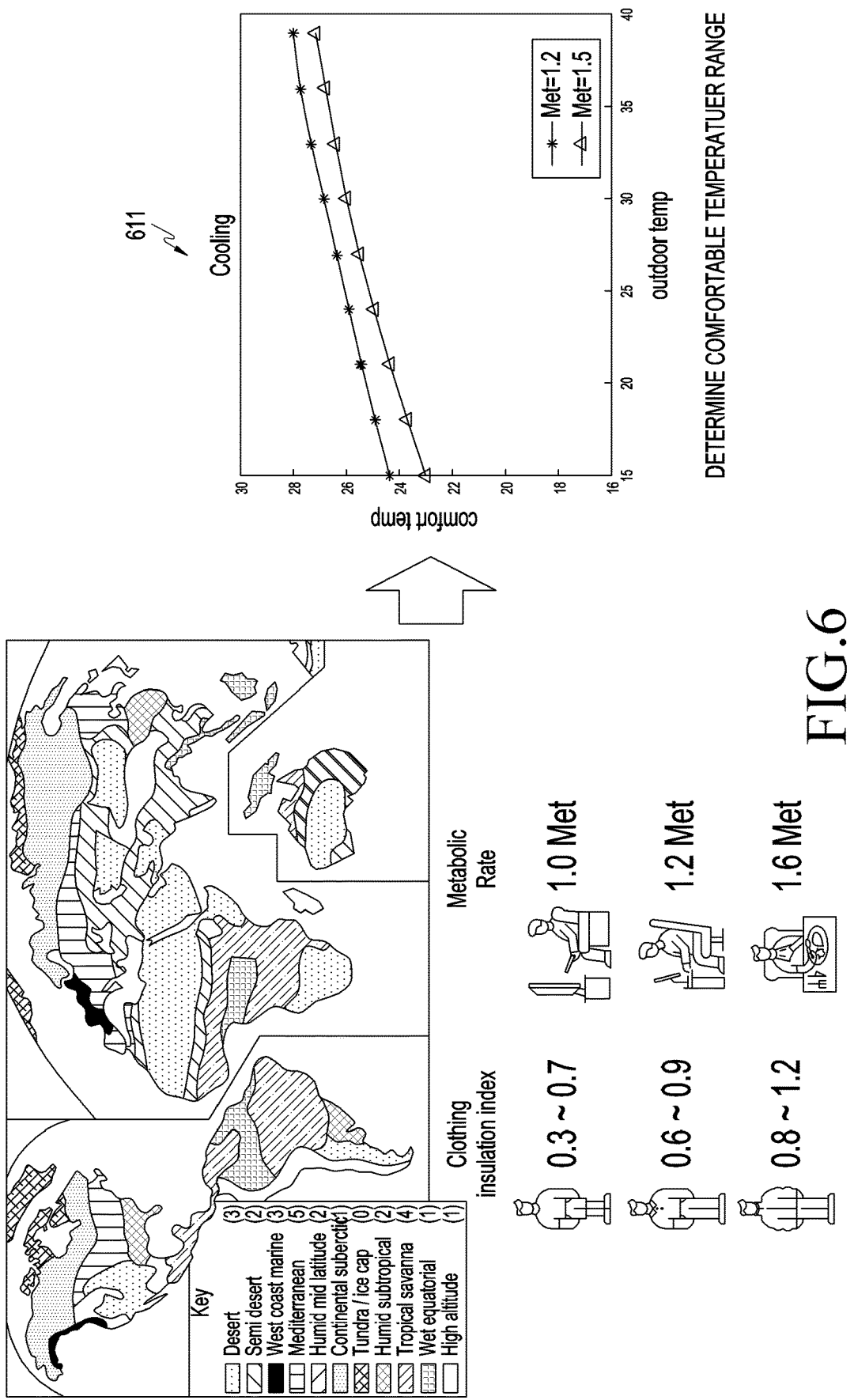
FIG. 6 is an illustration and a graph of a method of determining a comfortable temperature range in a server in an air conditioning system according to an embodiment.

FIG. 6 is an illustration a graph of a process of determining a comfortable temperature range in a server in an air conditioning system according to an embodiment.

Referring to FIG. 6, the server determines the comfortable temperature range for a determined air conditioning-control zone. The comfortable temperature range denotes a temperature range where it is possible to provide comfort to at least one user located at the air conditioning-control zone. For example, the comfort denotes a case where a PMV value is within a preset range, e.g., −0.5 to 0.5. The comfortable temperature range may be determined by various parameters such as a climate zone, an indoor temperature, indoor humidity, a Met, a Clo, an outdoor temperature, zone use, and/or the like, and a detailed description of the parameters used for determining the comfortable temperature range is omitted here.

A server may determine a comfortable temperature range based on, for example, a climate zone.

ASHRAE classifies the world into 11 climate zones, i.e., a Desert-climate zone, a Semi desert-climate zone, a West coast marine-climate zone, a Mediterranean-climate zone, a Humid mid latitude-climate zone, a Continental subarctic-climate zone, a Tundra/ice cap-climate zone, a Humid subtropical-climate zone, a Tropical savanna-climate zone, a Wet equatorial-climate zone, and a High altitude-climate zone, and proposes a climate zone based-comfort degree-prediction model which predicts a comfortable temperature range for each of the 11 climate zones. The climate zone based-comfort degree-prediction model disclosed by the ASHRAE predicts a comfort degree for each climate zone by determining a comfortable temperature for each climate zone through an artificial neural network (ANN) model.

A climate zone of a certain area is, for example, a Humid mid latitude-climate zone, thus the server may determine a comfortable temperature range based on a comfort degree provided for the Humid mid latitude-climate zone in a climate zone based-comfort degree-prediction model disclosed by the ASHRAE. The server may determine a comfortable temperature range by additionally considering a Clo and a Met along with the climate zone based-comfort degree-prediction model disclosed by the ASHRAE.

Therefore, the server may determine a comfortable temperature range for a determined air conditioning-control zone based on a comfort degree mapped to a Humid mid latitude-climate zone, and a set Met and Clo (611). A comfortable temperature in a case where a Met is 1.2 and a comfortable temperature in a case where a Met is 1.5 are illustrated in FIG. 6. In a graph 611, "comfort temp" indicates a comfortable temperature, and "outdoor temp" indicates an outdoor temperature.

Figure 7:
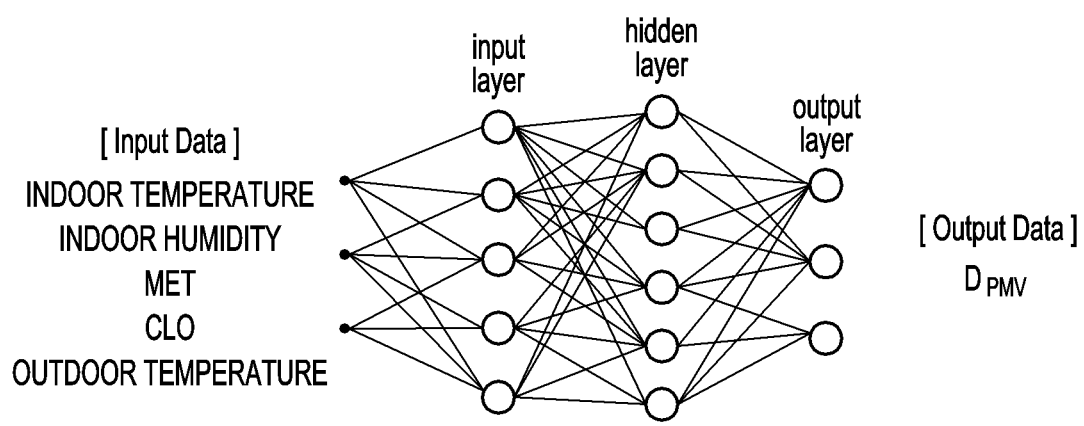
FIG. 7 is an illustration of a method of determining a comfortable temperature range in a server in an air conditioning system according to an embodiment.

FIG. 7 is an illustration of a method of determining a comfortable temperature range in a server in an air conditioning system according to an embodiment.

Referring to FIG. 7, the method of determining a comfortable temperature range may be based on a climate zone based-comfort degree-prediction model disclosed by the ASHRAE like a process of determining a comfortable temperature range in FIG. 6, however, the process illustrated in FIG. 7 does not use the climate zone based-comfort degree-prediction model disclosed by the ASHRAE as is, but uses $D_{PMV}$ denoting a difference between PMV per climate zone provided in the climate zone based-comfort degree-prediction model disclosed by the ASHRAE and a practical thermal vote per climate zone.

A server may use, for example, a recurrent neural network (RNN) for detecting $D_{PMV}$, and input data of the RNN may include, for example, an indoor temperature, an indoor humidity, a Met, a Clo, an outdoor temperature, and/or the like. In an embodiment of the disclosure, the input data of the RNN used for detecting the $D_{PMV}$ may include the indoor temperature, the indoor humidity, the Met, the Clo, and the outdoor temperature, however, various parameters as well as the indoor temperature, the indoor humidity, the Met, the Clo, and the outdoor temperature may be included in the input data of the RNN used for detecting the $D_{PMV}$.

If the indoor temperature, the indoor humidity, the Met, the Clo, and the outdoor temperature are input, the $D_{PMV}$ is output as output data through an input layer, a hidden layer, and an output layer. In this case, a scheme of detecting the $D_{PMV}$ through the RNN may be implemented with various schemes, and a detailed description thereof is omitted herein.

The server may determine the comfortable temperature range based on the detected $D_{PMV}$, a process of determining the comfortable temperature range based on the $D_{PMV}$ is described below with reference to FIG. 9, and a detailed description thereof is omitted here.

Figure 8:
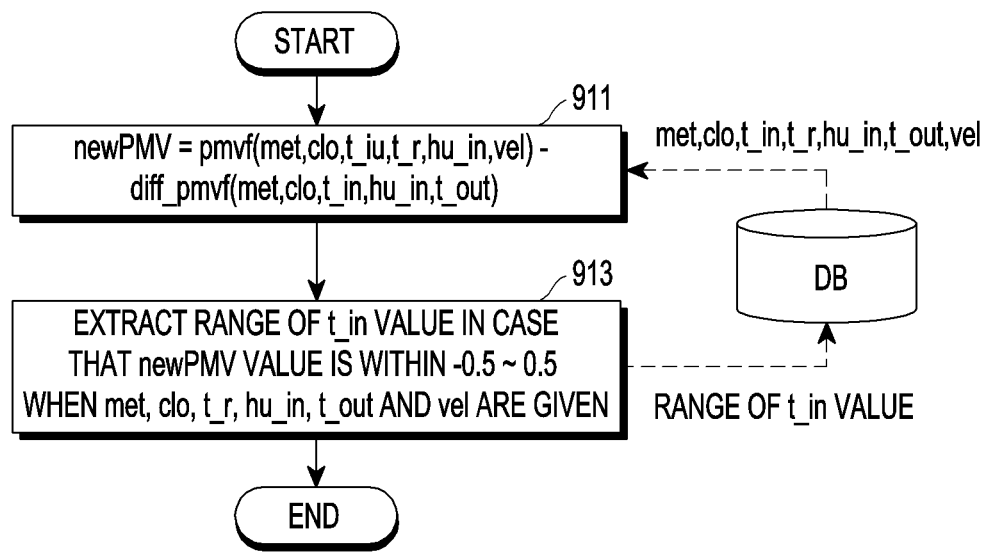
FIG. 8 is a flowchart of a method of determining a comfortable temperature range in a server in an air conditioning system according to an embodiment.

FIG. 8 is a flowchart of a method of determining a comfortable temperature range in a server in an air conditioning system according to an embodiment.

Referring to FIG. 8, the server may determine the comfortable temperature range based on PMV and $D_{PMV}$. The server extracts an indoor temperature range within which a value obtained by subtracting the $D_{PMV}$ from the PMV may be within a preset range, e.g., a range from −0.5 to 0.5, and determines the extracted indoor temperature range as the comfortable temperature range.

The server controls that newPMV as new PMV is determined based on PMV and $D_{PMV}$ at step 911, and proceeds to step 913. The server controls that the newPMV is determined based on the PMV and the $D_{PMV}$ as expressed in Equation (1).

$$\text{newPMV} = \text{pmvf}(met, clo, t\_in, t\_r, hu\_in, vel) - \text{diff\_pmvf}(met, clo, t\_in, hu\_in, t\_out) \quad (1)$$

In Equation (1) above, pmvf denotes a function of detecting PMV based on input parameters, and diff_pmvf denotes a function of detecting $D_{PMV}$ based on input parameters.

In Equation (1) above, input parameters of each of pmvf and diff_pmvf include met, do, t_in, t_r, hu_in, and vel. In this case, met denotes a Met, t_in denotes an indoor temperature, t_r denotes a radiant temperature, hu_in denotes indoor humidity, do denotes a Clo, vel denotes an air velocity, and t_out denotes an outdoor temperature. In an embodiment of the disclosure, the radiant temperature may be approximately equal to the indoor temperature.

In an embodiment of the disclosure, the server determines the value obtained by subtracting the $D_{PMV}$ from the PMV as the newPMV, however, the newPMV may be determined as a value obtained by adding the $D_{PMV}$ and the PMV, and a scheme of determining the newPMV based on the $D_{PMV}$ and the PMV may be implemented with various forms.

After the server sets the newPMV to be determined based on the PMV and the $D_{PMV}$ as expressed in Equation (1) above, if met, do, t_in, t_r, hu_in, and vel are given, the server extracts a range of an indoor temperature within which the newPMV is within a preset range, e.g., a range from −0.5 to 0.5, i.e., a range of a t_in value, and determines the extracted range of the t_in value as a comfortable temperature range at step 913. That is, if the newPMV is within the range from −0.5 to 0.5, a user within an air conditioning-control zone to which the newPMV is applied feels comfortable, so the server determines the range of the indoor temperature within which the newPMV is within the range from −0.5 to 0.5 as the comfortable temperature range.

The various parameters used for determining the comfortable temperature range, e.g., an indoor temperature, indoor humidity, a Met, a Clo, an outdoor temperature, a radiant temperature, an air velocity, and/or the like may be stored at the server in advance, or may be input at time at which the comfortable temperature range is determined. The server stores the determined comfortable temperature range, i.e., the range of the t_in value at, for example, a database.

The parameters used for determining the comfortable temperature range may include an indoor temperature, indoor humidity, a Met, a Clo, an outdoor temperature, a radiant temperature, and an air velocity, however, the parameters may further include various parameters such as a climate zone, space use, and/or the like as well as the indoor temperature, the indoor humidity, the Met, the Clo, the outdoor temperature, the radiant temperature, and the air velocity.

Figure 9:
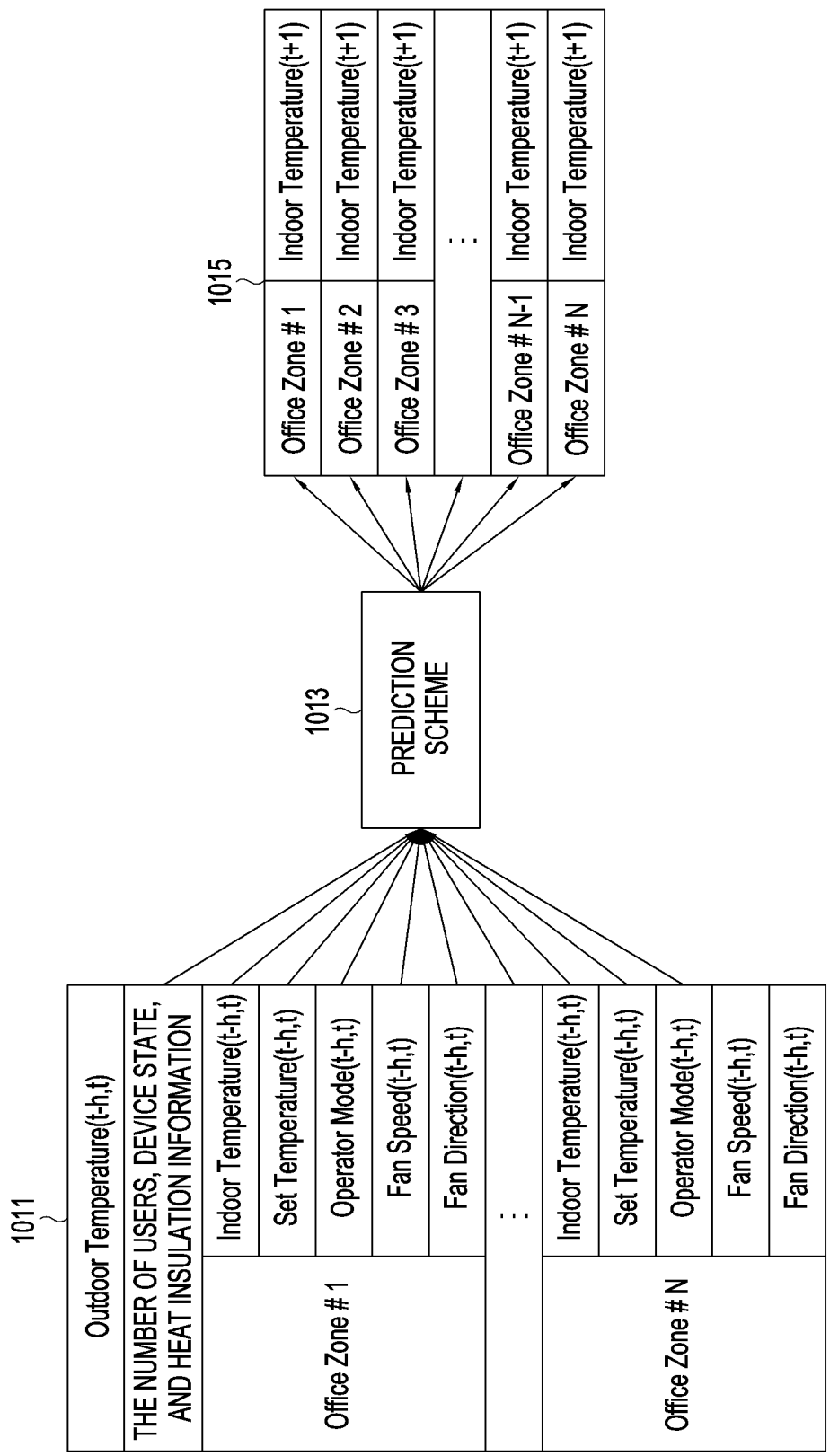
FIG. 9 is an illustration of a method of detecting a default zone-predicted temperature in a server in an air conditioning system according to an embodiment.

FIG. 9 is an illustration of a method of detecting a default zone-predicted temperature in a server in an air conditioning system according to an embodiment.

Referring to FIG. 9, if a plurality of indoor units are installed at the first zone which is relatively large, e.g., a zone of which an area is larger than a threshold area, the second zone at which a certain indoor unit among the plurality of indoor units is installed is affected by indoor units which are adjacent to the second zone, i.e., neighbor indoor units as well as the certain indoor unit, so a temperature of the second zone is determined by the certain indoor unit and the neighbor indoor units. In this case, the second zone is included in the first zone.

Further, a temperature at a certain zone may be determined by various parameters such as the number of users within the certain zone, states of devices used at the certain zone, an outdoor temperature, a heat insulation degree of the certain zone, and/or the like.

In an embodiment of the disclosure, a server detects a predicted temperature for a default zone in which an air conditioning-control zone is included, i.e., a default zone-predicted temperature for maintaining a comfortable temperature range for the air conditioning-control zone. The default zone-predicted temperature denotes a predicted temperature for each of a plurality of zones included in the default zone as well as a temperature for a certain zone. The default zone-predicted temperature denotes a predicted temperature for each of a plurality of zones at time at which air conditioning-control operation for the air conditioning-control zone is performed. That is, the default zone-predicted temperature denotes a predicted temperature for each of a plurality of zones at time at which air conditioning-control operation for the air conditioning-control zone is performed, and effect of one or more indoor units which are installed at each of one or more neighbor zones adjacent to each of the plurality of zones as wells as one or more indoor units which are installed at each of the plurality of zones and effect according to heat transfer/heat movement are reflected on the default zone-predicted temperature.

A server may predict, at time, e.g., a first time, e.g., t during which an air conditioning-control operation for an air conditioning-control zone is performed, an indoor temperature of each of a plurality of zones, e.g., an office zone #1 to an office zone #N included in a default zone at time, e.g., a second time, e.g., t+1 after the first time by considering various temperature related parameters such as an outdoor temperature for a corresponding zone, the number of users within the corresponding zone, states of devices used at the corresponding zone, heat insulation information for the corresponding zone, an indoor temperature of the corresponding zone, a set temperature of an indoor unit installed at the corresponding zone, an operation mode of the indoor unit installed at the corresponding zone, a fan speed of the indoor unit installed at the corresponding zone, a fan direction of the indoor unit installed at the corresponding zone, and/or the like. The operation mode may include a cooling mode, a heating mode, a fan mode, a dehumidification mode, and/or the like.

A default zone-predicted temperature for a corresponding zone is detected by considering various temperature related parameters such as an outdoor temperature [t–h, t] from time before the first time, e.g., the third time, e.g., t–h to t, the number of users within the corresponding zone, states of devices used at the corresponding zone, heat insulation information for the corresponding zone, an indoor temperature [t–h, t], a set temperature [t–h, t] from t–h to t of an inner unit installed at the corresponding zone, an operation mode [t–h, t] from t–h to t of the inner unit installed at the corresponding zone, a fan speed [t–h, t] from t–h to t of the inner unit installed at the corresponding zone, a fan direction [t–h, t] from t–h to t of the inner unit installed at the corresponding zone, and/or the like.

The server may input, at t, various temperature related parameters such as an outdoor temperature, the number of users, states of devices, heat insulation information, an indoor temperature, a set temperature of an indoor unit, an operation mod of the indoor unit, a fan speed of the indoor unit, a fan direction of the indoor unit, and/or the like from t–h to t for each of a plurality of zones included in the default zone (1011), predict an indoor temperature at t+1 for each of the plurality of zones included in the default zone based on a preset prediction scheme (1013), and may detect a default zone-predicted temperature (1015). The default zone-predicted temperature includes a predicted temperature for each of a plurality of zones included in the default zone, i.e., an office zone #1 to an office zone #N. The prediction scheme may be implemented with various forms and is described below, so a detailed description thereof is omitted here.

Figure 10:
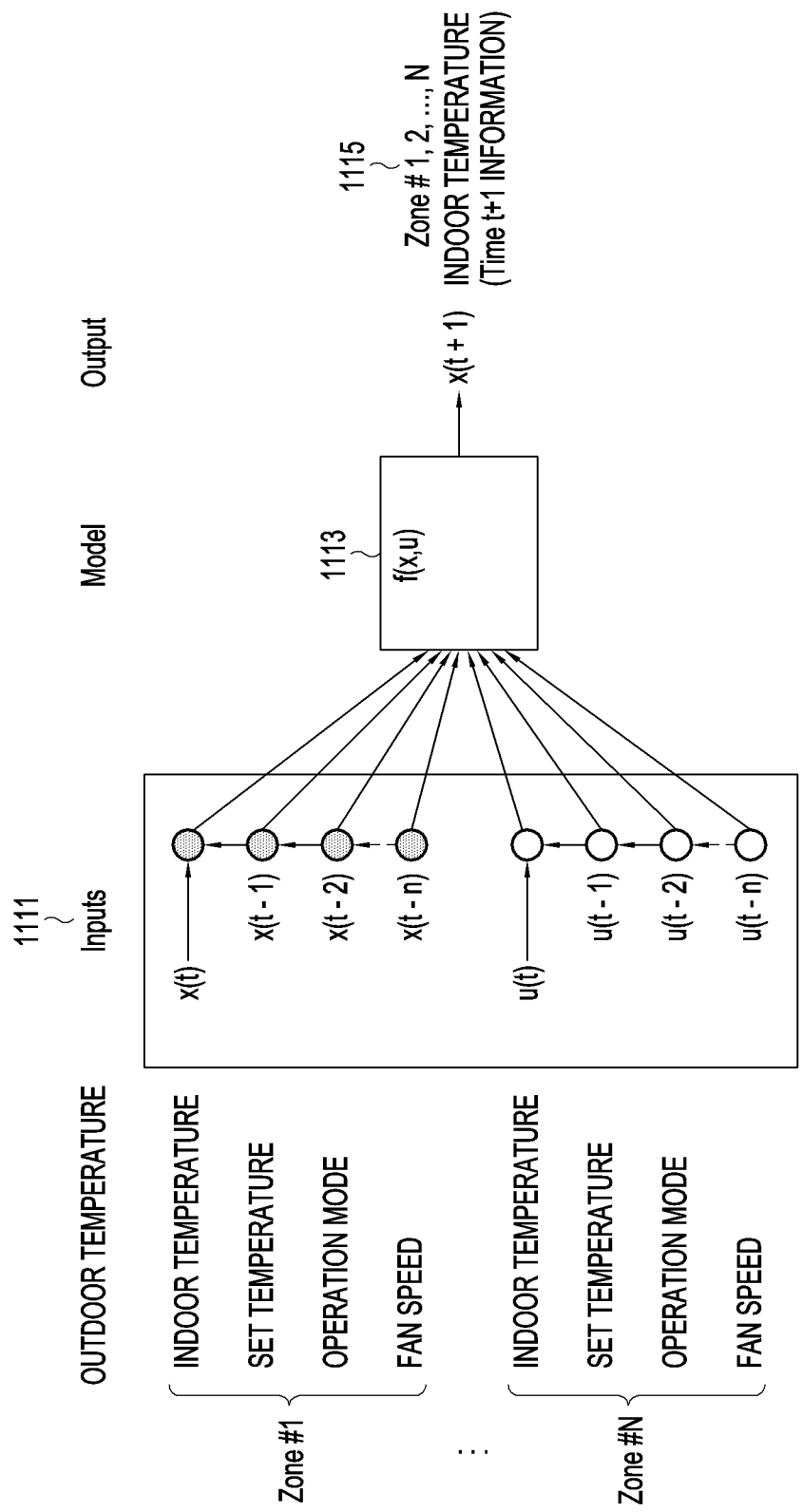
FIG. 10 is an illustration of a method of detecting a default zone-predicted temperature in a server in an air conditioning system according to an embodiment.

FIG. 10 is an illustration of a method of detecting a default zone-predicted temperature in a server in an air conditioning system according to an embodiment.

Referring to FIG. 10, there is a need for modeling an effect according to heat transfer/movement with time series data for detecting a default zone-predicted temperature. In addition, there is a need for a server to predict, at a first time, e.g., a current time, an inner temperature change for a certain zone at a time, e.g., a future time after the first time with a time series based on an inner environment for the certain zone and set a variable refrigerant flow (VRF) system.

In an embodiment of the disclosure, a model of detecting a default zone-predicted temperature based on multi-layer perceptron (MLP) based-time series data is provided, where the model of detecting the default zone-predicted temperature is based on the MLP based-time series data is shown in FIG. 10.

The model of detecting the default zone-predicted temperature based on MLP based-time series data in an embodiment of the disclosure may detect a default zone-predicted temperature of a third time, e.g., a future time t+1 based on information from the first time, e.g., a past time t–n to a second time, e.g., a current time t, and may recursively detect a default zone-predicted temperature of a fourth time, e.g., a time t+n after the third time.

A server may predict an indoor temperature at the third time, e.g., a future time t+1 based on information for each of a plurality of zones, e.g., a zone #1 to zone #N included in a default zone at the second time, e.g., a current time t. Information for a certain zone may include an outdoor temperature of a certain zone from the first time, e.g., a past time t–n to the second time t, an indoor temperature of the certain zone from the first time t–n to the second time t, a set temperature of an indoor unit installed at the certain zone from the first time t–n to the second time t, an operation mode of the indoor unit installed at the certain zone from the first time t–n to the second time t, a fan speed of the indoor unit installed at the certain zone from the first time t–n to the second time t, and/or the like.

In this case, the information for the zone #1 to zone #N from the first time t–n to the second time t is provided as input of a model of detecting a default zone-predicted temperature based on MLP based-time series data (1111), and the model of detecting the default zone-predicted temperature based on the MLP based-time series data predicts an indoor temperature for each of the zone #1 to zone #N at the third time, e.g., future time t+1 based on a preset function f(x, u) (1113). In this case, the function f(x,u) may be implemented based on an ANN time series data model, and may predict the indoor temperatures for the plurality of zones, i.e., the zone #1 to zone #N. The function f(x,u) may be implemented with various schemes, and a detailed description for the schemes which implement the function f(x,u) is omitted here.

The indoor temperature for each of the zone #1 to zone #N at the third time t+1 predicted by the model of detecting the default zone-predicted temperature based on the MLP based-time series data is provided as output (1115). In this case, the output is the default zone-predicted temperature.

A server may predict an indoor temperature of each of a plurality of zones included in a default zone by considering mutual effect among the plurality of zones.

Figure 11:
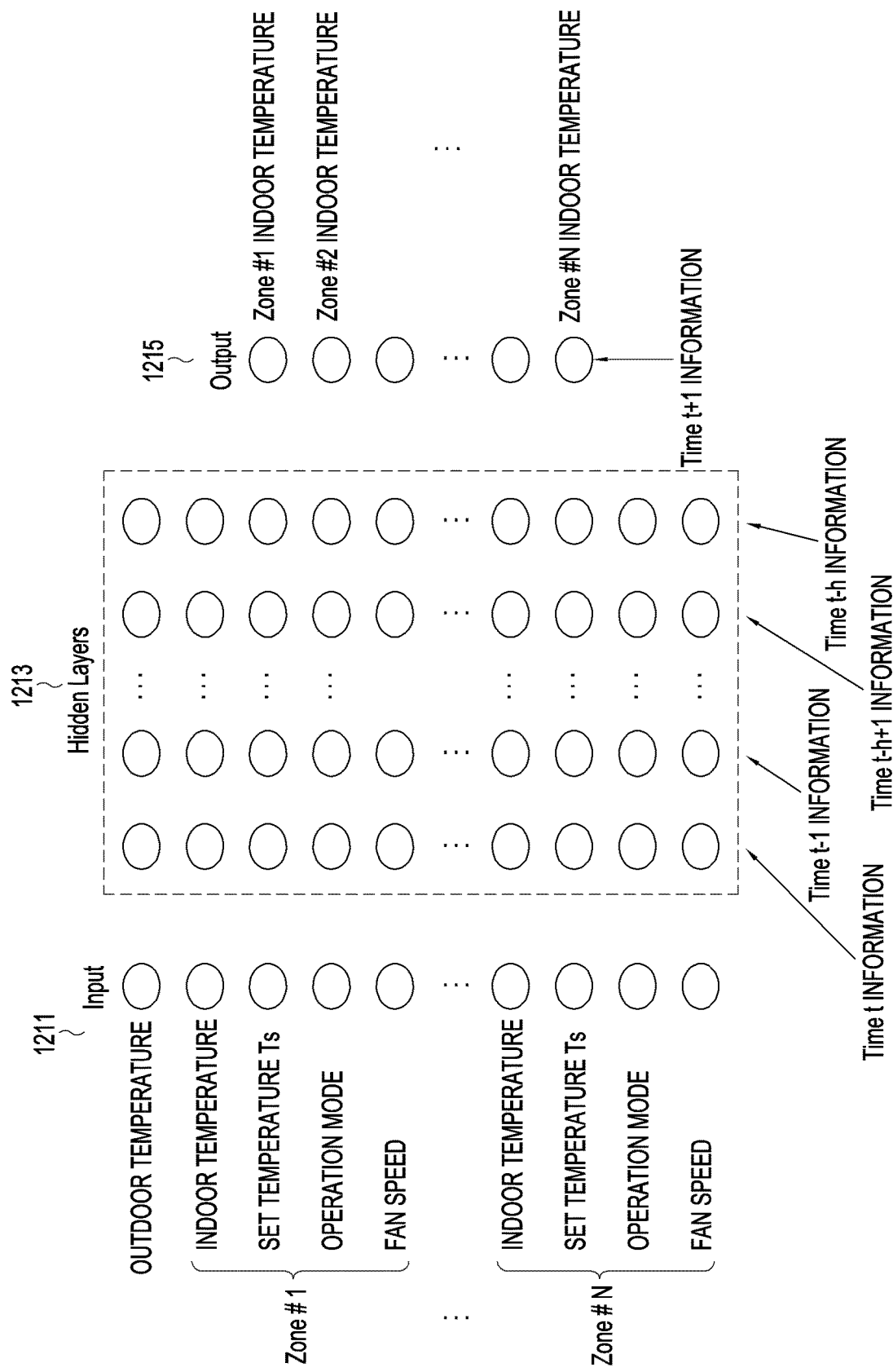
FIG. 11 is an illustration of a method of detecting a default zone-predicted temperature in a server in an air conditioning system according to an embodiment.

FIG. 11 is an illustration of a method of detecting a default zone-predicted temperature in a server in an air conditioning system according to an embodiment.

Referring to FIG. 11, as described above with reference to FIG. 10, there is a need for modeling an effect according to heat transfer/movement with time series data for detecting a default zone-predicted temperature. In addition, there is a need for a server to predict, at a first time, e.g., a current time, an inner temperature change for a certain zone at a time, e.g., a future time after the first time with a time series based on an inner environment for the certain zone and set a VRF system.

An embodiment of the disclosure provides a model of detecting a default zone-predicted temperature based on RNN based-time series data, where the model of detecting the default zone-predicted temperature based on the RNN based-time series data is shown in FIG. 11.

The model of detecting the default zone-predicted temperature based on the RNN based-time series data in an embodiment of the disclosure may predict a default zone-predicted temperature at a third time, e.g., a future time t+1 based on information from a first time, e.g., a past time t−h to a second time, e.g., a current time t, and may recursively predict a default zone-predicted temperature at a fourth time, e.g., a time t+h after the third time.

A server may predict an indoor temperature at the third time, e.g., a future time t+1 based on information for each of a plurality of zones, N zones, e.g., a zone #1 to zone #N included in a default zone at the second time, e.g., a current time t. Information for a certain zone may include an outdoor temperature of the certain zone from the first time, e.g., a past time t−h to the second time t, an indoor temperature of the certain zone from the first time t−h to the second time t, a set temperature of an indoor unit installed at the certain zone from the first time t−h to the second time t, an operation mode of the indoor unit installed at the certain zone from the first time t−h to the second time t, a fan speed of the indoor unit installed at the certain zone from the first time t−h to the second time t, and/or the like.

In this case, the information for each of the zone #1 to zone #N from the first time t−h to the second time t is provided as input of a model of detecting a default zone-predicted temperature based on RNN based-time series data (1211), and the model of detecting the default zone-predicted temperature based on the RNN based-time series data predicts an indoor temperature for each of the zone #1 to zone #N at the third time, e.g., future time t+1 based on information for each of the zone #1 to zone #N from the first time t−h to the second time t (1213). That is, past data of input is mapped to a recurrent part of the model of detecting the default zone-predicted temperature based the RNN based-time series data, so RNN based-time series data may be recursively output. In this case, the model of detecting the default zone-predicted temperature based on the RNN based-time series data may be implemented with various schemes, and a detailed description for the schemes which implement the model of detecting the default zone-predicted temperature based on the RNN based-time series data is omitted here.

The indoor temperature for each of the zone #1 to zone #N at the third time t+1 predicted by the model of detecting the default zone-predicted temperature based on the RNN based-time series data is provided as output (1215). In this case, the output is the default zone-predicted temperature.

A server may predict an indoor temperature of each of a plurality of zones included in a default zone by considering mutual effect among the plurality of zones.

Figure 12:
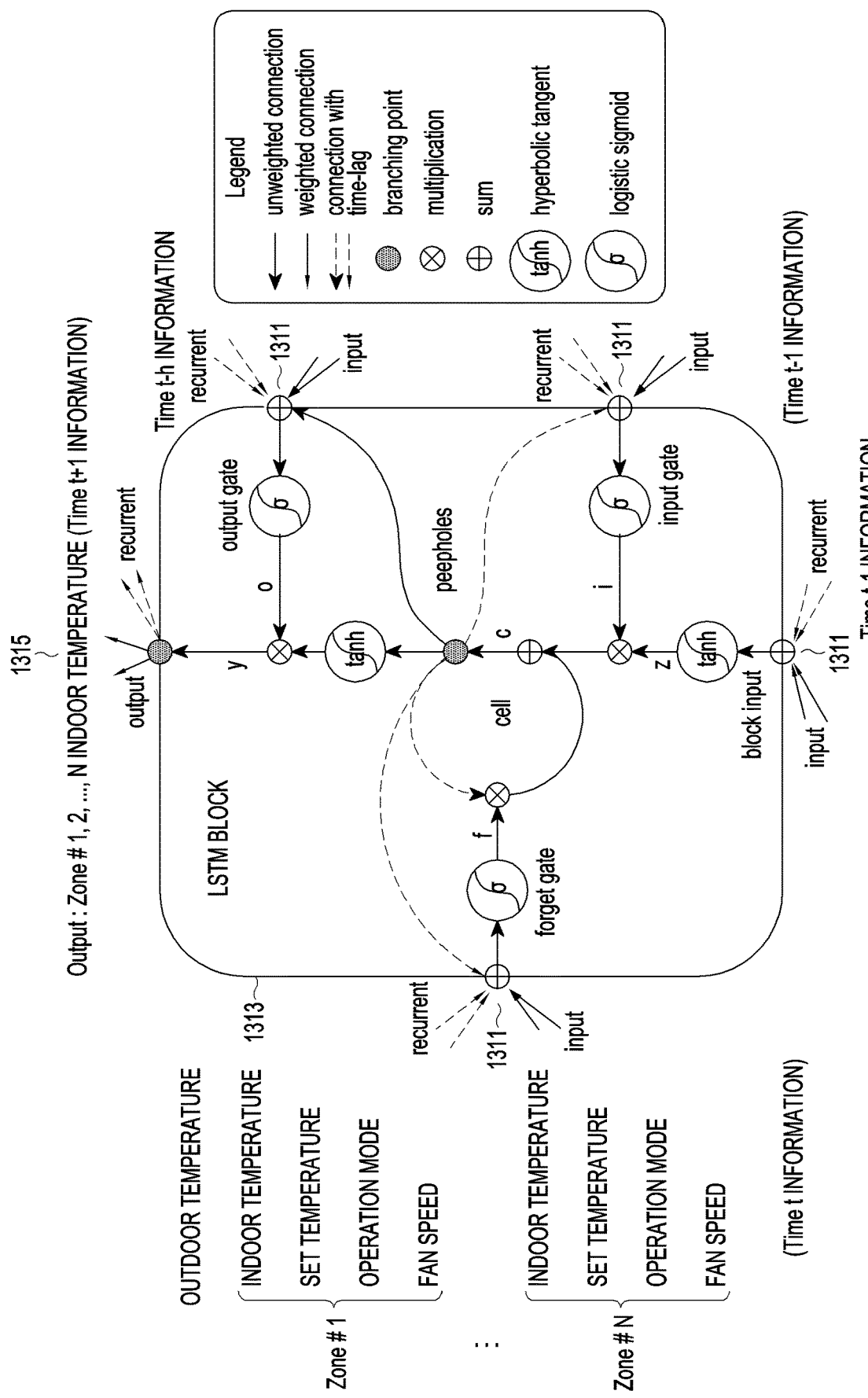
FIG. 12 is an illustration of a method of detecting a default zone-predicted temperature in a server in an air conditioning system according to an embodiment.

FIG. 12 is an illustration of a method of detecting a default zone-predicted temperature in a server in an air conditioning system according to an embodiment.

Referring to FIG. 12, as described above with reference to in FIGS. 10 and 11, there is a need for modeling an effect according to heat transfer/movement with time series data for detecting a default zone-predicted temperature. In addition, there is a need for a server to predict, at a first time, e.g., a current time, an inner temperature change for a certain zone at a time, e.g., a future time after the first time with time series based on an inner environment for the certain zone and setting of a VRF system.

An embodiment of the disclosure provides a model of detecting a default zone-predicted temperature based on long short term memory (LSTM) based-time series data, and the model of detecting the default zone-predicted temperature based on the LSTM based-time series data is shown in FIG. 12.

The model of detecting the default zone-predicted temperature based on the LSTM based-time series data in an embodiment of the disclosure may detect the default zone-predicted temperature at a third time, e.g., a future time t+1 based on information from the first time, e.g., a past time t−h to a second time, e.g., a current time t, and may recursively predict a default zone-predicted temperature at a fourth time, e.g., a time t+h after the third time.

A server may predict, at the second time, e.g., a current time t, an indoor temperature at the third time, e.g., a future time t+1 based on information for each of a plurality of zones, N zones, e.g., a zone #1 to zone #N included in a default zone. Information for a certain zone may include an outdoor temperature of the certain zone from the first time, e.g., a past time t−h to the second time t, an indoor temperature of the certain zone from the first time t−h to the second time t, a set temperature of an indoor unit installed at the certain zone from the first time t−h to the second time t, an operation mode of the indoor unit installed at the certain zone from the first time t−h to the second time t, a fan speed of the indoor unit installed at the certain zone from the first time t−h to the second time t, and/or the like.

In this case, the information for each of the zone #1 to zone #N from the first time t−h to the second time t is provided as input of a model of detecting a default zone-predicted temperature based on LSTM based-time series data (1311), and the model of detecting the default zone-predicted temperature based on the LSTM based-time series data predicts an indoor temperature for each of the zone #1 to zone #N at the third time, e.g., future time t+1 based on information for each of the zone #1 to zone #N from the first time t−h to the second time t (1313). That is, past data of input is mapped to a recurrent part of the model of detecting the default zone-predicted temperature based the LSTM based-time series data, so LSTM based-time series data may be recursively output. In this case, the model of detecting the default zone-predicted temperature based on the LSTM based-time series data may be implemented with various schemes, and a detailed description for the schemes which implement the model of detecting the default zone-predicted temperature based on the LSTM based-time series data is omitted here.

The indoor temperature for each of the zone #1 to zone #N at the third time t+1 predicted by the model of detecting the default zone-predicted temperature based on the LSTM based-time series data is provided as output (1315). In this case, the output is the default zone-predicted temperature.

A server may predict an indoor temperature of each of a plurality of zones included in a default zone by considering mutual effect among the plurality of zones.

Figure 13:
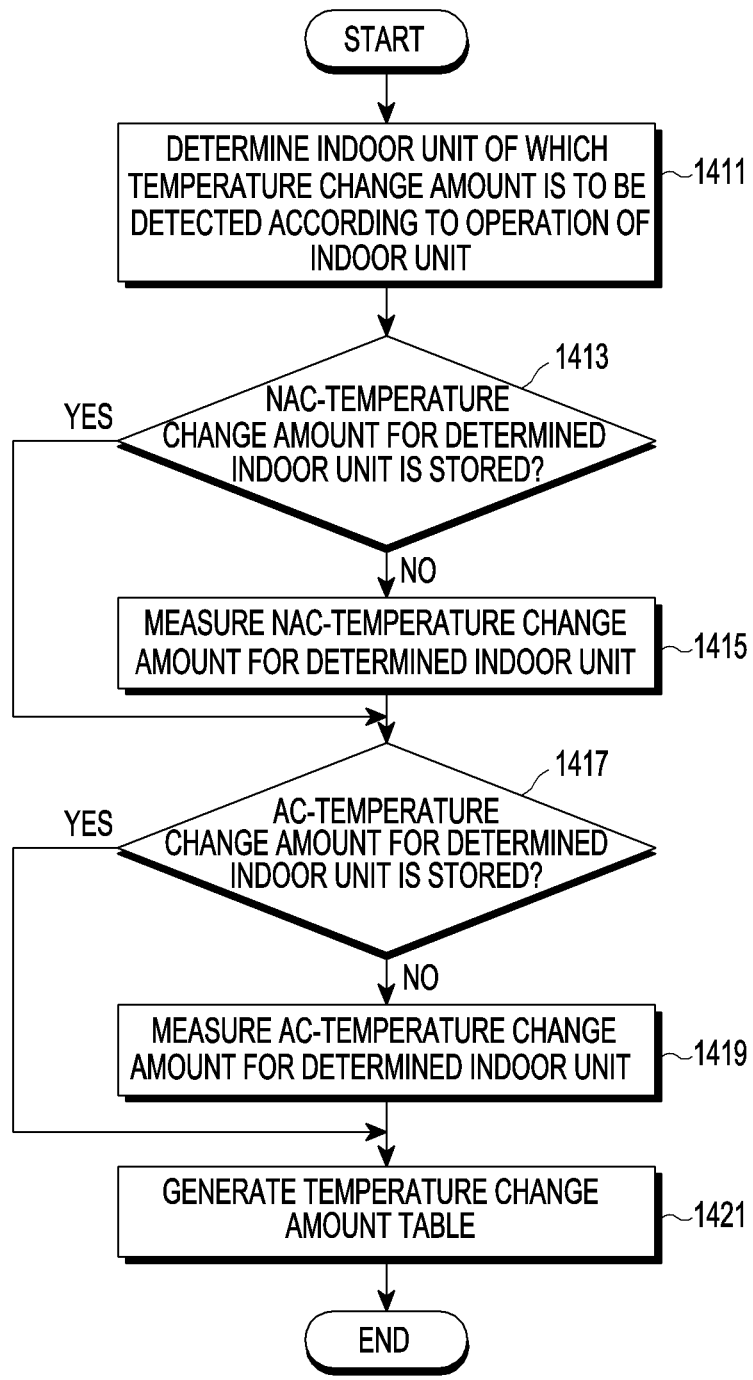
FIG. 13 is a flowchart of a method of detecting an indoor unit related-temperature change amount in a server in an air conditioning system according to an embodiment.

FIG. 13 is a flowchart of a method of detecting an indoor unit related-temperature change amount in a server in an air conditioning system according to an embodiment.

Referring to FIG. 13, the server may perform the method of detecting the indoor unit related-temperature change amount for each indoor unit installed at a default zone. In this case, an indoor unit related-temperature change amount includes a non-air conditioning (NAC)-temperature change amount (NAC-temperature change amount) as an indoor temperature change amount of a zone at which an indoor unit is installed during a preset time in a case where the indoor unit does not operate and an air conditioning (AC)-temperature change amount (AC-temperature change amount) as an indoor temperature change amount of the zone at which the indoor unit is installed during the preset time in a case where the indoor unit operates.

The server determines an indoor unit of which a temperature change amount according to an indoor unit operation will be detected among indoor units installed at a default zone at step 1411, and proceeds to step 1413. The server determines whether a NAC-temperature change amount for the determined indoor unit is stored at step 1413. In this case, the NAC-temperature change amount may be large, for example, at a certain zone, e.g., an outer wall of a building. If air conditioning is controlled by considering the NAC-temperature change amount, efficiency of an air conditioning-control operation may increase. For example, an effect according to an outdoor temperature may be significant at the outer wall of a building, so efficiency of an air conditioning-control operation may increase if a weight is given to cooling or heating the outer wall of the building. In an embodiment of the disclosure, a default zone-predicted temperature may be detected by considering a NAC-temperature change amount and an AC-temperature change amount. The NAC-temperature change amount may be $\Delta T_{in}$, and the AC-temperature change amount may be $\Delta T_{ac}$.

If the NAC-temperature change amount for the determined indoor unit is not stored, the server proceeds to step 1415. The server measures NAC-temperature change amount for the determined indoor unit at step 1415, and proceeds to step 1417. The server measures a temperature change amount of a zone at which the indoor unit is installed without operating the indoor unit during a preset time, and the measured temperature change amount is the NAC-temperature change amount for the indoor unit.

If the NAC-temperature change amount for the determined indoor unit is stored at step 1413, the server proceeds to step 1417. The server determines whether an AC-temperature change amount for the determined indoor unit is stored at step 1417. If the AC-temperature change amount for the determined indoor unit is stored, the server proceeds to step 1421.

If the AC-temperature change amount for the determined indoor unit is not stored at step 1417, the server proceeds to step 1419. The server measures AC-temperature change amount for the determined indoor unit at step 1419, and proceeds to step 1421. The server measures a temperature change amount of a zone at which the indoor unit is installed while operating the indoor unit during the preset time, and the measured temperature change amount is the AC-temperature change amount for the indoor unit. In this case, the air conditioning control-setting applied to all of the indoor units included in the default zone when the AC-temperature change amount is measured for each of all indoor units, i.e., air conditioning control-setting including a plurality of air conditioning control-setting parameters, e.g., a set temperature, an operation mode, a fan speed, a fan direction, and/or the like may be the same.

The server generates a temperature change amount table by mapping the NAC-temperature change amount and the AC-temperature change amount at step 1421. Thus, the server may detect a temperature change amount in a case where a corresponding indoor unit does not operate, i.e., a NAC-temperature change amount and a temperature change amount in a case where the corresponding indoor unit operates, i.e., an AC-temperature change amount, for all indoor units included in the default zone. The server may generate a temperature change weight per indoor unit based on the NAC-temperature change amount and the AC-temperature change amount for each of the indoor units, and perform an air conditioning-control operation by considering the temperature change weight. The temperature change weight is described below, and a detailed description thereof is omitted here.

Although FIG. 13 illustrates a method of detecting an indoor unit related-temperature change amount in a server in an air conditioning system according to an embodiment of the disclosure, various changes may be made to FIG. 13. For example, although shown as a series of operations, various operations in FIG. 13 may overlap, occur in parallel, occur in a different order, or occur multiple times.

Figure 14:
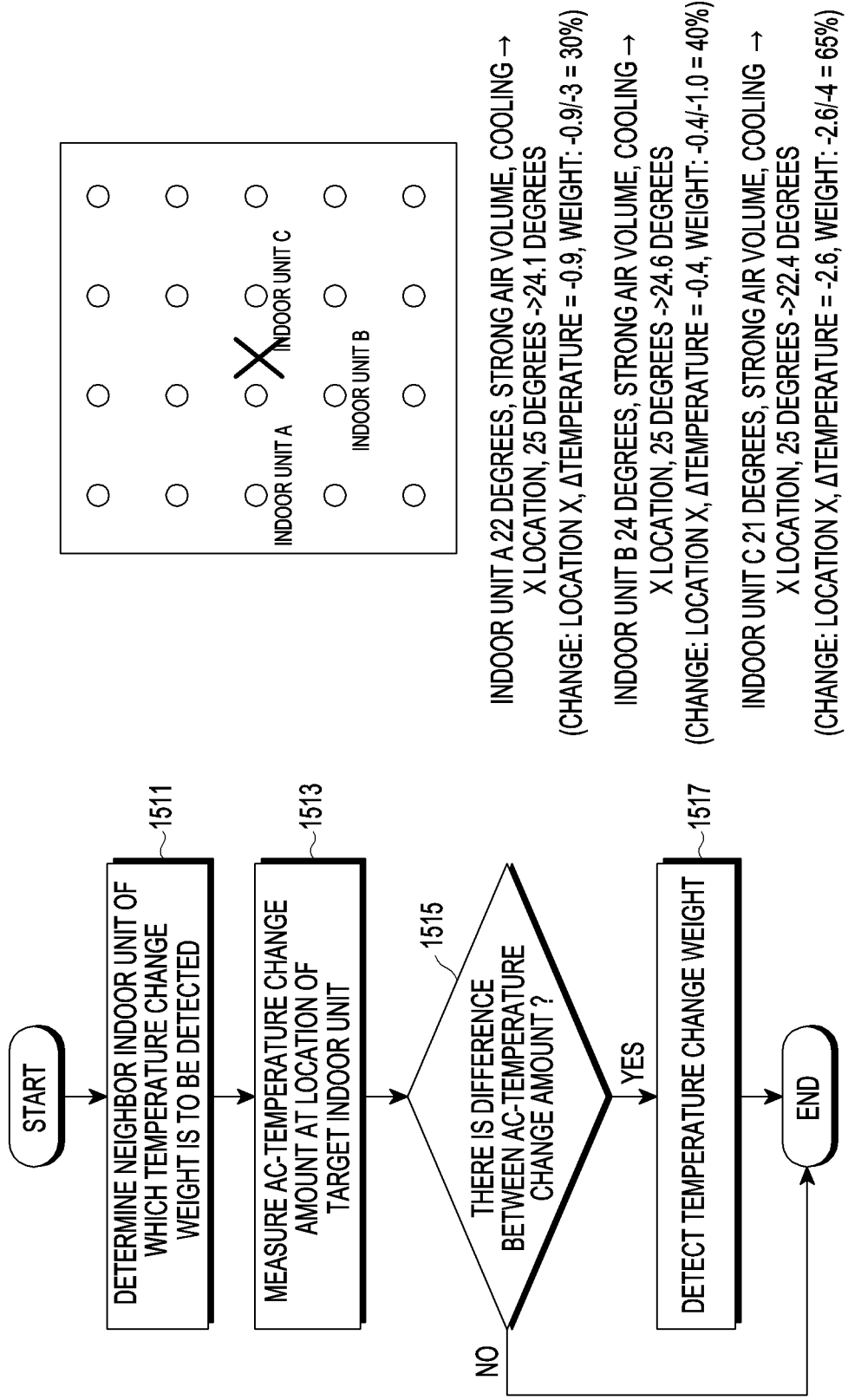
FIG. 14 is a flowchart and an illustration of a method of detecting a temperature change weight in a server in an air conditioning system according to an embodiment.

FIG. 14 is a flowchart and an illustration of a method of detecting a temperature change weight in a server in an air conditioning system according to an embodiment.

Referring to FIG. 14, the server may perform the method of detecting the temperature change weight for each indoor unit installed at a default zone.

The server determines a neighbor indoor unit for which a temperature change weight will be detected among indoor units installed at a default zone at step 1511, and proceeds to step 1513. An AC-temperature change amount for the determined neighbor indoor unit may be measured at a location at which a target indoor unit is installed, so the server changes control setting, i.e., the control setting including control setting parameters, e.g., a set temperature, an operation mode, a fan speed, a fan direction, and/or the like in the case where the AC-temperature change amount for the neighbor indoor unit is measured. The server may change a part of various control setting parameters included in the control setting. Alternatively, the server may change all of the various control setting parameters included in the control setting. The target indoor unit may be an indoor unit of which an air conditioning operation will be controlled, e.g., one of indoor units installed at air conditioning-control zone.

The server measures an AC-temperature change amount at a location of the target indoor unit for the determined neighbor indoor unit using the changed control setting at step 1513, and proceeds to step 1515. The server determines whether there is difference between the AC-temperature change amount for the neighbor indoor unit which is measured using the changed control setting and AC-temperature change amount for the neighbor indoor unit which has been measured already at step 1515. If there is a difference, the server proceeds to step 1517. The server detects a temperature change weight based on the difference at step 1517. The temperature change weight may be expressed as a ratio of a difference between the set temperature of the neighbor indoor unit and an indoor temperature which is targeted for a location at which the target indoor unit is installed to a difference between the indoor temperature which is targeted for the location at which the target indoor unit is installed and an indoor temperature which is practically measured at the location at which the target indoor unit is installed. That is, in an embodiment of the disclosure, a temperature change at a location at which a target indoor unit is installed may be considered according to an operation of a neighbor indoor unit based on a temperature change weight, where the temperature change weight is a value affecting the AC-temperature change amount, so a default zone-predicted temperature may be determined by considering the temperature change weight.

The temperature change weight may be measured based on a location at which a target indoor unit is installed, e.g., a location X.

If a changed set temperature of an indoor unit A is 22 degrees, an indoor temperature which targets the location X is 25 degrees, and an indoor temperature which is practically measured for the location X is 24.1 degrees, it will be understood that a temperature change weight of the indoor unit A is −0.9/−3=30%. If a changed set temperature of an indoor unit B is 24 degrees, an indoor temperature which targets the location X is 25 degrees, and an indoor temperature which is practically measured for the location X is 24.6 degrees, it will be understood that a temperature change weight of the indoor unit B is −0.4/−1=40%. If a changed set temperature of an indoor unit C is 21 degrees, an indoor temperature which targets the location X is 25 degrees, and an indoor temperature which is practically measured for the location X is 22.4 degrees, it will be understood that a temperature change weight of the indoor unit C is −2.6/−4=65%.

It will be understood that the higher the temperature change weight is, the greater the effect on AC-temperature change amount for a target indoor unit, thus the server may perform an air conditioning-control operation and detect a default zone-predicted temperature by considering the temperature change weight. Even though all control setting parameters may be the same, an indoor temperature may change rapidly according to a location at which an indoor unit is installed, e.g., a zone, so the server may perform an air conditioning-control operation and detect a default zone-predicted temperature by considering a temperature change weight. In this case, a zone such as an outer wall of a building, a window, a computer room, and/or the like may be a zone in which an indoor temperature changes rapidly even though all control setting parameters are the same.

An example of a method of detecting a temperature change weight in a server in an air conditioning system according to an embodiment of the disclosure is described above with reference to FIG. 14, and an example of a method of updating a temperature change amount table in a server in an air conditioning system according to an embodiment of the disclosure is described below with reference to FIG. 15.

Figure 15:
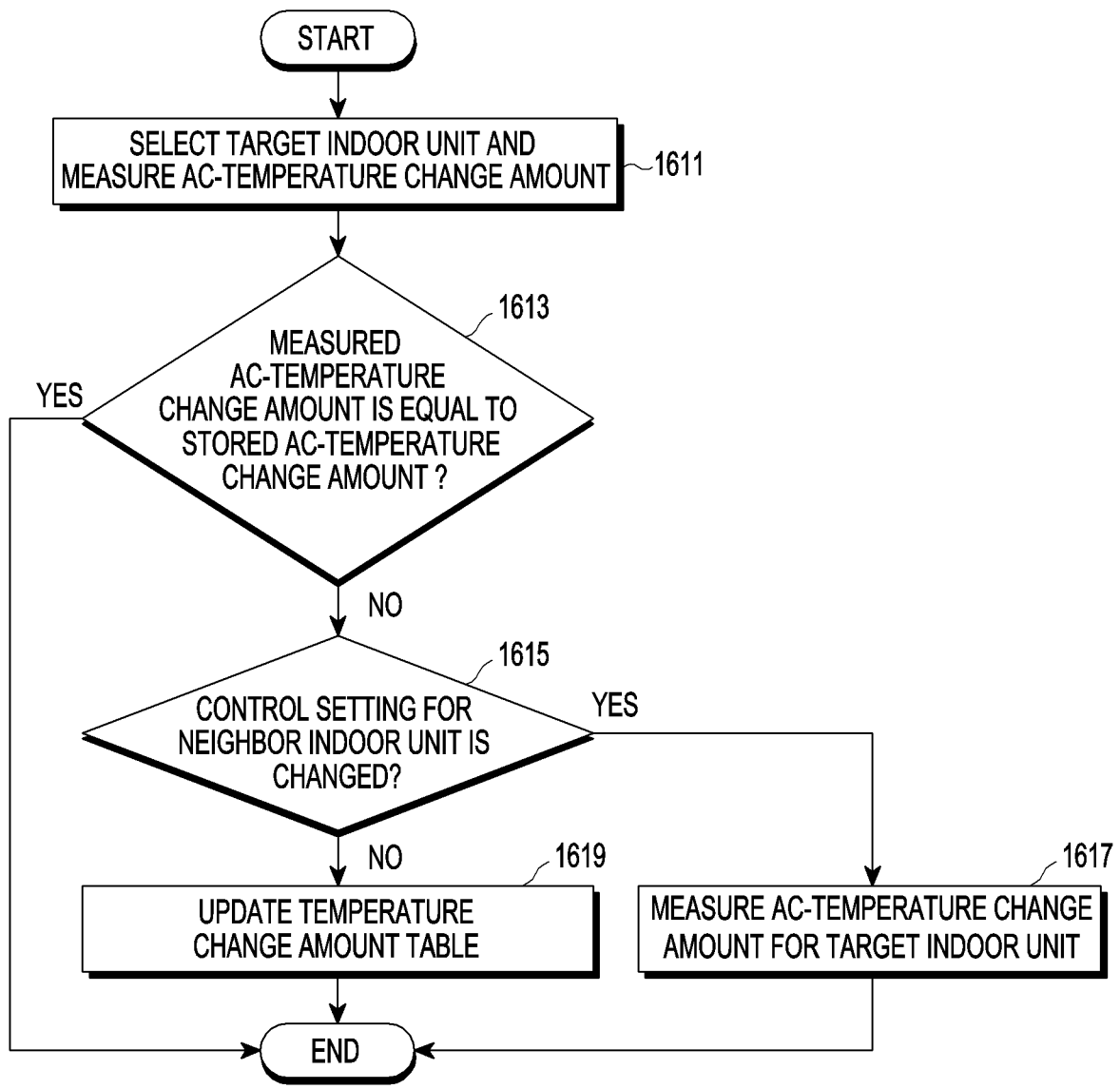
FIG. 15 is a flowchart of a method of updating a temperature change amount table in a server in an air conditioning system according to an embodiment.

FIG. 15 is a flowchart of a method of updating a temperature change amount table in a server in an air conditioning system according to an embodiment.

Referring to FIG. 15, the server may perform the method of updating the temperature change amount table for each indoor unit installed at a default zone.

The server selects a target indoor unit among indoor units included in a default zone, measures an AC-temperature change amount for the selected target indoor unit at step 1611, and proceeds to step 1613. The server measures the AC-temperature change amount for the target indoor unit by applying a control setting identical to a control setting for the target indoor unit stored at a temperature change amount table.

The server determines whether the measured AC-temperature change amount for the target indoor unit is equal to the stored AC-temperature change amount for the target indoor unit at step 1613. If the measured AC-temperature change amount for the target indoor unit is equal to the stored AC-temperature change amount for the target indoor unit, the server does not perform any operation and terminates the method.

If the measured AC-temperature change amount for the target indoor unit is not equal to the stored AC-temperature change amount for the target indoor unit at step 1613, the server proceeds to step 1615. Since the measured AC-temperature change amount for the target indoor unit is not equal to the stored AC-temperature change amount for the target indoor unit, the server determines whether a control setting for a neighbor indoor unit of the target indoor unit is changed at step 1615. If the control setting for the neighbor indoor unit is changed, the server proceeds to step 1617. The server measures an AC-temperature change amount for the target indoor unit by reflecting the changed control setting for the neighbor indoor unit at step 1617, and terminates the method.

If the control setting for the neighbor indoor unit is not changed at step 1615, the server proceeds to step 1619. The server records the measured AC-temperature change amount on the temperature change amount table to update the temperature change amount table at step 1619.

Although FIG. 15 illustrates a method of updating a temperature change amount table in a server in an air conditioning system according to an embodiment of the disclosure, various changes may be made to FIG. 15. For example, although shown as a series of operations, various operations in FIG. 15 may overlap, occur in parallel, occur in a different order, or occur multiple times.

Figure 16:
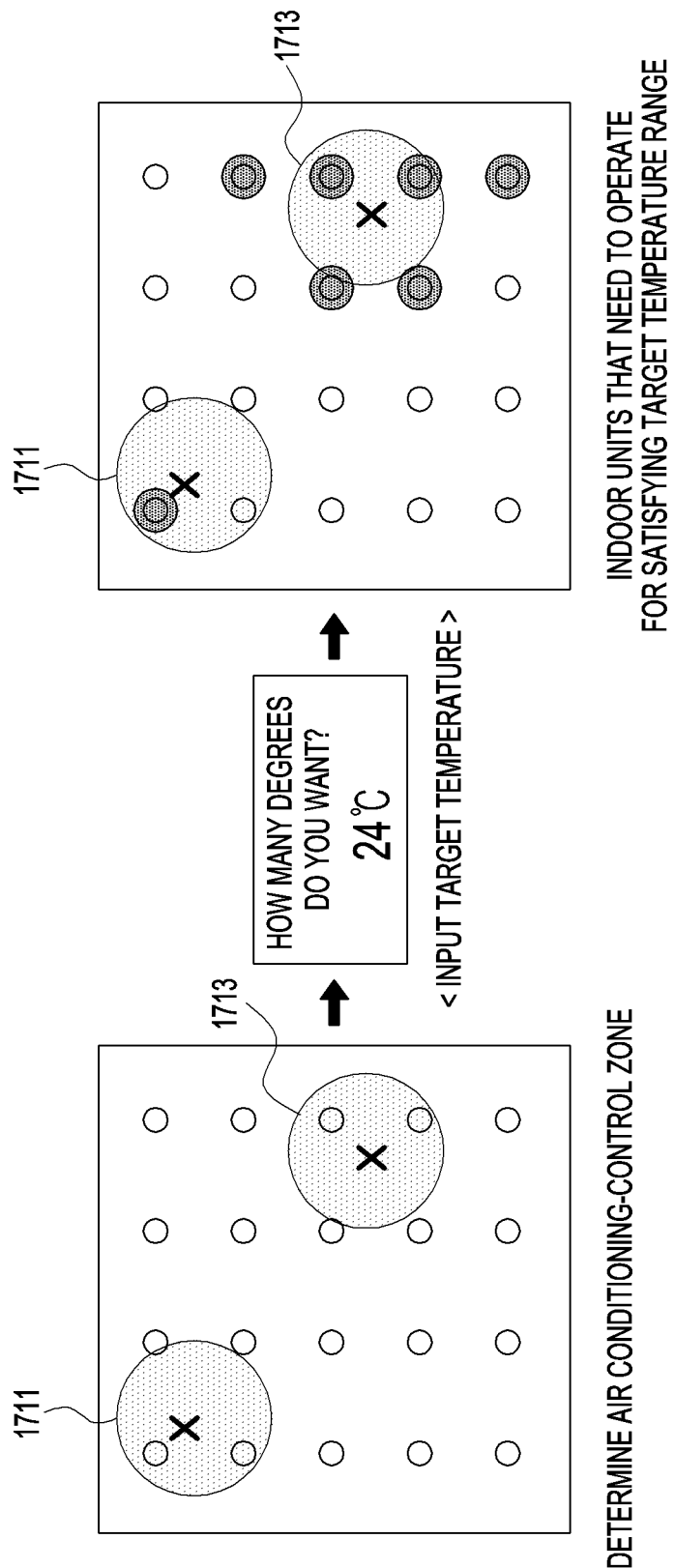
FIG. 16 is an illustration of a method of determining indoor units for satisfying a target temperature range of an air conditioning-control zone in a server in an air conditioning system according to an embodiment.

FIG. 16 is an illustration of a method of determining indoor units for satisfying a target temperature range of an air conditioning-control zone in a server in an air conditioning system according to an embodiment.

Referring to FIG. 16, the server may determine an air conditioning-control zone based on a user's location at a default zone, and/or the like, where two air conditioning-control zones 1711 and 1713 may be determined based on two users' locations. An operation of determining an air conditioning-control zone is described above, and a detailed description thereof is omitted here.

The server determines a target temperature range for each of the two air conditioning-control zones 1711 and 1713, and determines indoor units which must operate to satisfy the determined target temperature range. The number of indoor units which must operate to satisfy the target temperature range may be determined as a minimum number to reduce power consumption of the air conditioning system. However, there is no need to determine the number of indoor units that must operate to satisfy the target temperature range as the minimum number, and the number of indoor units which must operate to satisfy the target temperature range may vary according to a situation.

In a case where the target temperature range for each of the two air conditioning-control zones 1711 and 1713 is determined as a certain temperature, e.g., 24 degrees, the server may determine to operate one indoor unit for the air conditioning-control zone 1711 and to operate six indoor units for the air conditioning-control zone 1713 as illustrated in FIG. 16. As described above with reference to FIGS. 13 to 15, the server may detect an indoor unit related-temperature change amount, i.e., an NAC-temperature change amount and an AC-temperature change amount, and a temperature change weight for each indoor unit installed at the default zone. Thus, the server may detect indoor units which must operate to satisfy a target temperature range, e.g., a comfortable temperature range, for each of the air conditioning-control zones 1711 and 1713 based on the NAC-temperature change amount, the AC-temperature change amount, and the temperature change weight for each of all indoor units installed at the default zone.

Figure 17:
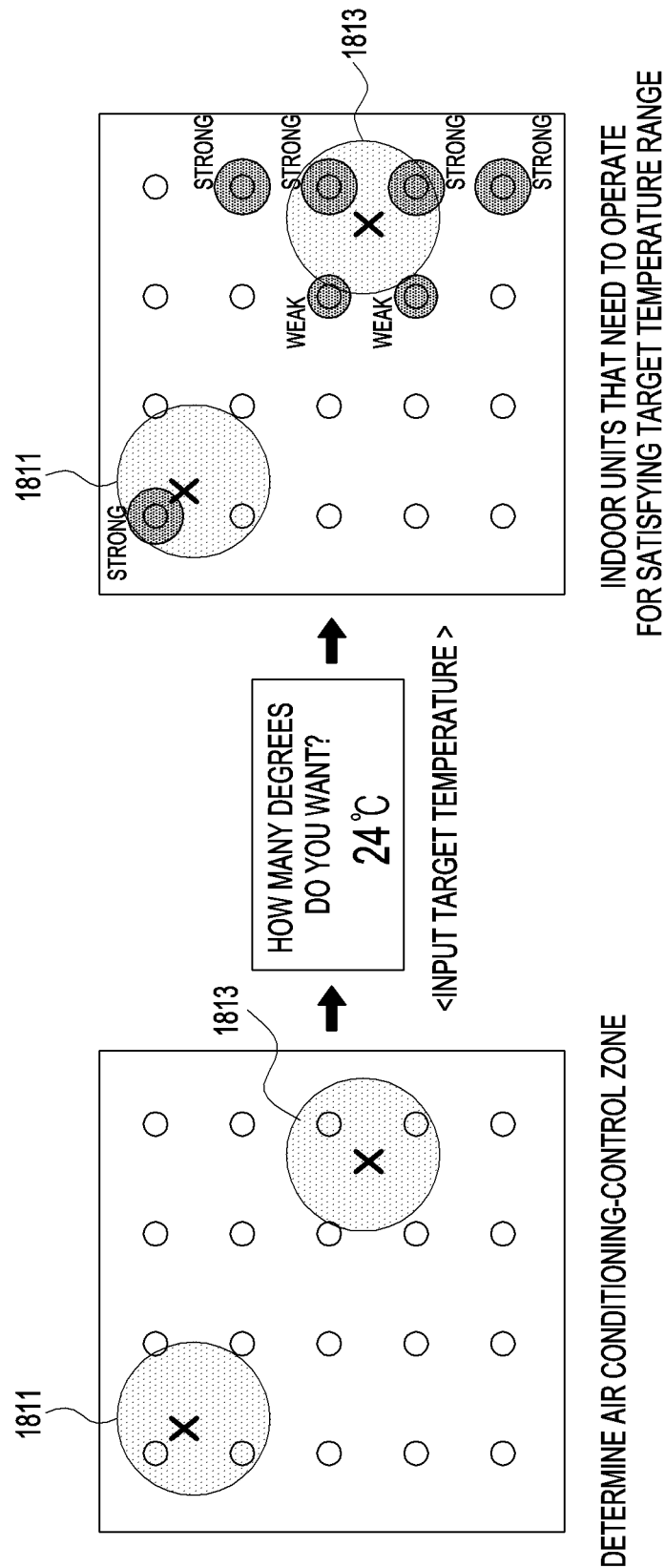
FIG. 17 is an illustration of a method of determining indoor units for satisfying a target temperature range of an air conditioning-control zone in a server in an air conditioning system according to an embodiment.

FIG. 17 is an illustration of a method of determining indoor units for satisfying a target temperature range of an air conditioning-control zone in a server in an air conditioning system according to an embodiment.

Referring to FIG. 17, the server may determine an air conditioning-control zone based on a user's location at a default zone, and/or the like, where the two air conditioning-control zones 1811 and 1813 may be determined based on two users' locations. An operation of determining an air conditioning-control zone is described above, and a detailed description thereof is omitted here.

The server determines a target temperature range for each of the two air conditioning-control zones 1811 and 1813, and determines indoor units which must operate to satisfy the determined target temperature range and air volume thereof. The number of indoor units which must operate to satisfy the target temperature range may be determined as a minimum number for reducing power consumption of the air conditioning system. However, there is no need for determining the number of indoor units which must operate to satisfy the target temperature range as the minimum number, and the number of indoor units which must operate to satisfy the target temperature range may vary according to a situation.

In a case where the target temperature range for each of the two air conditioning-control zones 1811 and 1813 is determined as a certain temperature, e.g., 24 degrees, the server may determine to operate one indoor unit for the air conditioning-control zone 1811 and determine to operate six indoor units for the air conditioning-control zone 1813 as illustrated in FIG. 17. Further, the server may determine air volume of the one indoor unit which must operate to satisfy the target temperature range for the air conditioning-control zone 1811 as "strong", air volume of two of the six indoor units which must operate to satisfy the target temperature range for the air conditioning-control zone 1813 as "weak", and air volume of four of the six indoor units which must operate to satisfy the target temperature range as "strong" as illustrated in FIG. 17.

As described above with reference to FIGS. 13 to 15, the server may detect indoor unit related-temperature change amount, i.e., an NAC-temperature change amount, an AC-temperature change amount, and a temperature change weight for each indoor unit installed at the default zone. Thus, the server may determine indoor units which must operate to satisfy a target temperature range, e.g., a comfortable temperature range, for each of the air conditioning-control zones 1811 and 1813 and an air volume thereof based on the NAC-temperature change amount, the AC-temperature change amount, and the temperature change weight for each indoor unit installed at the default zone.

Figure 18:
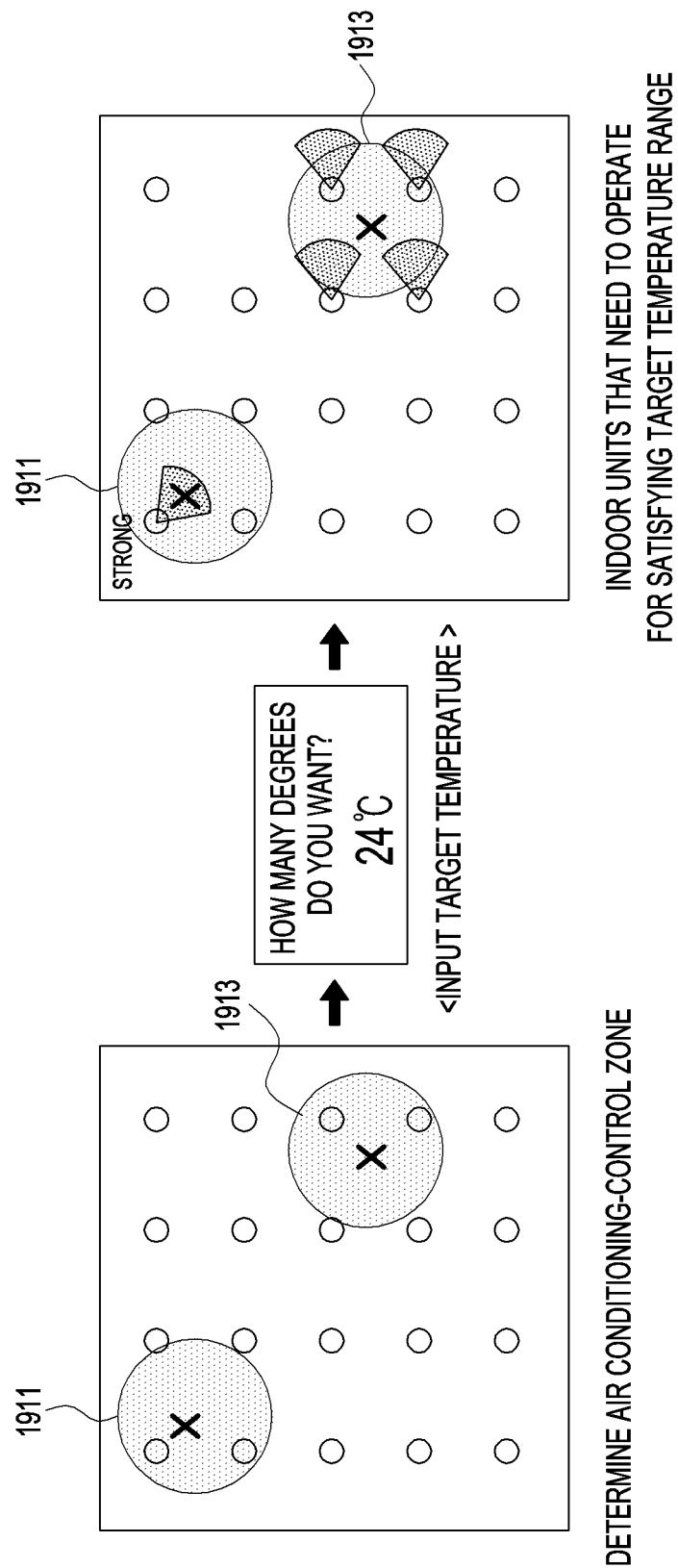
FIG. 18 is an illustration of a method of determining indoor units for satisfying a target temperature range of an air conditioning-control zone in a server in an air conditioning system according to an embodiment.

FIG. 18 is an illustration of a method of determining indoor units for satisfying a target temperature range of an air conditioning-control zone in a server in an air conditioning system according to an embodiment.

Referring to FIG. 18, the server may determine an air conditioning-control zone based on a user's location at a default zone, and/or the like, where the two air conditioning-control zones 1911 and 1913 may be determined based on two users' locations. An operation of determining an air conditioning-control zone is described above, and a detailed description thereof is omitted here.

The server determines a target temperature range for each of the two air conditioning-control zones 1911 and 1913, and determines indoor units which must operate to satisfy the determined target temperature range and wind directions thereof. The number of indoor units which must operate to satisfy the target temperature range may be determined as a minimum number to reduce power consumption of the air conditioning system. However, there is no need for determining the number of indoor units which must operate to satisfy the target temperature range as a minimum number, and the number of indoor units which must operate to satisfy the target temperature range may be vary according to a situation.

In a case where the target temperature range for each of the two air conditioning-control zones 1911 and 1913 is determined as a certain temperature, e.g., 24 degrees, the server may determine to operate one indoor unit for the air conditioning-control zone 1911 and determine to operate four indoor units for the air conditioning-control zone 1913 as illustrated in FIG. 18. Further, the server may determine a wind direction of the one indoor unit which must operate to satisfy the target temperature range for the air conditioning-control zone 1911 as "135 degrees", and determine wind directions of the four indoor units which must operate to satisfy the target temperature range for the air conditioning-control zone 1913 as "95 degrees" is illustrated as in FIG. 18.

As described above with reference to FIGS. 13 to 15, the server may detect indoor unit related-temperature change amount, i.e., an NAC-temperature change amount, an AC-temperature change amount, and a temperature change weight for each indoor unit installed at the default zone. Thus, the server may determine indoor units which must operate to satisfy a target temperature range, e.g., a comfortable temperature range, for each of the air conditioning-control zones 1911 and 1913 and wind directions thereof based on the NAC-temperature change amount, the AC-temperature change amount, and the temperature change weight for each indoor unit installed at the default zone.

Figure 19:
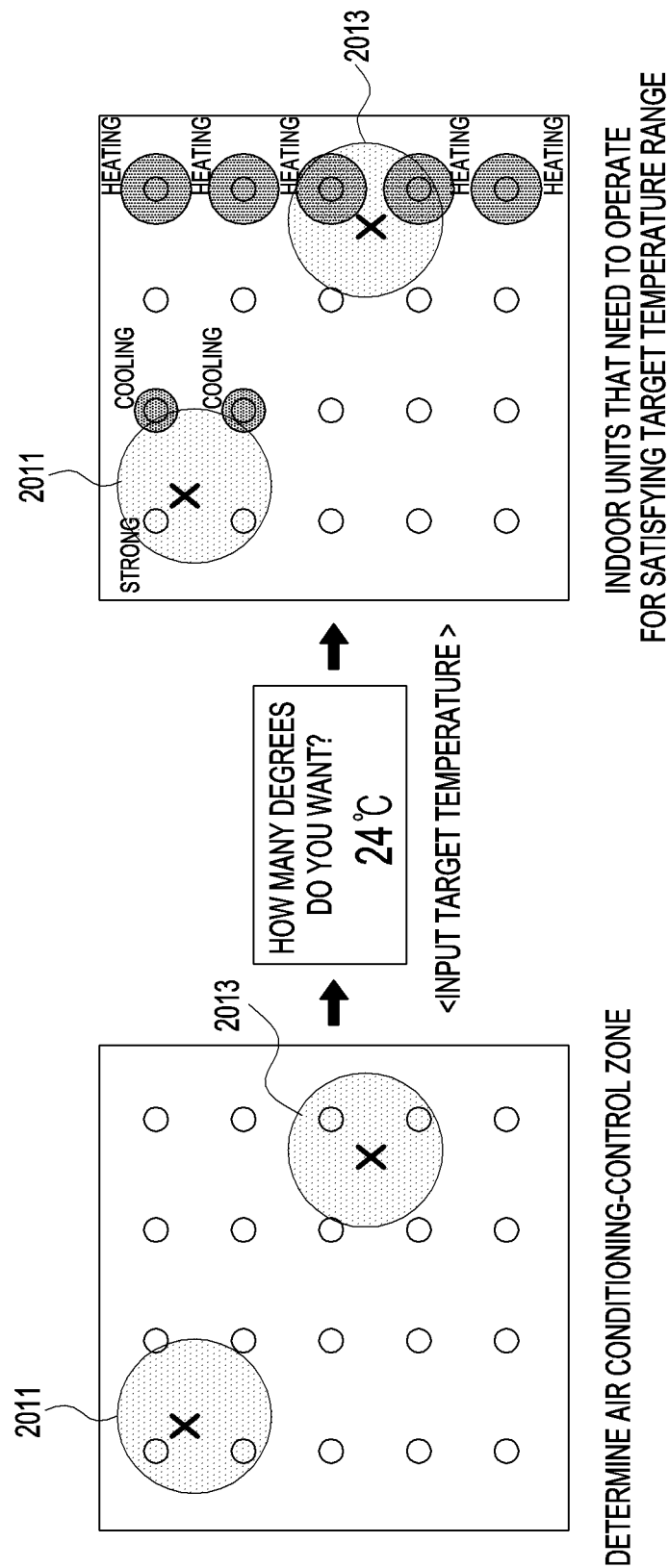
FIG. 19 is an illustration of a method of determining indoor units for satisfying a target temperature range of an air conditioning-control zone in a server in an air conditioning system according to an embodiment.

FIG. 19 is an illustration of a method of determining indoor units for satisfying a target temperature range of an air conditioning-control zone in a server in an air conditioning system according to an embodiment.

Referring to FIG. 19, the server may determine an air conditioning-control zone based on a user's location at a default zone, and/or the like, where the two air conditioning-control zones 2011 and 2013 may be determined based on two users' locations. An operation of determining an air conditioning-control zone is described above, and a detailed description thereof is omitted here.

The server determines a target temperature range for each of the two air conditioning-control zones 2011 and 2013, and determines indoor units which must operate to satisfy the determined target temperature range and operation modes thereof. The number of indoor units which must operate to satisfy the target temperature range may be determined as a minimum number to reduce power consumption of the air conditioning system. However, there is no need for determining the number of indoor units which must operate to satisfy the target temperature range as a minimum number, and the number of indoor units which must operate to satisfy the target temperature range may vary according to a situation.

In a case where the target temperature range for each of the two air conditioning-control zones 2011 and 2013 is determined as a certain temperature, e.g., 24 degrees, the server may determine to operate two indoor units for the air conditioning-control zone 2011 and determine to operate five indoor units for the air conditioning-control zone 2013 as illustrated in FIG. 19. Further, the server may determine an operation mode of the one indoor unit must operate to satisfy the target temperature range for the air conditioning-control zone 2011 as "cooling mode", and determine operation modes of the five indoor units which must operate to satisfy the target temperature range for the air conditioning-control zone 2013 as "heating mode" as illustrated in FIG. 19.

As described above with reference to FIGS. 13 to 15, the server may detect an indoor unit related-temperature change amount, i.e., an NAC-temperature change amount, an AC-temperature change amount, and a temperature change weight for each indoor unit installed at the default zone. Thus, the server may determine indoor units which must operate to satisfy a target temperature range, e.g., a comfortable temperature range, for each of the air conditioning-control zones 2011 and 2013 and operation modes thereof based on the NAC-temperature change amount, the AC-temperature change amount, and the temperature change weight for each indoor unit installed at the default zone.

Figure 20:
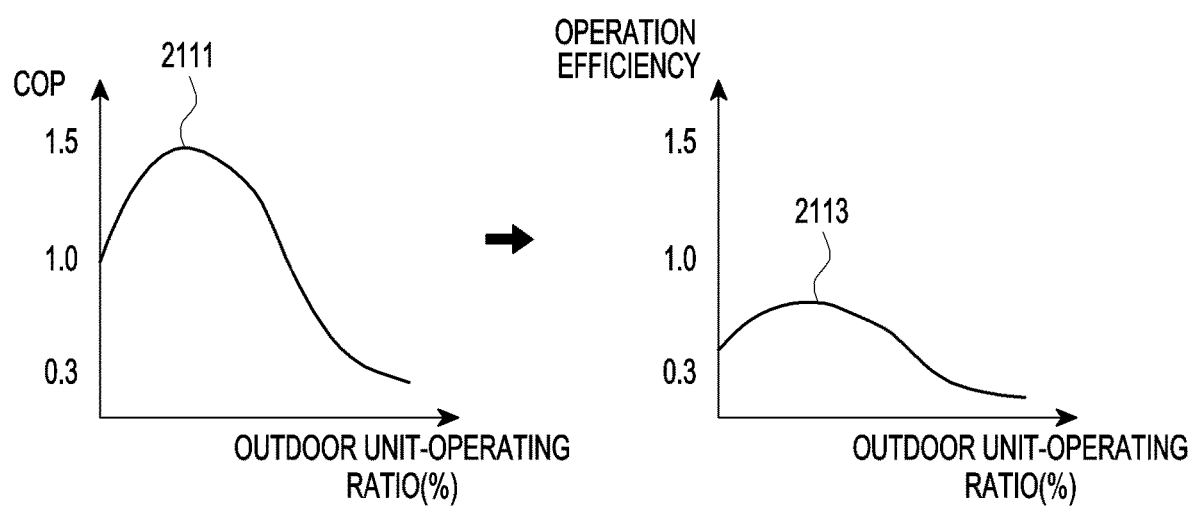
FIG. 20 is a chart of a method of predicting outdoor unit-operation efficiency in a server in an air conditioning system according to an embodiment.

FIG. 20 is an illustration of a method of predicting outdoor unit-operation efficiency in a server in an air conditioning system according to an embodiment.

Referring to FIG. 20, a server determines an operation efficiency of an outdoor unit, and the operation efficiency of the outdoor unit may be expressed as Equation (2).

$$\text{Operation efficiency } (t) = a*COP(t)+b = \frac{\begin{vmatrix} NAC\text{-temperature change amount} - \\ AC\text{-temperature change amount} \end{vmatrix}}{\text{cosumed power amount}} \quad (2)$$

In Equation (2) above, t is an index indicating time, COP denotes a coefficient of performance, and each of a and b denotes a constant. The COP may be expressed as Equation (3).

$$COP = \frac{\text{Energy Out}}{\text{Energy In}} = \frac{\text{generated cooling/heating energy}}{\text{consumed power amount}} \quad (3)$$

As expressed in Equation (2) above, the operation efficiency of the outdoor unit may be obtained by multiplying a constant by the COP or adding the constant to the COP.

Further, the operation efficiency of the outdoor unit may be determined as a ratio of power consumed at the outdoor unit during a preset time to a difference between an NAC-temperature change amount and an AC-temperature change amount of all indoor units connected to the outdoor unit during the preset time.

As shown in FIG. 20, it will be understood that an outdoor unit-operation efficiency graph 2113 has a form similar to a COP graph 2111. Thus, a server may enhance performance by considering outdoor unit-operation efficiency upon performing an air conditioning-control operation for an air conditioning-control zone.

Figure 21:
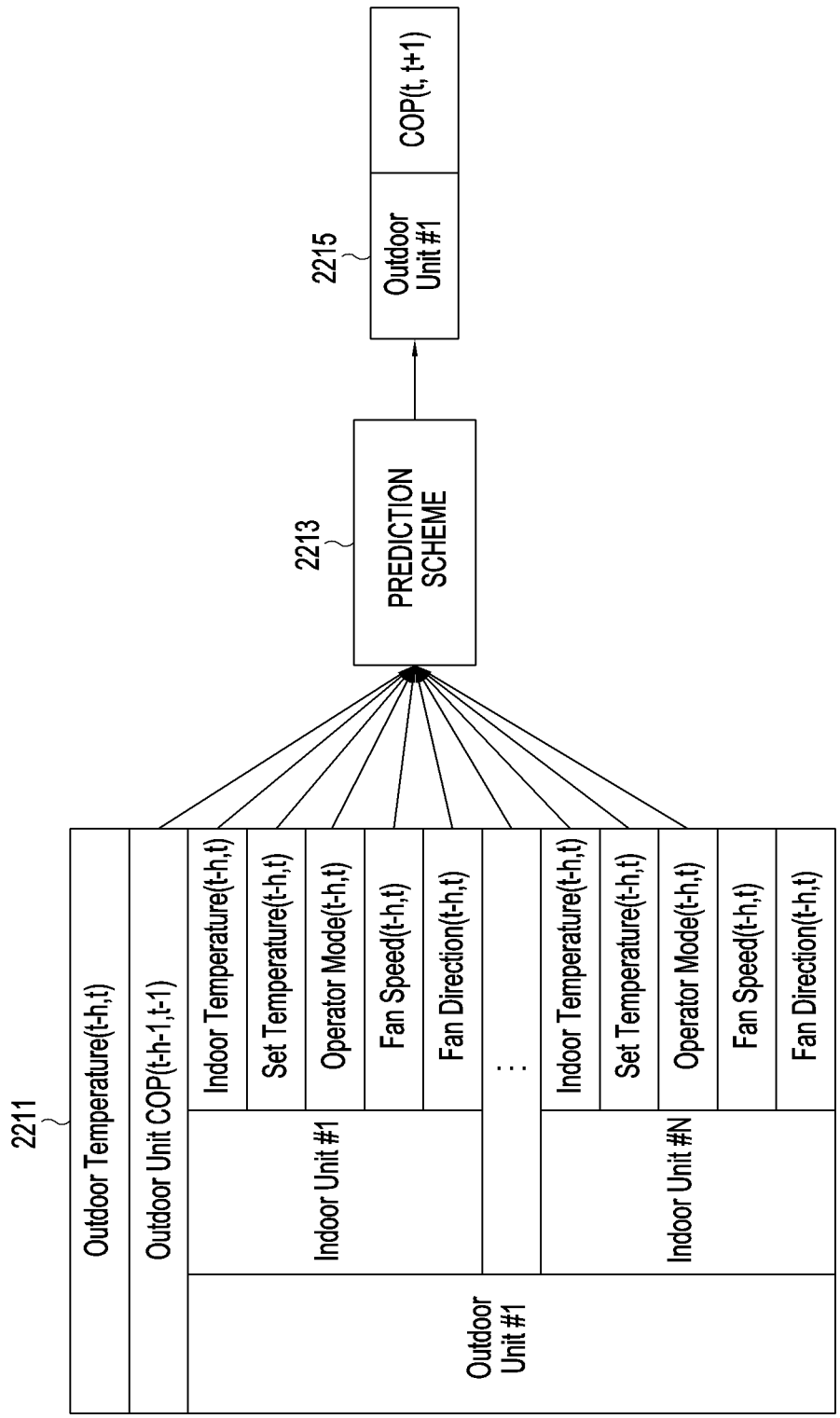
FIG. 21 is an illustration of a method of predicting outdoor unit-operation efficiency in a server in an air conditioning system according to an embodiment.

FIG. 21 is an illustration of a method of predicting outdoor unit-operation efficiency in a server in an air conditioning system according to an embodiment.

Referring to FIG. 21, it is undesirable to use a COP at a time at which an outdoor unit is shipped, and the reason is why the COP of the outdoor unit changes according to an install environment of the outdoor unit, e.g., a characteristic of a zone at which the outdoor unit is installed, a climate of the zone at which the outdoor unit is installed, a location of the zone at which the outdoor unit is installed, and/or the like, a degree by which the outdoor unit has aged, control setting of indoor units connected to the outdoor unit, and/or the like. Thus, the server must predict a real-time COP, and the reason why the server predicts the real-time COP is that the COP of the outdoor unit has a relation with operation efficiency of the outdoor unit as described above with reference to FIG. 20. Thus, the server may predict a real-time operation efficiency of the outdoor unit upon predicting a real-time COP of the outdoor unit.

In an embodiment of the disclosure, a server predicts operation efficiency of an outdoor unit for maintaining a comfortable temperature range for an air conditioning-control zone. As shown in FIG. 21, the server predicts a COP of an outdoor unit related to the air conditioning-control zone at time at which an air conditioning-control operation is performed, at e.g., a first time, e.g., at t.

As shown in FIG. 21, the server may predict, for each of indoor units connected to the outdoor unit, e.g., an indoor unit #1 to an indoor unit #N at the first time, the COP of the outdoor unit at a time after the first time, e.g., a second time, e.g., t+1 by considering an outdoor temperature for a zone at which a corresponding indoor unit is installed, a previous COP for the outdoor unit, an indoor temperature of the zone at which the corresponding indoor unit is installed, a set temperature for the corresponding indoor unit, an operation mode of the corresponding indoor unit, a fan speed of the corresponding indoor unit, and/or the like. The operation mode may include a cooling mode, a heating mode, a fan mode, a dehumidification mode, and/or the like. The previous COP denotes a COP from time before the first time, e.g., a third time, e.g., t−h−1 to a fourth time as a time before the first time and after the third time, e.g., t−1.

The outdoor temperature for the zone at which the corresponding indoor unit is installed denotes an outdoor temperature from t−h to t for the zone at which the corresponding indoor unit is installed, the indoor temperature for the zone at which the corresponding indoor unit is installed denotes an indoor temperature from t−h to t for the zone at which the corresponding indoor unit is installed, the set temperature for the corresponding indoor unit denotes a set temperature from t−h to t for the corresponding indoor unit, the operation mode for the corresponding indoor unit denotes an operation mode from t−h to t for the corresponding indoor unit, and the fan speed for the corresponding indoor unit denotes a fan speed from t−h to t for the corresponding indoor unit.

The server inputs, at t, various COP related-parameters such as an outdoor temperature, an indoor temperature, a set temperature, an operation mode, a fan speed, a previous COP, and/or the like from t−h to t for each of indoor units connected to the outdoor unit (2211), and may predict a COP at t+1 for the outdoor unit based on a preset prediction scheme (2213) thereby detecting operation efficiency of the outdoor unit (2215). The server may detect operation efficiency of the outdoor unit based on Equation (2), the prediction scheme may be implemented with various forms, and will be described below, so a detailed description thereof will be omitted herein.

Figure 22A:
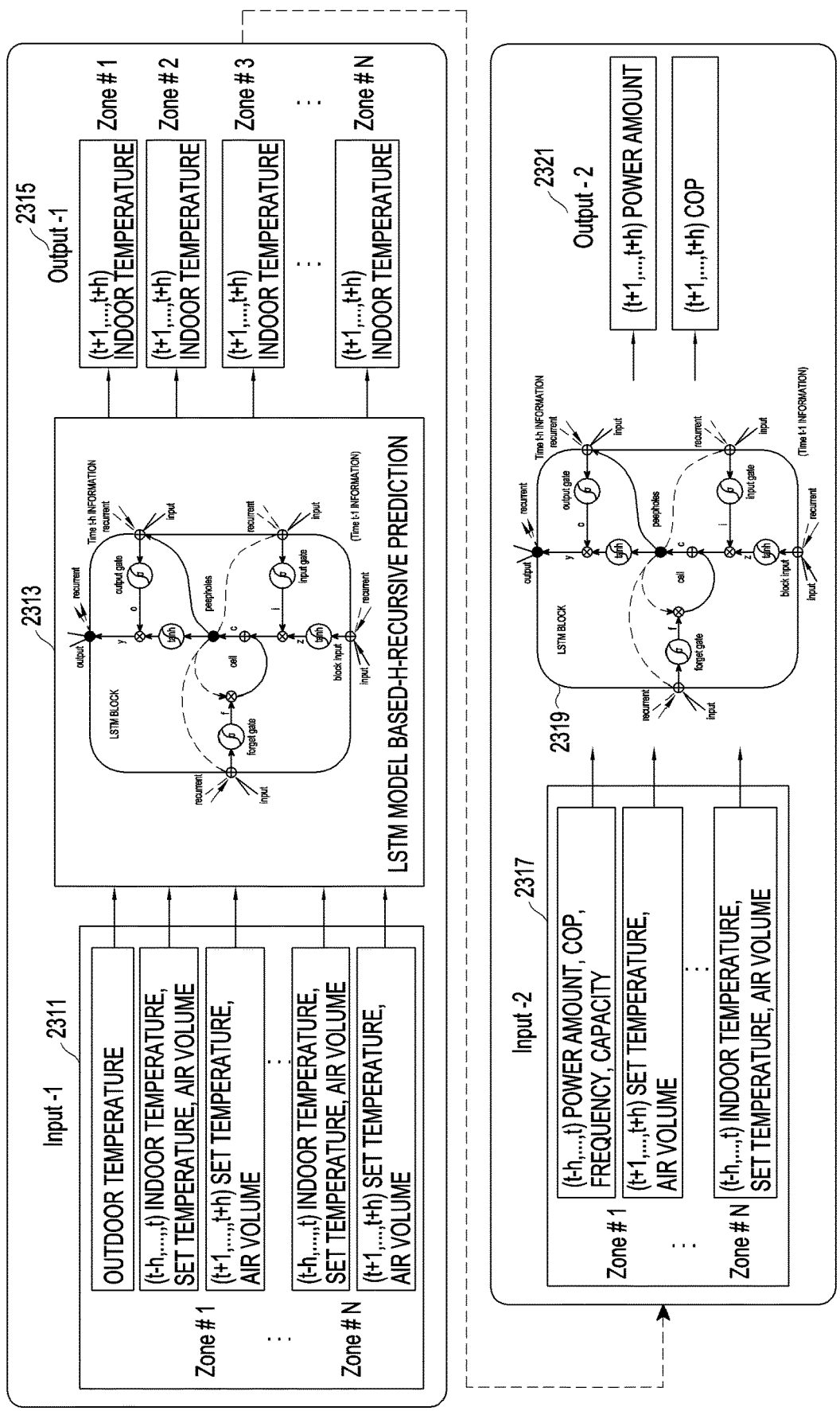
FIGS. 22A and 22B are illustrations of a method of predicting outdoor unit-operation efficiency in a server in an air conditioning system according to an embodiment.
Figure 22B:
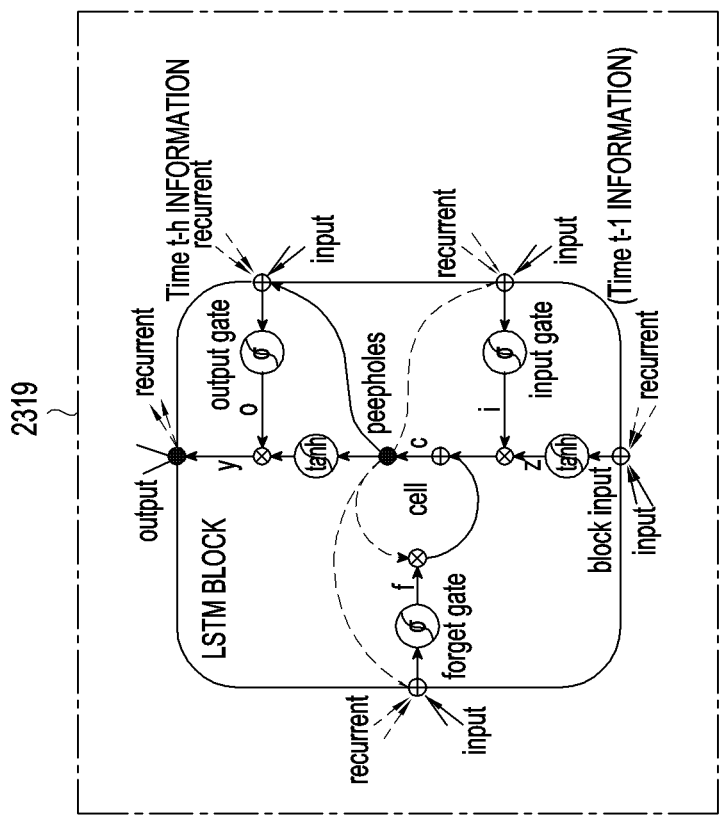
Figure 22B:
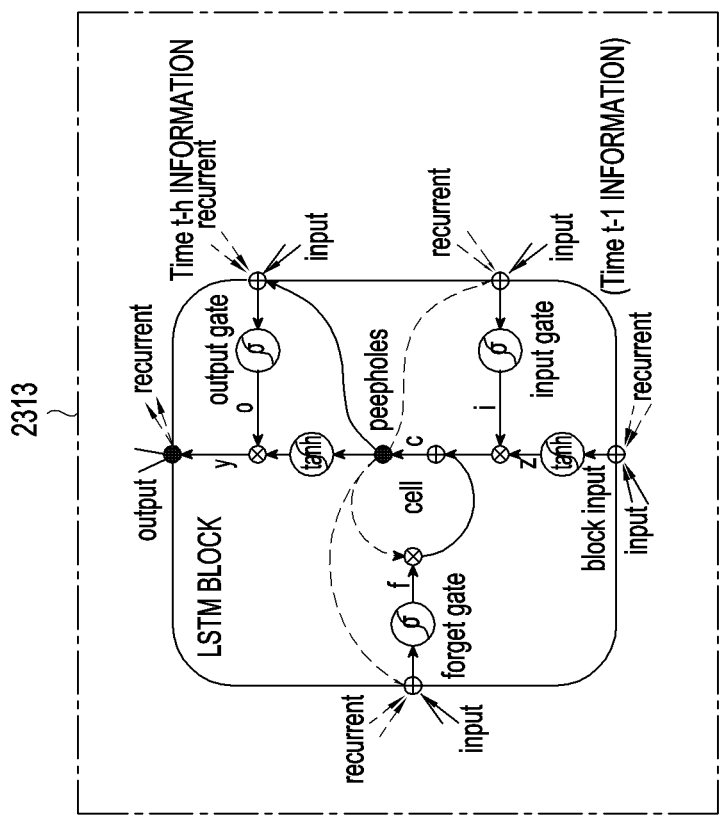

FIGS. 22A and 22B are illustrations of a method of predicting outdoor unit-operation efficiency in a server in an air conditioning system according to an embodiment.

Referring to FIGS. 22A and 22B, there is a need for modeling an effect according to all indoor units connected to an outdoor unit with time series data for predicting operation efficiency of an outdoor unit. In an embodiment of the disclosure, a server may input a temperature varied during a preset time to predict consumed power and a COP of the outdoor unit, and predict an operation efficiency of the outdoor unit based on the predicted COP.

In an embodiment of the disclosure a model of predicting consumed power and a COP of an outdoor unit based on LSTM based-time series data is provided, where the model of predicting the consumed power amount and the COP of the outdoor unit based on the LSTM based-time series data is illustrated in FIGS. 22A and 22B.

The model of predicting the consumed power amount and the COP of the outdoor unit based on the LSTM based-time series data in an embodiment of the disclosure may predict consumed power and a COP of the outdoor unit at a third time, e.g., a future time t+1 based on information from a first time, e.g., a past time t−h to a second time, e.g., a current time t, and may recursively predict consumed power and a COP of the outdoor unit at a fourth time, e.g., a time t+h after the third time.

A server may predict, at the second time, e.g., a current time t, an indoor temperature at the third time, e.g., a future time t+1 based on information for each of a plurality of zones, e.g., N zones, e.g., a zone #1 to zone #N included in a default zone. Information for a certain zone may include an outdoor temperature of the certain zone from the first time, e.g., a past time t−h to a second time t, an indoor temperature of the certain zone from the first time t−h to the second time t, a set temperature of an indoor unit installed at the certain zone from the first time t−h to the second time t, air volume of the indoor unit installed at the certain zone from the first time t−h to the second time t, and/or the like.

Information for each of the zone #1 to zone #N from the first time t−h to the second time t is provided as input of a model of detecting a default zone-predicted temperature based on LSTM based-time series data (2311), and the model of detecting the default zone-predicted temperature based on the LSTM based-time series data predicts an indoor temperature for each of the zone #1 to zone #N at the third time, e.g., a future time t+1 based on the information for each of the zone #1 to zone #N from the first time t−h to the second time t (2313). That is, past data of input is mapped to a recurrent part of the model of detecting the default zone-predicted temperature based the LSTM based-time series data, so LSTM based-time series data may be recursively output. In this case, the model of detecting the default zone-predicted temperature based on the LSTM based-time series data may be implemented with various schemes, and a detailed description for the schemes which implement the model of detecting the default zone-predicted temperature based on the LSTM based-time series data is omitted here.

The indoor temperature for each of the zone #1 to zone #N at the third time t+1 predicted by the model of detecting the default zone-predicted temperature based on the LSTM based-time series data is provided as output (2315). In this case, the output is the default zone-predicted temperature.

The default zone-predicted temperature is provided as input of a model of detecting a default zone-predicted temperature based on LSTM based-time series data (2317), and the model of detecting the default zone-predicted temperature based on the LSTM based-time series data predicts an indoor temperature for each of the zone #1 to zone #N at the third time, e.g., a future time t+1 based on the information for each of the zone #1 to zone #N from the first time t−h to the second time t (2319). That is, future data of input is mapped to a recurrent part of the model of detecting the default zone-predicted temperature based the LSTM based-time series data, so LSTM based-time series data may be recursively output. In this case, the model of detecting the default zone-predicted temperature based on the LSTM based-time series data may be implemented with various schemes, and a detailed description for the schemes which implement the model of detecting the default zone-predicted temperature based on the LSTM based-time series data is omitted here.

The indoor temperature for each of the zone #1 to zone #N at the third time t+1 predicted by the model of detecting the default zone-predicted temperature based on the LSTM based-time series data is provided as output (2321). In this case, the output is the default zone-predicted temperature. That is, if outdoor unit-operation efficiency is predicted as described above with reference to FIGS. 22A and 22B, the outdoor unit-operation efficiency may be predicted by considering predicted temperatures for a plurality of zones along with the plurality of zones, thus performance of an air conditioning-control operation may be enhanced.

Figure 23:
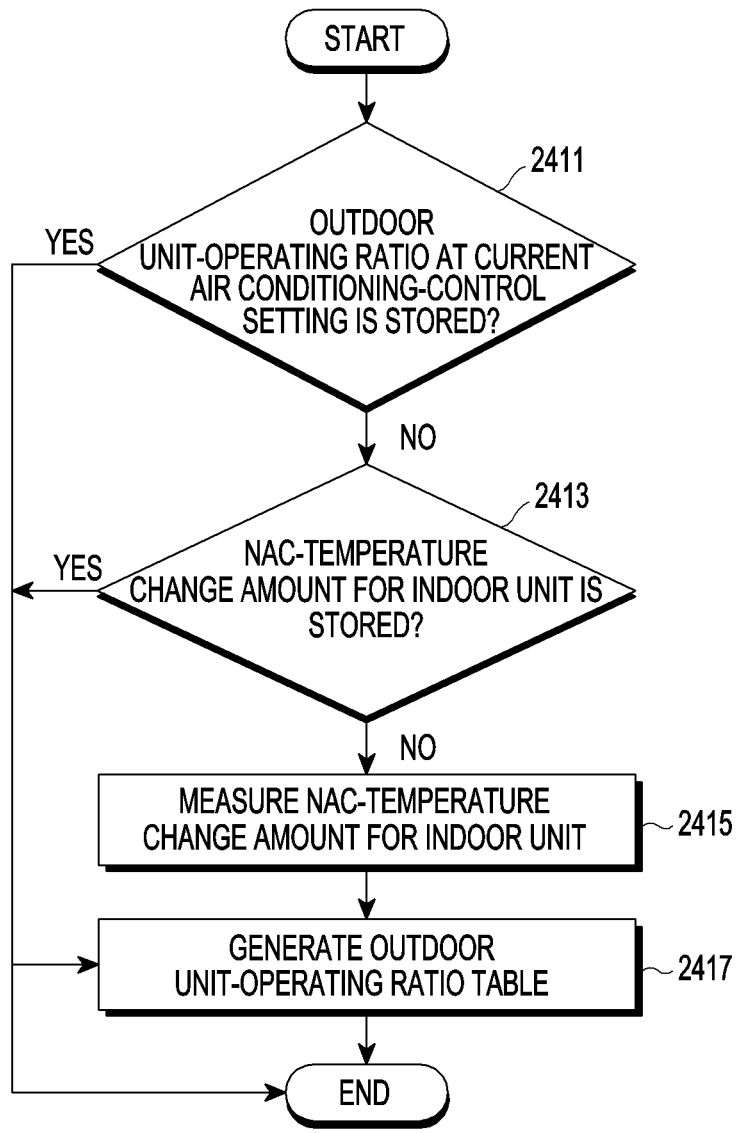
FIG. 23 is a flowchart of a method of predicting outdoor unit-operation efficiency in a server in an air conditioning system according to an embodiment.

FIG. 23 is a flowchart of a method of predicting outdoor unit-operation efficiency in a server in an air conditioning system according to an embodiment.

Referring to FIG. 23, the server may detect an outdoor unit-operating ratio at which the server may operate with high efficiency and detect indoor unit-control setting close to the detected outdoor unit-operating ratio to perform an air conditioning-control operation for an air conditioning-control zone. The server may perform a method of predicting outdoor unit-operation efficiency as shown in FIG. 23 for each of indoor units connected to an outdoor unit.

The server may determine whether an outdoor unit-operating ratio at current air conditioning-control setting for an indoor unit is stored at step 2411. In this case, the air conditioning-control setting may include a plurality of air conditioning-control setting parameters, e.g., a set temperature, an operation mode, a fan speed, a fan direction, and/or the like. If the outdoor unit-operating ratio at the current air conditioning-control setting for the indoor unit is stored, the server proceeds to step 2417.

If the outdoor unit-operating ratio at the current air conditioning-control setting for the indoor unit is not stored at step 2411, the server proceeds to step 2413. The server determines whether an NAC-temperature change amount for the indoor unit is stored at step 2413. If the NAC-temperature change amount for the indoor unit is stored, the server proceeds to step 2417.

If the NAC-temperature change amount for the indoor unit is not stored at step 2413, the server proceeds to step 2415. The server measures an NAC-temperature change amount for the indoor unit during preset time at step 2415, and proceeds to step 2417. The server generates an outdoor unit-operating ratio table based on the current air conditioning-control setting for the indoor unit, the outdoor unit-operating ratio at the current air conditioning-control setting for the indoor unit, and the NAC-temperature change amount for the indoor unit at step 2417.

As described above, the server performs the method in FIG. 23 for all indoor units connected to the outdoor unit, thus an air conditioning-control setting, an outdoor unit-operating ratio at the air conditioning-control setting, and an NAC-temperature change amount for each indoor unit connected to the outdoor unit is stored in the outdoor unit-operating ratio table generated at step 2417.

Figure 24:
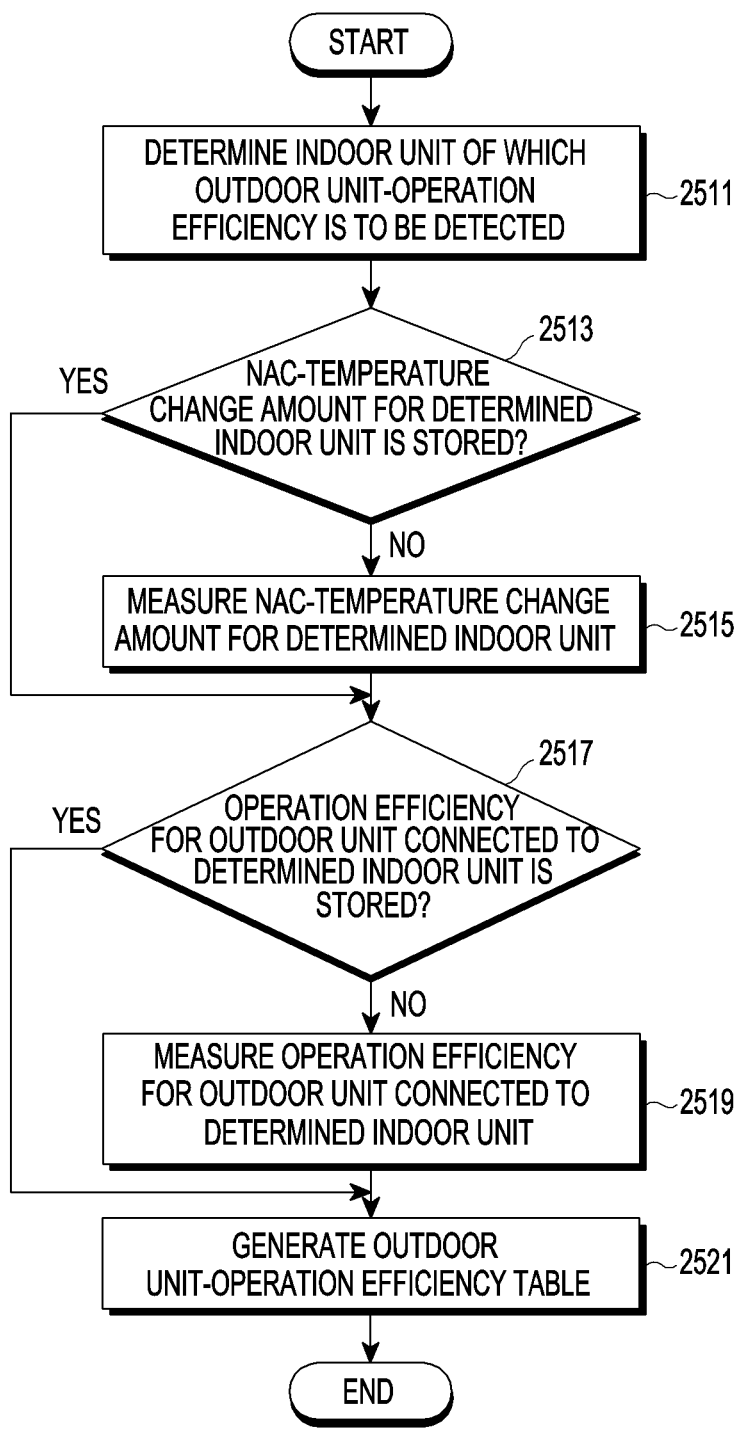
FIG. 24 is a flowchart of a method of predicting outdoor unit-operation efficiency in a server in an air conditioning system according to an embodiment.

FIG. 24 is a flowchart of a method of predicting outdoor unit-operation efficiency in a server in an air conditioning system according to an embodiment.

Referring to FIG. 24, the server may detect an operation efficiency of an outdoor unit according to an indoor-temperature change amount, i.e., an NAC-temperature change amount, an AC-temperature change amount, and an operating ratio of the outdoor unit, and perform an air conditioning-control operation for an air conditioning-control zone based on the detected operating ratio of the outdoor unit. Further, the server may perform a method of predicting outdoor unit-operation efficiency as shown in FIG. 24 for each indoor unit connected to an outdoor unit.

The server determines an indoor unit of which outdoor unit-operation efficiency will be determined among a plurality of indoor units connected to an outdoor unit at step 2511, and proceeds to step 2513. The server determines whether an NAC-temperature change amount for the determined indoor unit is stored at step 2513. In this case, the NAC-temperature change amount may be large, for example, at a certain zone, e.g., an outer wall of a building. If an air conditioning operation is controlled by considering the NAC-temperature change amount, efficiency thereof may increase. For example, an effect according to an outdoor temperature may be significant at the outer wall of a building, so efficiency for an air conditioning-control operation may increase if a weight is given to cooling or heating the outer wall of the building. In an embodiment of the disclosure, a default zone-predicted temperature may be detected by considering an NAC-temperature change amount and an AC-temperature change amount. An NAC-temperature change amount may be $\Delta Tin$, and an AC-temperature change amount may be $\Delta Tac$.

If the NAC-temperature change amount for the determined indoor unit is not stored, the server proceeds to step 2515. The server measures an NAC-temperature change amount for the determined indoor unit at step 2515, and proceeds to step 2517. The server measures a temperature change amount of a zone at which the indoor unit is installed without operating the indoor unit during a preset time, and the measured temperature change amount is an NAC-temperature change amount for the indoor unit.

If the NAC-temperature change amount for the determined indoor unit is stored at step 2513, the server proceeds to step 2517. The server determines whether an operation efficiency for an outdoor unit connected to the determined indoor unit is stored at step 2517. If the operation efficiency for the outdoor unit connected to the determined indoor unit is stored, the server proceeds to step 2521.

If the operation efficiency for the outdoor unit connected to the determined indoor unit is not stored at step 2517, the server proceeds to step 2519. The server measures operation efficiency for the outdoor unit connected to the determined indoor unit during preset time at step 2519, and proceeds to step 2521. An operation of measuring the operation efficiency for the outdoor unit is described above, and a detailed description thereof is omitted here.

The server generates an outdoor unit-operation efficiency table based on the NAC-temperature change amount for the indoor unit, the operation efficiency of the outdoor unit connected to the indoor unit, and the operating ratio of the outdoor unit at step 2521.

As described above, the server performs the method in FIG. 24 for all indoor units connected to the outdoor unit, thus an NAC-temperature change, an operation efficiency of an outdoor unit, and an operating ratio of the outdoor unit for each indoor unit connected to the outdoor unit are stored at the outdoor unit-operation efficiency table generated at step 2521.

Although FIG. 24 illustrates a method of predicting outdoor unit-operation efficiency in a server in an air conditioning system according to an embodiment of the disclosure, various changes may be made to FIG. 24. For example, although shown as a series of operations, various operations in FIG. 24 may overlap, occur in parallel, occur in a different order, or occur multiple times.

Figure 25:
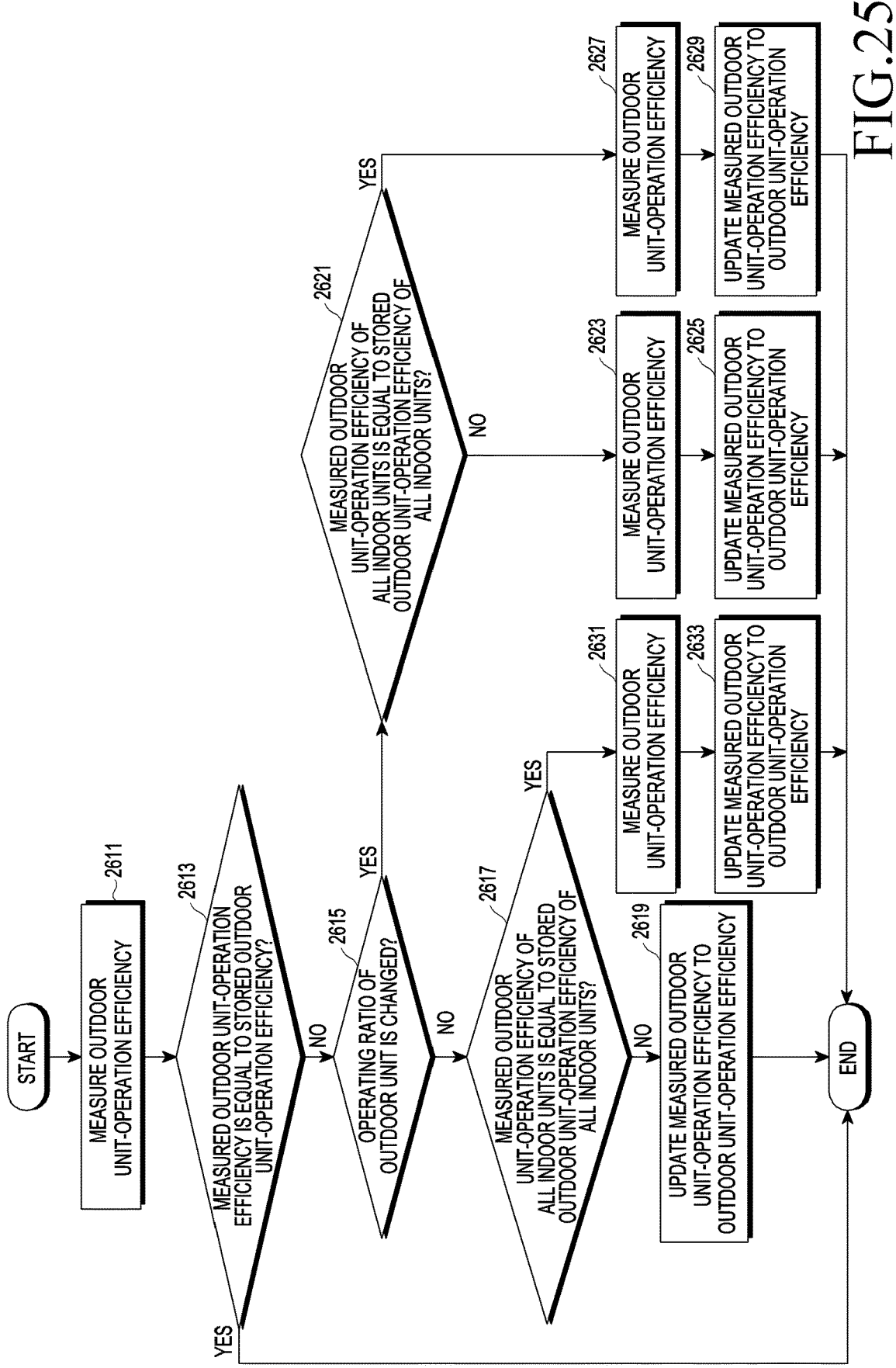
FIG. 25 is a flowchart of a method of updating outdoor unit-operation efficiency in a server in an air conditioning system according to an embodiment.

FIG. 25 is an illustration of a method of updating outdoor unit-operation efficiency in a server in an air conditioning system according to an embodiment.

Referring to FIG. 25, the server measures operation efficiency of an outdoor unit at step 2611, and proceeds to step 2613. As described in Equation (2) above, the operation efficiency of the outdoor unit may be determined as a ratio of power amount consumed at the outdoor unit during preset time to a difference between an NAC-temperature change amount and an AC-temperature change amount of all indoor units connected to the outdoor unit during the preset time. The server determines whether the measured operation efficiency of the outdoor unit is equal to an operation efficiency of the outdoor unit stored at the server at step 2613. If the measured operation efficiency of the outdoor unit is equal to the stored operation efficiency of the outdoor unit, the server terminates the process.

If the measured operation efficiency of the outdoor unit is not equal to the stored operation efficiency of the outdoor unit at step 2613, the server proceeds to step 2615. The server determines whether an operating ratio of the outdoor unit is changed at step 2615. If the operating ratio of the outdoor unit is not changed, the server proceeds to step 2617. The server determines whether measured NAC-temperature change amount of all indoor units connected to the outdoor unit is equal to a stored NAC-temperature change amount of all indoor units connected to the outdoor unit at step 2617. If the measured NAC-temperature change amount of all indoor units connected to the outdoor unit is not equal to the stored NAC-temperature change amount of all indoor units connected to the outdoor unit, the server proceeds to step 2619. The server updates the operation efficiency of the outdoor unit measured at step 2611 as operation efficiency for the outdoor unit at step 2619.

If the operating ratio of the outdoor unit is changed, the server proceeds to step 2621. The server determines whether the measured NAC-temperature change amount of all indoor units connected to the outdoor unit is equal to the stored NAC-temperature change amount of all indoor units connected to the outdoor unit at step 2621. If the measured NAC-temperature change amount of all indoor units connected to the outdoor unit is not equal to the stored NAC-temperature change amount of all indoor units connected to the outdoor unit, the server proceeds to step 2623. The server measures operation efficiency of the outdoor unit according to the changed outdoor unit-operating ratio and the changed NAC-temperature change amount at step 2623, and proceeds to step 2625. The server updates the operation efficiency of the outdoor unit measured at step 2623 as operation efficiency for the outdoor unit at step 2625.

If the measured NAC-temperature change amount of all indoor units connected to the outdoor unit is equal to the stored NAC-temperature change amount of all indoor units connected to the outdoor unit, the server proceeds to step 2627. The server measures operation efficiency of the outdoor unit according to the changed outdoor unit-operating ratio at step 2627, and proceeds to step 2629. The server updates the operation efficiency of the outdoor unit measured at step 2627 as operation efficiency for the outdoor unit at step 2629.

If the measured NAC-temperature change amount of all indoor units connected to the outdoor unit is equal to the stored NAC-temperature change amount of all indoor units connected to the outdoor unit at step 2617, the server proceeds to step 2631. The server measures operation efficiency of the outdoor unit according to the changed NAC-temperature change amount at step 2631, and proceeds to step 2633. The server updates the operation efficiency of the outdoor unit measured at step 2631 as operation efficiency for the outdoor unit at step 2633.

Although FIG. 25 illustrates a method of updating outdoor unit-operation efficiency in a server in an air conditioning system according to an embodiment of the disclosure, various changes may be made to FIG. 25. For example, although shown as a series of operations, various operations in FIG. 25 may overlap, occur in parallel, occur in a different order, or occur multiple times.

Figure 26A:
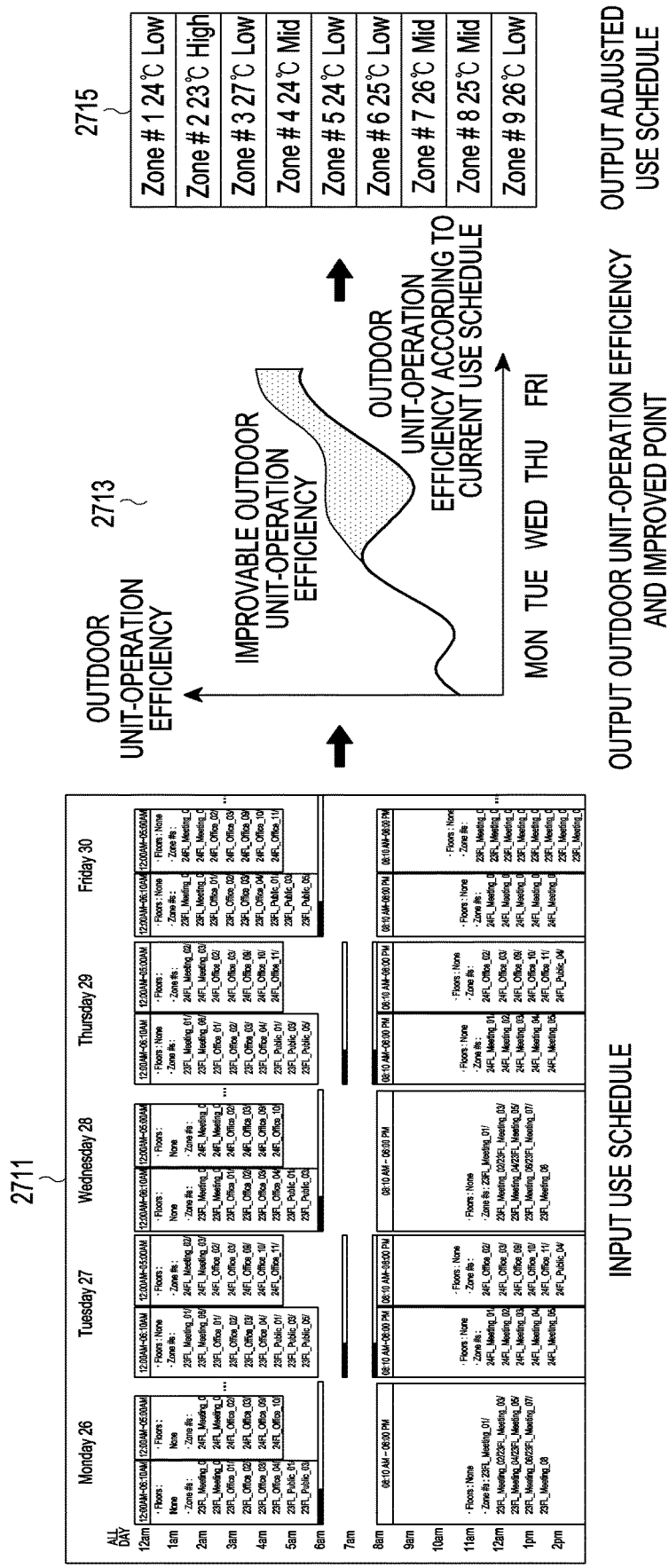
Figure 26B:
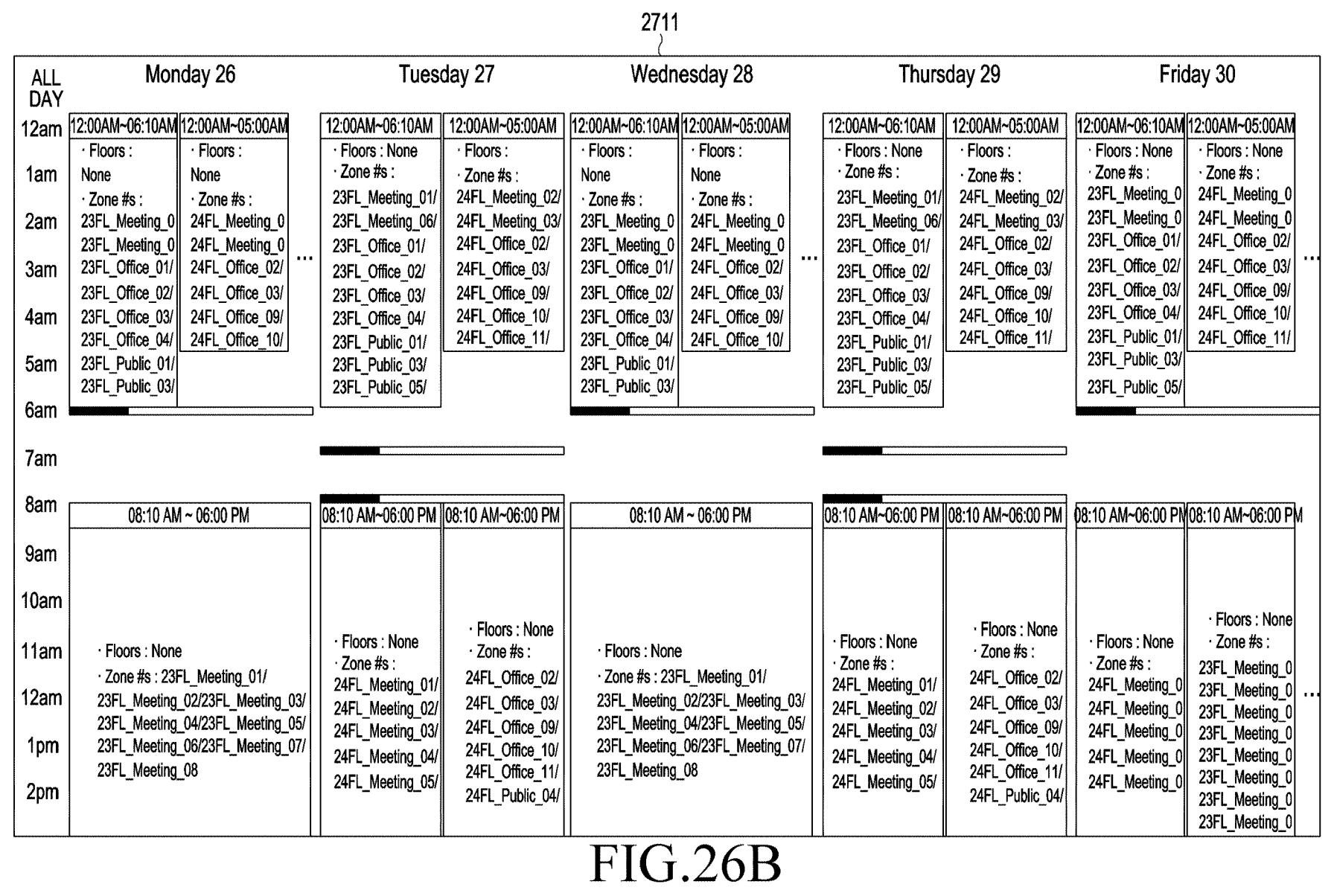

FIGS. 26A and 26B are illustrations of a UI provided based on an outdoor unit-operation efficiency in a server in an air conditioning system according to an embodiment.

Referring to FIGS. 26A and 26B, the UI may adjust a use schedule for a default zone, e.g., a building by considering outdoor unit-operation efficiency when the use schedule for the default zone is input.

If the use schedule is for the default zone (2711), the server detects outdoor unit-operation efficiency which may be improved based on the use schedule for the default zone and operation efficiency for each of one or more outdoor units related to the default zone and outdoor unit-operation efficiency according to a current use schedule. The server outputs the improvable outdoor unit-operation efficiency and the outdoor unit-operation efficiency according to the current use schedule (2713). In this case, the improvable outdoor unit-operation efficiency and the outdoor unit-operation efficiency according to the current use schedule may be output as a graph.

The server may adjust the use schedule for the default zone based on the improvable outdoor unit-operation efficiency, and outputs the adjusted use schedule (2715).

Figure 27:
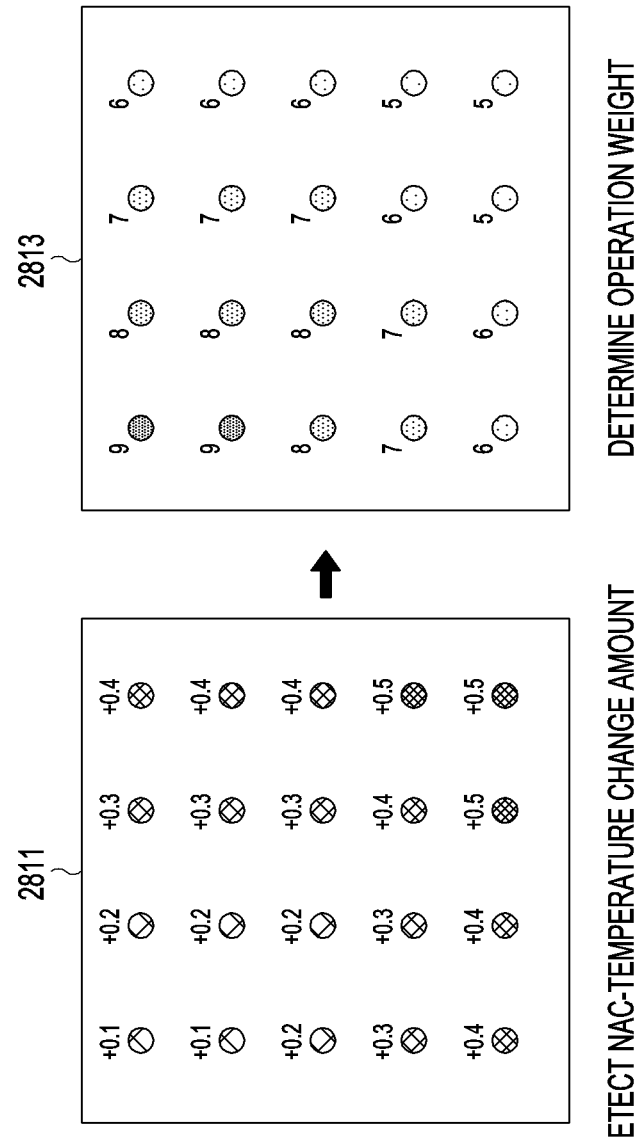
FIG. 27 is an illustration of a method of detecting an indoor unit-operation weight in a server in an air conditioning system according to an embodiment.

FIG. 27 is an illustration of a method of detecting an indoor unit-operation weight in a server in an air conditioning system according to an embodiment.

Referring to FIG. 27, the server detects an NAC-temperature change amount for each indoor unit, e.g., 20 indoor units, installed at a certain zone, e.g., a default zone (2811). An operation of detecting an NAC-temperature change amount for an indoor unit is described above, and a detailed description thereof is omitted herein. As shown in FIG. 27, the NAC-temperature change amount of each of the indoor units installed at the default zone may be detected as one of 0.1, 0.2, 0.3, 0.4, and 0.5.

The server determines an operation weight for each of the indoor units based on the NAC-temperature change amount detected for each of the indoor units installed at the default zone (2813). As shown in FIG. 27, the lower the NAC-temperature change amount the higher the operation weight. That is, in a case where an operation weight 9 is applied to an indoor unit for which an NAC-temperature change amount is 0.1, an operation weight 8 is applied to an indoor unit for which an NAC-temperature change amount is 0.2, an operation weight 7 is applied to an indoor unit for which an NAC-temperature change amount is 0.3, an operation weight 6 is applied to an indoor unit of which an NAC-temperature change amount is 0.4, and an operation weight 5 is applied to an indoor unit of which an NAC-temperature change amount is 0.5 as shown in FIG. 27.

The server may enhance efficiency of an air conditioning-control operation for a default zone by applying a low operation weight to an indoor unit of which an NAC-temperature change amount is high. That is, an indoor unit to which a minimum operation weight is applied has the highest operation priority, thus the server may enhance the efficiency of the air conditioning-control operation for the default zone by applying the low operation weight to the indoor unit of which the NAC-temperature change amount is high.

Figure 28:
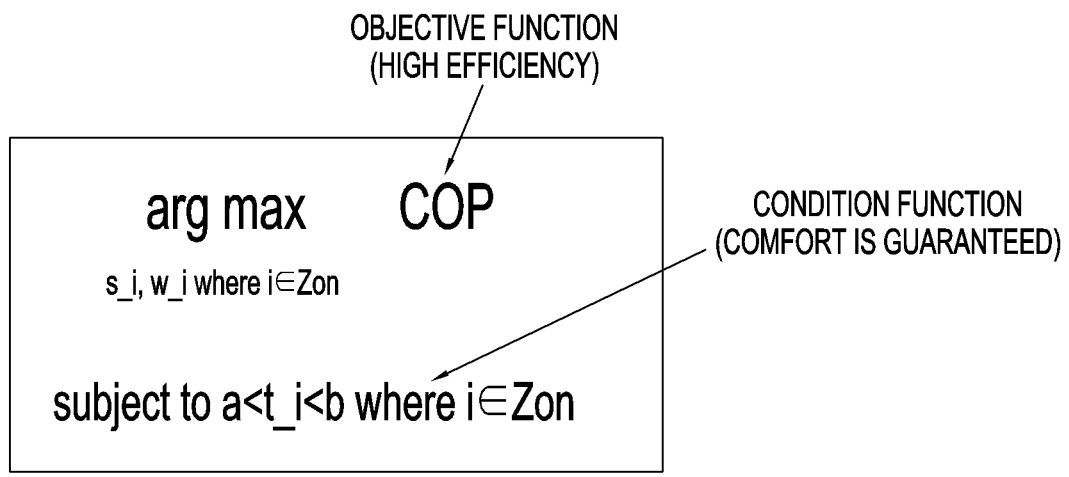
FIG. 28 is an illustration of a process of determining an air conditioning-control setting for an air conditioning-control zone in a server in an air conditioning system according to an embodiment.

FIG. 28 is an illustration of a method of determining air conditioning-control setting for an air conditioning-control zone in a server in an air conditioning system according to an embodiment.

Referring to FIG. 28, the server determines air conditioning-control setting for an air conditioning-control zone based on a model predictive control (MPC) scheme. The MPC scheme denotes a scheme of optimizing an objective function within a range which satisfies a given constraint every preset time, and a detailed description of the MPC scheme is omitted here.

The server determines control setting parameters which optimize an objective function as shown in FIG. 28, for example, an air conditioning-control zone ID, a set temperature of an indoor unit, air volume of the indoor unit, an inner temperature of a zone at which the indoor unit is located, a COP of an outdoor unit, and a comfortable temperature range.

Zon indicates a set of IDs of a plurality of zones, e.g., t zones (Zon=$\{z\_1, z\_2, \ldots, z\_t\}$). That is, Zon includes t zone IDs, i.e., $z\_1, z\_2, \ldots, z\_t$. A number of a plurality of zones included in a default zone may be unequal to a number of indoor units, e.g., n.

Set indicates a set of set temperatures of indoor units (Set=$\{s\_1, s\_2, \ldots, s\_n\}$). That is, the number of indoor units installed at the default zone is n, Set includes set temperatures of n indoor units. That is, Set includes set temperatures of n indoor units, i.e., $s\_1, s\_2, \ldots, s\_n$.

Wind indicates a set of air volumes of indoor units (Wind=$\{w\_1, w\_2, \ldots, w\_n\}$). That is, the number of indoor units installed at the default zone is n, Wind includes air volumes of n indoor units. That is, Wind includes air volumes of n indoor units, i.e., $w\_1, w\_2, \ldots, w\_n$.

Tmp indicates a set of indoor temperatures of zones at which indoor units are installed (Tmp=$\{t\_1, t\_2, \ldots, t\_n\}$). That is, the number of indoor units installed at the default zone is n, Tmp includes indoor temperatures for zones at which n indoor units are installed. That is, Tmp includes indoor temperatures for n indoor units, i.e., $t\_1, t\_2, \ldots, t\_n$.

COP indicates a set of COPs of outdoor units related to the default zone (COP=$\{c\_1, c\_2, \ldots, c\_m\}$). The number of the outdoor units is m, so COP includes COPs for m outdoor units. That is, COP includes the COPs for the m outdoor units, i.e., $c\_1, c\_2, \ldots, c\_m$.

(a, b) indicates a comfortable temperature range.

The server selects control setting parameters so that a condition function a<$t\_i$<b is guaranteed, and a COP as an objective function is maximized. In an embodiment of the disclosure, the control setting parameters are selected so that the COP is maximized, however, the control setting parameters may be selected so that the COP is increased even though the COP is not maximized.

The server may determine an air conditioning-control zone which may provide a comfortable temperature range based on a default zone-predicted temperature, and determine control setting parameters which may decrease consumed power at the determined air conditioning-control zone.

Figure 29:
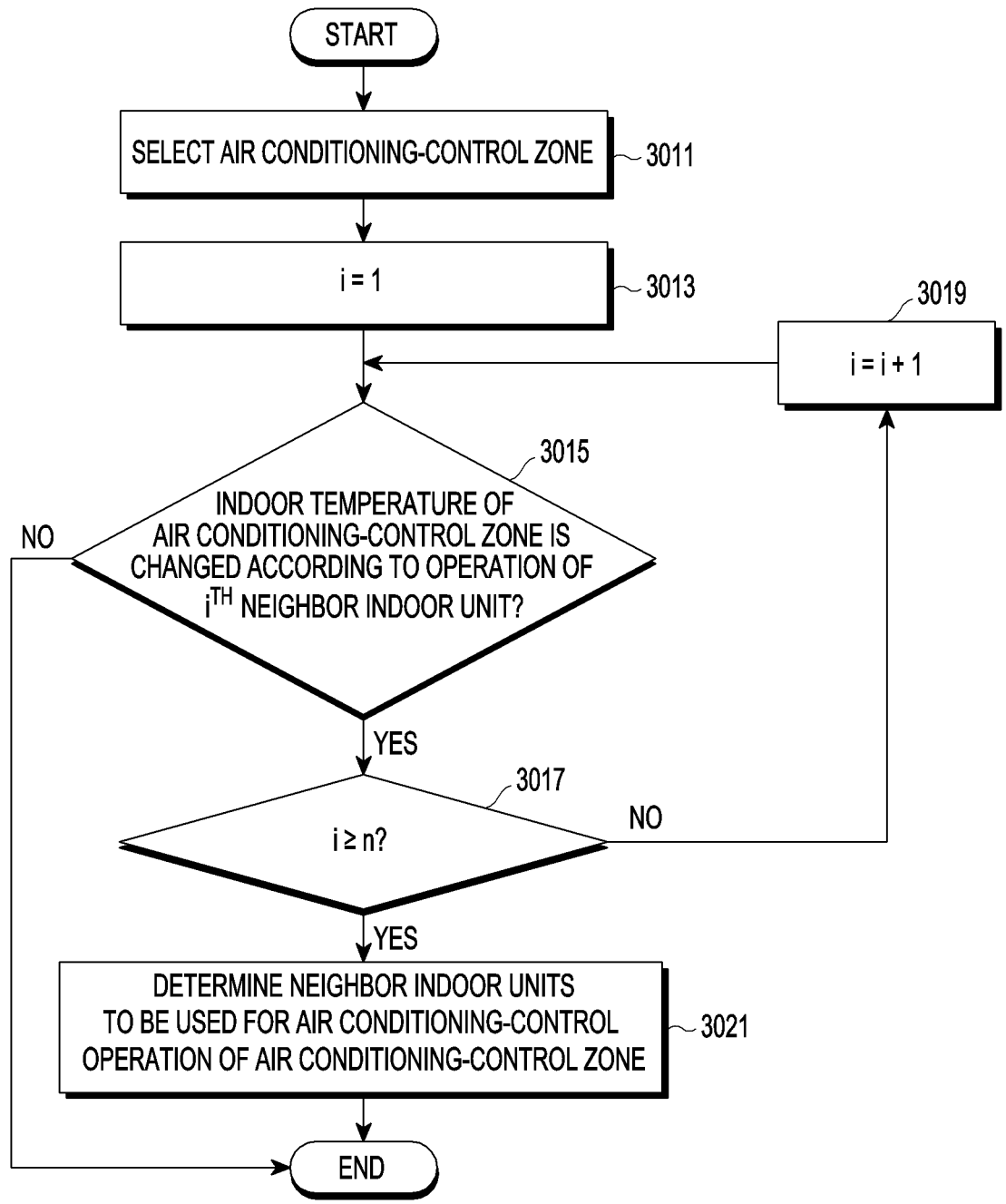
FIG. 29 is a flowchart of a method of determining an indoor unit to be used for an air conditioning-control operation in a server in an air conditioning system according to an embodiment.

FIG. 29 is a flowchart of a process of determining an indoor unit to be used for an air conditioning-control operation in a server in an air conditioning system according to an embodiment.

Referring to FIG. 29, the server selects an air conditioning-control zone at which an air conditioning-control operation will be performed at step 3011, and proceeds to step 3013. The server sets a value of a value i indicating the number of neighbor indoor units of an indoor unit installed at the air conditioning-control zone, i.e., a target indoor unit to 1 at step 3013, and proceeds to step 3015. In this case, a maximum value of the value i may be n. The server determines whether an indoor temperature of the air conditioning-control zone is changed according to an operation of the ith neighbor indoor unit at step 3015. If the indoor temperature of the air conditioning-control zone is changed according to the operation of the ith neighbor indoor unit, the server proceeds to step 3017.

The server determines whether the value of the value i is greater than or equal to n at step 3017. If the value of the value i is not greater than or equal to n, the server proceeds to step 3019. The server increases the value of the value i by a preset value, e.g., 1 at step 3019, and proceeds to step 3015.

If the value of the value i is greater than or equal to n at step 3017, the server proceeds to step 3021. The server determines the first to the ith neighbor indoor units as neighbor indoor units to be used for an air conditioning-control operation for the air conditioning-control zone at step 3021.

Although FIG. 29 illustrates an example of a process of determining an indoor unit to be used for an air conditioning-control operation in a server in an air conditioning system according to an embodiment of the disclosure, various changes may be made to FIG. 29. For example, although shown as a series of operations, various operations in FIG. 29 may overlap, occur in parallel, occur in a different order, or occur multiple times.

Figure 30:
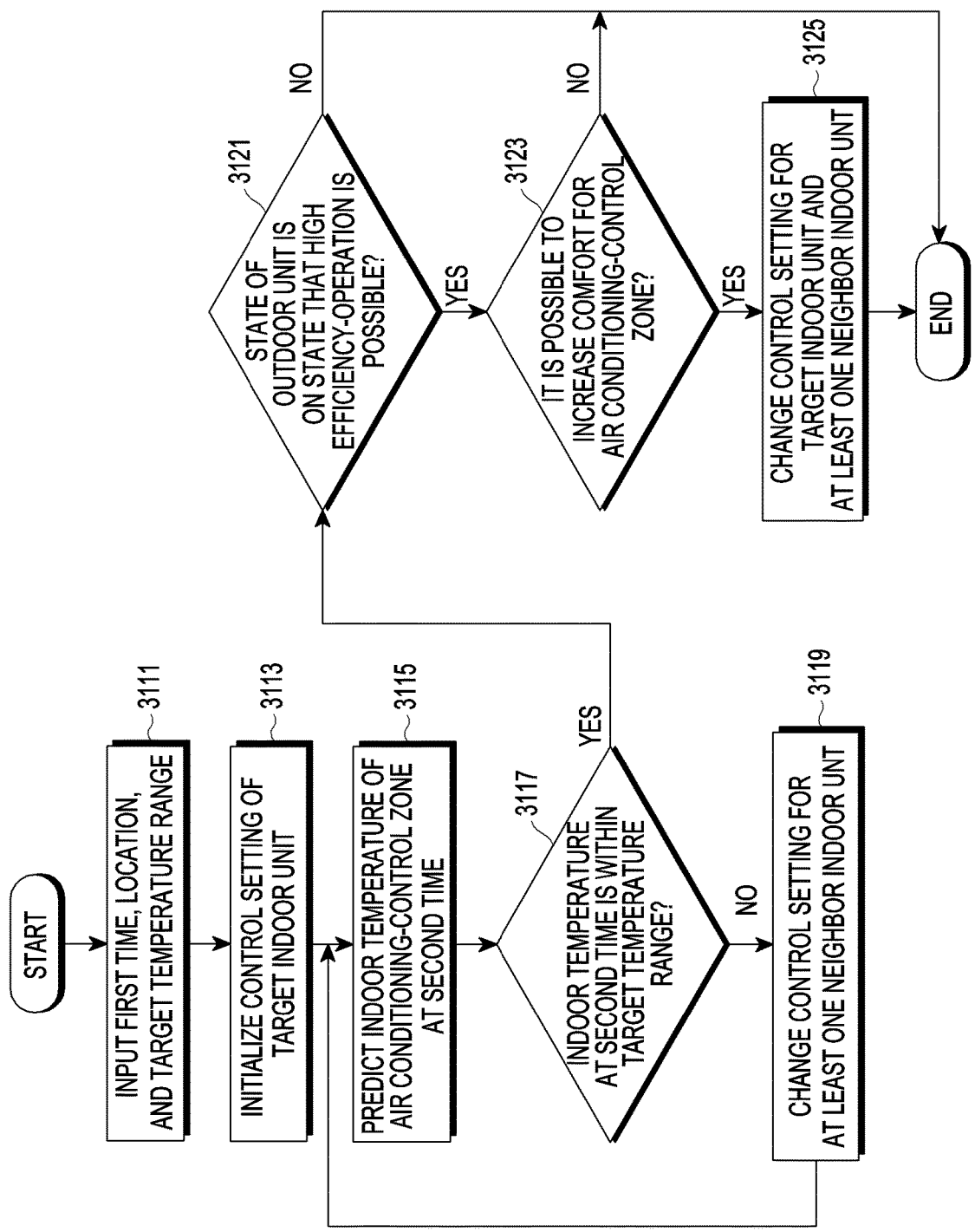
FIG. 30 is a flowchart of a method of determining an air conditioning-control setting in a server in an air conditioning system according to an embodiment.

FIG. 30 is a flowchart of a method of determining air conditioning-control setting in a server in an air conditioning system according to an embodiment.

Referring to FIG. 30, a server inputs a first time, e.g., a time t, a location, i.e., a location of an air conditioning-control zone, and a target temperature range, i.e., a comfortable temperature range for the air conditioning-control zone at step 3111, and proceeds to step 3113. The server initializes a control setting of an indoor unit installed at the air conditioning-control zone, e.g., a target indoor unit at step 3113, and proceeds to step 3115. In this case, a control setting of an indoor unit may control setting parameters, and the control setting parameters may include a set temperature, an operation mode, a fan speed, a fan direction, air volume, and/or the like. The control setting of the target indoor unit may include a set temperature and air volume, and the set temperature and air volume of the target indoor unit may be 28 degrees and strong, respectively.

The server predicts an indoor temperature at a second time, e.g., a time t+h for the air conditioning-control zone based on a default zone-predicted temperature for a default zone in which the air conditioning-control zone is included at step 3115, and proceeds to step 3117. The server determines whether the indoor temperature at a second time t+h is within the comfortable temperature range at step 3117. If the indoor temperature at the second time t+h is not within the comfortable temperature range, the server proceeds to step 3119. The server changes control setting for the target indoor unit and one or more neighbor indoor units of the target indoor unit at step 3119, and returns to step 3115. The number of neighbor indoor units of the target indoor unit is i, and a maximum value of i may be n. The server changes control setting of a corresponding indoor unit in an order from an indoor unit of which a temperature change weight is maximum to an indoor unit of which a temperature change weight is minimum among the target indoor unit and the neighbor indoor units, and proceeds to step 3117.

If the indoor temperature at a second time t+h is within the comfortable temperature range, the server proceeds to step 3121. The server determines whether a state of an outdoor unit connected to the target indoor unit is a state on which a high efficiency-operation is possible at step 3121. In this case, the state on which the high efficiency-operation is possible denotes a state on which operation efficiency of the outdoor unit is increased when an operating ratio of the outdoor unit is increased. For example, in a state on which the operating ratio of the outdoor unit is 40%, the set temperature of the target indoor unit is 24 degrees, and the air volume of the target indoor unit is weak, if the set temperature of the target indoor unit is changed to 23 degrees and the air volume of the target indoor unit is strong, the operating ratio of the outdoor unit is changed to 60%, the state of the outdoor unit is the state on which the high efficiency-operation is possible. That is, the state on which the high efficiency-operation is possible denotes a state on which operation efficiency of the outdoor unit connected to the target indoor unit is increased.

If the state of the outdoor unit is the state on which the high efficiency-operation is possible at step 3121, the server proceeds to step 3123. The server determines whether it is possible to increase comfort in the air conditioning-control zone at step 3123. Increase of the comfort in the air conditioning-control zone indicates, for example, a change of PMV of the air conditioning-control zone to a value which is closer to zero (0) as compared to the currently set PMV. For example, the comfort in the air conditioning-control zone may be increased if the comfortable temperature range is changed so that an absolute value of PMV for the air conditioning-control zone is greater than or equal to zero (0) and less than 0.3 when the current PMV for the air conditioning-control zone is 0.3

If it is possible to increase the comfort in the air conditioning-control zone at step 3123, the server proceeds to step 3125. The server changes control setting for the target indoor unit and one or more neighbor indoor units at step 3125. The server changes control setting of a corresponding indoor unit in an order from an indoor unit of which a temperature change weight is maximum to an indoor unit of which a temperature change weight is minimum among the target indoor unit and the neighbor indoor units.

Although FIG. 30 illustrates an example of a method of determining air conditioning-control setting in a server in an air conditioning system according to an embodiment of the disclosure, various changes may be made to FIG. 30. For example, although shown as a series of operations, various operations in FIG. 30 may overlap, occur in parallel, occur in a different order, or occur multiple times.

Figure 31:
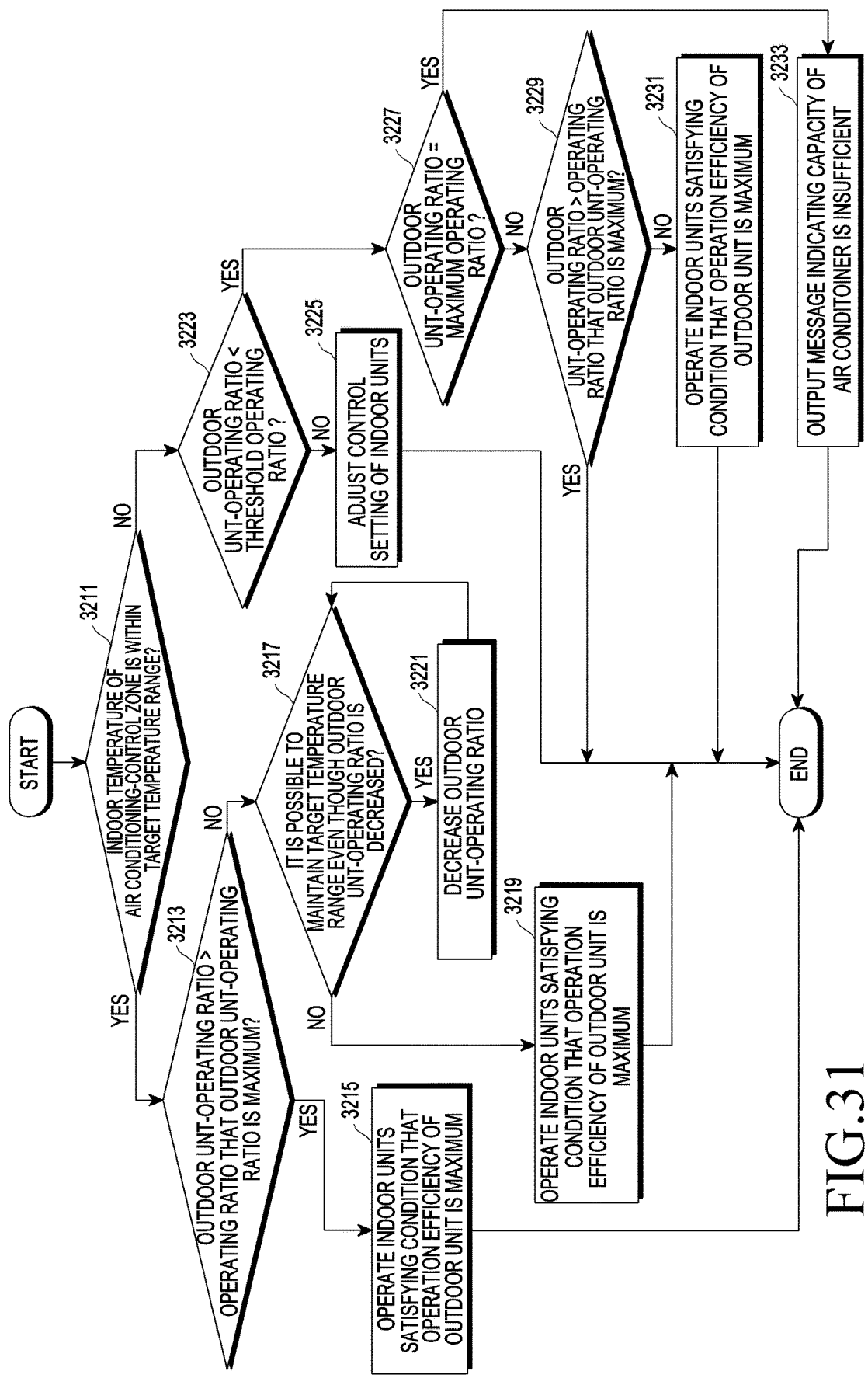
FIG. 31 is a flowchart of a method of determining an air conditioning-control setting in a server in an air conditioning system according to an embodiment.

FIG. 31 is a flowchart of a method of determining air conditioning-control setting in a server in an air conditioning system according to an embodiment.

Referring to FIG. 31, the server determines whether an indoor temperature of an air conditioning-control zone is within a target temperature range, e.g., a comfortable temperature range at step 3211. If the indoor temperature of the air conditioning-control zone is within the comfortable temperature range, the server proceeds to step 3213. The server determines whether an operating ratio of an outdoor unit connected to an indoor unit installed at the air conditioning-control zone, e.g., a target indoor unit is greater than an operating ratio with which the operating ratio of the outdoor unit is maximized at step 3213. If the operating ratio of the outdoor unit is greater than the operating ratio with which the operating ratio of the outdoor unit is maximized, the server proceeds to step 3215. The server operates indoor units which satisfy a condition that the operating ratio of the outdoor unit is maximum among indoor units which are operating for satisfying the comfortable temperature range of the air conditioning-control zone at step 3215. In an embodiment of the disclosure, the indoor units which satisfy the condition that the operating ratio of the outdoor unit is maximum are operated, however, the indoor units which satisfy a condition where the operating ratio of the outdoor unit is increased may be operated.

If the operating ratio of the outdoor unit is not greater than the operating ratio with which the operating ratio of the outdoor unit is maximized, that is, if the operating ratio of the outdoor unit is less than or equal to the operating ratio with which the operating ratio of the outdoor unit is maximized, the server proceeds to step 3217. The server determines whether it is possible to maintain the comfortable temperature range for the air conditioning-control zone even though the operating ratio of the outdoor unit is decreased at step 3217. If it is impossible to maintain the comfortable temperature range for the air conditioning-control zone even though the operating ratio of the outdoor unit is decreased, the server proceeds to step 3219. The server operates the indoor units based on an outdoor unit-operating ratio so that the operation efficiency of the outdoor unit is maximized at step 3219. In an embodiment of the disclosure, the indoor units which satisfy the condition that the operating ratio of the outdoor unit is maximum are operated, however, the indoor units which satisfy a condition that the operating ratio of the outdoor unit is increased may be operated. If it is possible to maintain the comfortable temperature range for the air conditioning-control zone even though the operating ratio of the outdoor unit is decreased at step 3217, the server proceeds to step 3221. The server decreases the operating ratio of the outdoor unit at step 3221, and returns to step 3217.

If the indoor temperature of the air conditioning-control zone is not within the comfortable temperature range, the server proceeds to step 3223. The server determines whether the operating ratio of the outdoor unit is less than a preset operating ratio at step 3223. If the operating ratio of the outdoor unit is not less than the preset operating ratio, the server proceeds to step 3225. The server adjusts control setting of the indoor units at step 3225.

If the operating ratio of the outdoor unit is less than the preset operating ratio, the server proceeds to step 3227. The server determines whether the operating ratio of the outdoor unit is a maximum operating ratio at step 3227. If the operating ratio of the outdoor unit is not the maximum operating ratio, the server proceeds to step 3229. The server determines whether the operating ratio of the outdoor unit is greater than an operating ratio in a case that the state of the outdoor unit is the state on which the high efficiency-operation is possible at step 3229. If the operating ratio of the outdoor unit is not greater than the operating ratio in the case that the state of the outdoor unit is the state on which the high efficiency-operation is possible, the server proceeds to step 3231. The server operates indoor units which satisfy a condition that the operating ratio of the outdoor unit is maximum among indoor units which are operating for satisfying the comfortable temperature range of the air conditioning-control zone at step 3231. In an embodiment of the disclosure, the indoor units which satisfy the condition that the operating ratio of the outdoor unit is maximum are operated, however, the indoor units which satisfy a condition that the operating ratio of the outdoor unit is increased may be operated.

If the operating ratio of the outdoor unit is the maximum operating ratio, the server proceeds to step 3233. The server outputs a message indicating that capacity of an air conditioner is insufficient at step 3233. The message indicating that capacity of the air conditioner is insufficient may be implemented with various forms, and a detailed description thereof is omitted here.

Figure 32:
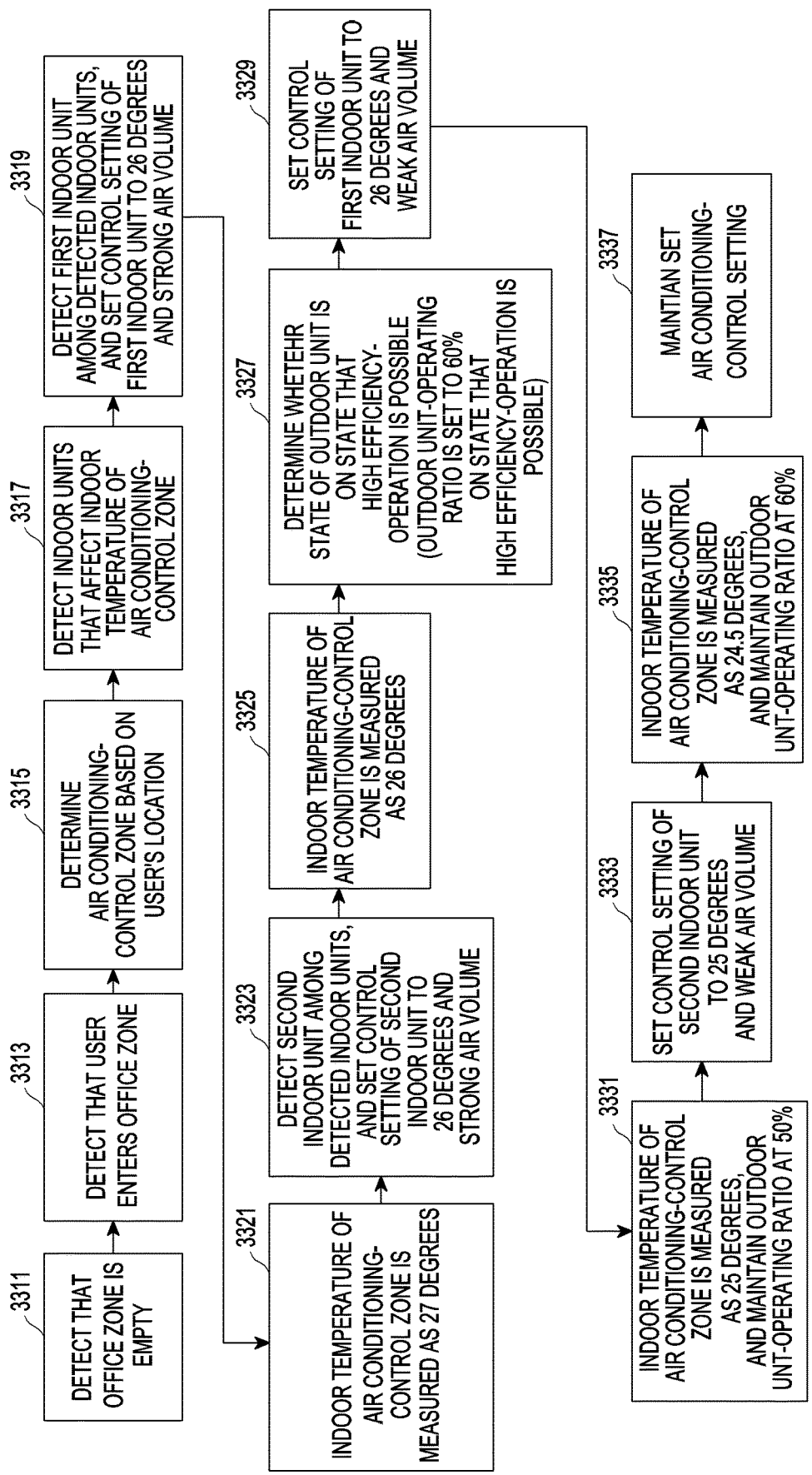
FIG. 32 is a flowchart of a method of a server performing an air conditioning-control operation for an air conditioning-control zone in an air conditioning system according to an embodiment.

FIG. 32 is a flowchart of a scenario in which a server performs an air conditioning-control operation for an air conditioning-control zone in an air conditioning system according to an embodiment.

Referring to FIG. 32, a scenario of performing an air conditioning-control operation in FIG. 32 may be a scenario of performing an air conditioning-control operation in a case where a target temperature range may be set to 21-26 degrees, a temperature at which comfort is maximum within the target temperature range may be 24 degrees, and a maximum value of an outdoor unit-operating ratio on a state on which a high efficiency-operation is possible may be 60%.

Referring to FIG. 32, a server detects that a default zone, e.g., an office zone is empty (3311). The server detects that a user enters the office zone (3313). The server may detect that the user enters the office zone and detect a user's location through a sensor installed at the office zone, and/or the like. The server determines an air conditioning-control zone based on the user's location (3315). The server detects indoor units which affect an indoor temperature of the air conditioning-control zone (3317). The server stores information related to all indoor units installed at the default zone, so the server may detect the indoor units which affect the indoor temperature of the air conditioning-control zone, this has been described above, and a detailed description thereof will be omitted.

The server detects the first indoor unit among the indoor units which affect the indoor temperature of the air conditioning-control zone (3319). The first indoor unit denotes an indoor unit which most affect the indoor temperature of the air conditioning-control zone among the indoor units which affect the indoor temperature of the air conditioning-control zone. A scheme of detecting the indoor unit which most affect the indoor temperature of the air conditioning-control zone among the indoor units which affect the indoor temperature of the air conditioning-control zone has been described above, so a detailed description thereof will be omitted herein. The server changes control setting of the first indoor unit. The control setting parameters included in control setting of an indoor unit may include an indoor temperature and air volume. Thus, the server changes an indoor temperature and air volume included in the control setting of the first indoor unit to 26 degrees and strong, respectively (3319).

The server applies the changed control setting to the first indoor unit, and measures an indoor temperature of the air conditioning-control zone (3321). The indoor temperature of the air conditioning-control zone may be measured as 27 degrees. The indoor temperature of the air conditioning-control zone may not be within the target temperature range, so the server detects the second indoor unit among the indoor units which affect the indoor temperature of the air conditioning-control zone so that the air conditioning-control zone is within the target temperature range (3323). The second indoor unit denotes an indoor unit which most affect the indoor temperature of the air conditioning-control zone among the indoor units which affect the indoor temperature of the air conditioning-control zone except for the first indoor unit. The server changes control setting of the second indoor unit (3323). For example, the server changes an indoor temperature and air volume included in the control setting of the second indoor unit to 26 degrees and strong, respectively.

The server applies the changed control setting to the second indoor unit, and measures an indoor temperature of the air conditioning-control zone (3325). The indoor temperature of the air conditioning-control zone may be measured as 26 degrees. The indoor temperature of the air conditioning-control zone may be within the target temperature range, thus the server determines whether an outdoor unit which corresponds to the air conditioning-control zone is on a state on which a high efficiency-operation is possible (3327). The state on which the high efficiency-operation is possible may be a status at which an outdoor unit-operating ratio is set to 60%.

If the outdoor unit is on the state on which the high efficiency-operation is possible, the server changes control setting of the first indoor unit so that a high efficiency-operation at the outdoor unit is possible (3329). For example, the server changes an indoor temperature and air volume included in the control setting of the first indoor unit to 26 degrees and weak, respectively (3329). The server applies the changed control setting to the first indoor unit, and measures an indoor temperature of the air conditioning-control zone (3331). The indoor temperature of the air conditioning-control zone may be measured as 25 degrees. The indoor temperature of the air conditioning-control zone may be within the target temperature range even though the changed control setting is applied to the first indoor unit, the server maintains the outdoor unit-operating ratio at 50% (3331).

The server changes control setting of the second indoor unit so that the high efficiency-operation at the outdoor unit is possible (3323). For example, the server changes an indoor temperature and air volume included in the control setting of the second indoor unit to 25 degrees and weak, respectively (3333). The server applies the changed control setting to the second indoor unit, and measures an indoor temperature of the air conditioning-control zone (3335). The indoor temperature of the air conditioning-control zone may be measured as 24.5 degrees. The indoor temperature of the air conditioning-control zone may be within the target temperature range even though the changed control setting is applied to the second indoor unit, the server maintains the outdoor unit-operating ratio at 60% (3335). The operating ratio of the outdoor unit is 60% as the state at which the high efficiency-operation is possible, so the server maintains currently set air conditioning-control setting (3337). That is, the server maintains the detected control setting for indoor units which affect, the indoor temperature of the air conditioning-control zone at current control setting.

A scenario in which an air conditioning-control operation for an air conditioning-control zone is performed in a case that there is one user. However, the server may perform an air conditioning-control operation as described above with reference to FIG. 32 for each user at the same time if there are many users.

Figure 33:
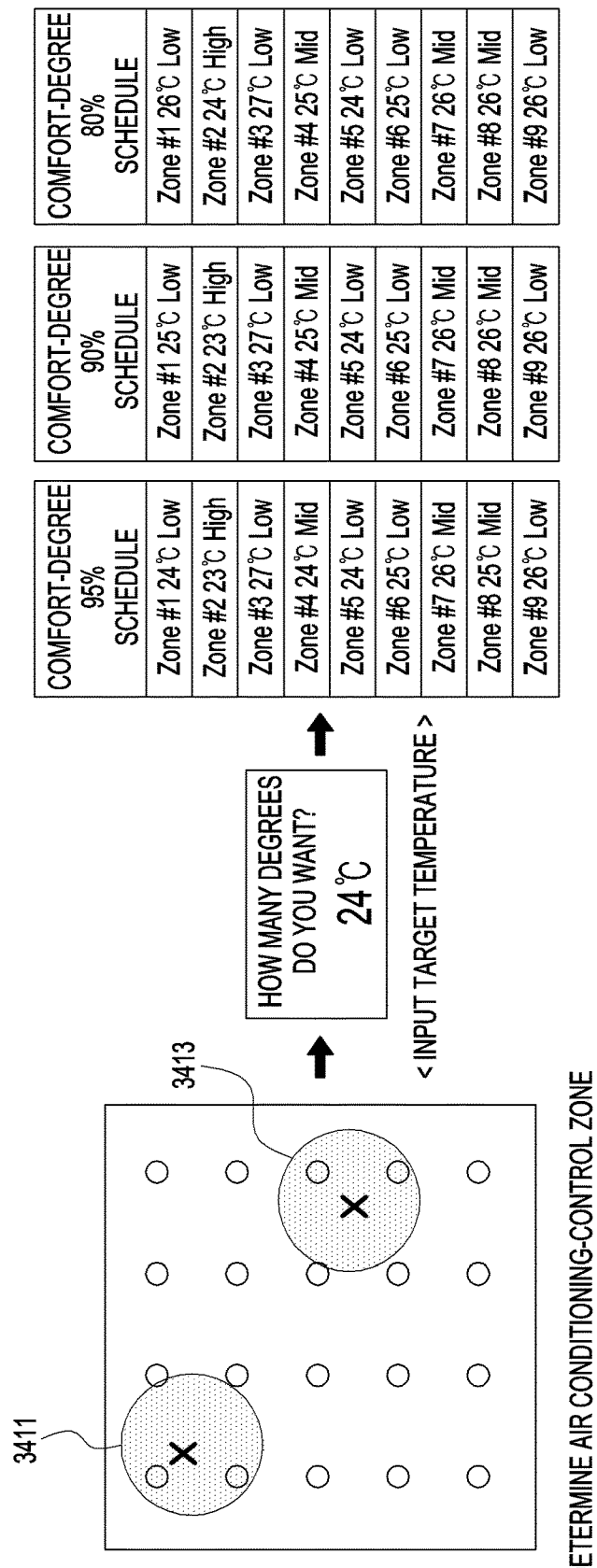
FIG. 33 is an illustration of a method of determining indoor units for satisfying a target temperature range of an air conditioning-control zone in an air conditioning system according to an embodiment.

FIG. 33 is an illustration of a method of determining indoor units for satisfying a target temperature range of an air conditioning-control zone in an air conditioning system according to an embodiment.

Referring to FIG. 33, the server selects air conditioning-control zones 3411 and 3413 from a default zone, and inputs a target temperature, e.g., a comfortable temperature for the selected air conditioning-control zones 3411 and 3413. The server determines a use schedule for the air conditioning-control zones per ratio which satisfies the comfortable temperature so that a high efficiency-operation is possible, i.e., per comfort degree.

A use schedule in a case that a comfortable temperature for the air conditioning-control zones 3411 and 3413 may be 24 degrees, and comfort degrees may be 95%, 90%, and 80% as shown in FIG. 33. A scheme of determining a use schedule for an air conditioning-control zone in the server is described above, thus a detailed description thereof is omitted here.

A case where a use schedule for 9 zones, e.g., a zone #1 to a zone #9 among total zones included in the default zone for satisfying the comfortable temperature for the air conditioning-control zones 3411 and 3413 is shown in FIG. 33. For example, if a comfort degree is set to 95%, the server sets, for the zone #1, an indoor temperature and a wind speed to 24 degrees and a low speed, sets, for the zone #2, an indoor temperature and a wind speed to 23 degrees and a high speed, sets, for the zone #3, an indoor temperature and a wind speed to 27 degrees and a low speed, sets, for the zone #4, an indoor temperature and a wind speed to 24 degrees and a middle speed, sets, for the zone #5, an indoor temperature and a wind speed to 24 degrees and a low speed, sets, for the zone #6, an indoor temperature and a wind speed to 25 degrees and a low speed, sets, for the zone #7, an indoor temperature and a wind speed to 26 degrees and a middle speed, sets, for the zone #8, an indoor temperature and a wind speed to 25 degrees and a middle speed, and sets, for the zone #9, an indoor temperature and a wind speed to 26 degrees and a low speed.

Figure 34:
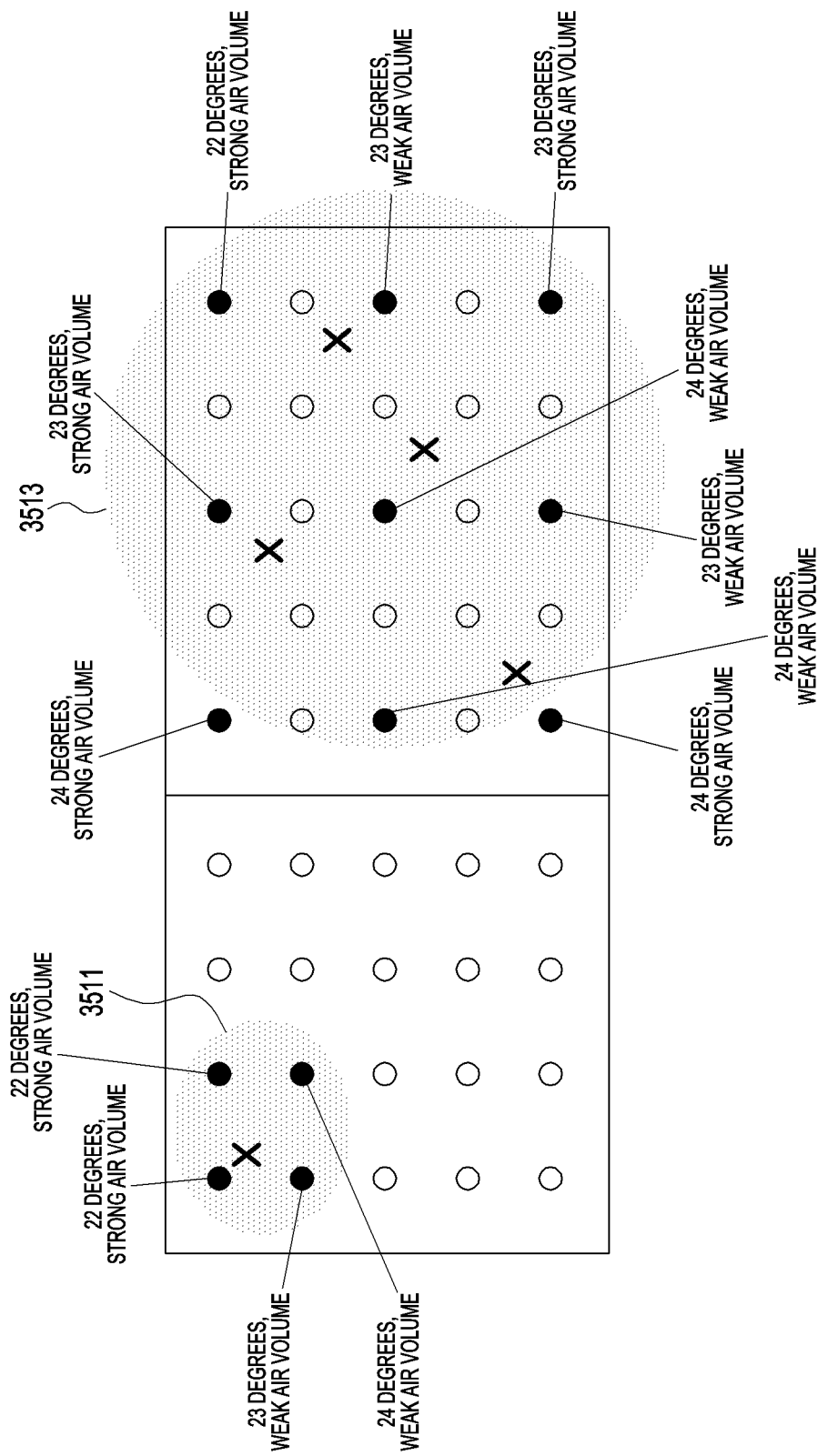
FIG. 34 is an illustration of a method in which a server performs an air conditioning-control operation for an air conditioning-control zone in a server in an air conditioning system according to an embodiment.

FIG. 34 is an illustration of a scenario in which a server performs an air conditioning-control operation for an air conditioning-control zone in a server in an air conditioning system according to an embodiment.

Referring to FIG. 34, the server may receive control setting including a set temperature, air volume, and/or the like for all indoor units installed at a plurality of zones or a plurality of locations included in a default zone, and control an air conditioning-control zone thereby satisfying a target temperature range and enhancing efficiency of an outdoor unit based on the control setting for each of all indoor units. That is, the server may receive set temperature information, e.g., Set, indicating set temperatures for all indoor units, and air volume information, e.g., Wind indicating air volume for all indoor units, and control the air conditioning-control zone based on Set and Wind. In this case, Set={$s\_1, s\_2, \ldots, s\_n$}, and Wind={$w\_1, w\_2, \ldots, w\_n$}. Each of $s\_1$ to $s\_n$ denotes a set temperature of a corresponding indoor unit, each of $w\_1$ town denotes air volume of the corresponding indoor unit, and n denotes the number of indoor units. As described above, the server may control other zones included in the default zone as well as the air conditioning-control zone for effectively controlling the air conditioning-control zone.

The server sets air conditioning-control zones 3511 and 3513 based on a user's location, and determines air conditioning-control setting for the air conditioning-control zones 3511 and 3513 based on, for example, an MPC scheme. A scheme of determining an air conditioning-control setting for an air conditioning-control zone is described above with reference to FIG. 28, so a detailed description thereof is omitted here.

An embodiment of the disclosure provides an operating method of a server in an air conditioning system. The operating method includes determining a target temperature range to be applied to a first zone as a zone of which air conditioning is to be controlled, predicting an indoor temperature for each of a plurality of zones included in a second zone in which the first zone is included, predicting efficiency of at least one first outdoor unit connected to first indoor units installed at the second zone, and controlling operations of the first indoor units based on the target temperature range, the indoor temperature for each of the plurality of zones, and the efficiency of at least one first outdoor unit.

Controlling the operations of the first indoor units includes controlling the operations of the first indoor units such that the efficiency of the at least one first outdoor unit is increased.

The efficiency of the at least one first outdoor unit includes operation efficiency of the at least one first outdoor unit and an operating ratio of the at least one first outdoor unit, the operation efficiency of the at least one first outdoor unit includes a ratio of consumed power amount of the at least one first outdoor unit to difference between first temperature change amount and second temperature change amount of second indoor units connected to the at least one first outdoor unit, the first temperature change amount includes indoor-temperature change amount of a third zone at which the second indoor units are installed if the second indoor units do not operate, and the second temperature change amount includes indoor-temperature change amount of the third zone if the second indoor units operate.

The efficiency of the at least one first outdoor unit includes operation efficiency of the at least one first outdoor unit and an operating ratio of the at least one first outdoor unit, the operation efficiency of the at least one first outdoor unit is determined based on a COP of the at least one first outdoor unit, and the COP of the at least one first outdoor unit includes a ratio of consumed power amount of the at least one first outdoor unit to cooling/heating energy generated by the at least one first outdoor unit.

Determining the target temperature range includes determining a PMV difference value as difference between preset PMV and actual thermal vote, determining new PMV based on the preset PMV and the PMV difference value, and determining a range of an indoor temperature at which the new PMV is within a preset range as the target temperature range.

The PMV difference value is determined by applying at least one of an indoor temperature, indoor humidity, a Met, a Clo, and an outdoor temperature which are applied to the first zone to the preset PMV.

The first zone is determined based on at least one of a location of at least one user device located at the second zone, a mobile pattern of the at least one user device, and a use schedule for the second zone.

Controlling the operations of the first indoor units such that the efficiency of the at least one first outdoor unit is increased includes controlling the operations of the first indoor units such that a COP of the at least one first outdoor unit is increased.

Determining the target temperature range includes determining a PMV difference value as a difference between a preset PMV and an actual thermal vote, determining a new PMV based on the preset PMV and the PMV difference value, and determining a range of an indoor temperature at which the new PMV is within a preset range as the target temperature range.

The PMV difference value is determined by applying at least one of an indoor temperature, indoor humidity, a Met, a Clo, and an outdoor temperature which are applied to the first zone to the preset PMV.

The first zone is determined based on at least one of a location of at least one user device located at the second zone, a mobile pattern of the at least one user device, and a use schedule for the second zone.

The indoor temperature for each of the plurality of zones includes a first indoor temperature as an indoor temperature at second time after first time, the first indoor temperature for each of the plurality of zones is predicted by considering at least one of a first outdoor temperature, and a second indoor temperature and heat insulation information of each of the plurality of zones, a number of user devices within each of the plurality of zones, and a first set temperature, a first operation mode, a first fan speed, and a first fan direction of each of at least one third indoor unit located at each of the plurality of zones, and the first outdoor temperature includes an outdoor temperature from third time before the first time to the first time, the second indoor temperature includes an indoor temperature from the third time to the first time, the first set temperature includes a set temperature from the third time to the first time, the first operation mode includes an operation mode from the third time to the first time, the first fan speed includes a fan speed from the third time to the first time, and the first fan direction includes a fan direction from the third time to the first time.

Predicting the indoor temperature for each of the plurality of zones included in the second zone in which the first zone is included includes predicting the indoor temperature for each of the plurality of zones based on first indoor-temperature change amount and second indoor-temperature change amount of each of the first indoor units, and the first indoor-temperature change amount of each of the first indoor units includes indoor-temperature change amount of a fourth zone at which each of the first indoor units is installed if each of the first indoor units does not operate, and the second indoor-temperature change amount of each of the first indoor units includes indoor-temperature change amount of the fourth zone if each of the first indoor units operates.

Controlling the operations of the first indoor units includes determining a part of the first indoor units as indoor units to be used if air conditioning for the first zone is controlled, and wherein the part of the first indoor units are adjacent to at least one fourth indoor unit installed at the first zone, and an indoor temperature of the first zone changes if the part of the first indoor units operates.

Controlling the operations of the first indoor units includes initializing control setting of at least one fourth indoor unit installed at the first zone, predicting an indoor temperature of the first zone based on the indoor temperature for each of the plurality of zones, determining whether operation efficiency of a second outdoor unit connected to the at least fourth indoor unit is increased if the indoor temperature of the first zone is within the target temperature range, and an operating ratio of the second outdoor unit is increased, determining whether the operating ratio of the second outdoor unit is greater than an operating ratio at which the operation efficiency of the second outdoor unit is maximum if operation efficiency of the second outdoor unit is increased when the operating ratio of the second outdoor unit is increased, and controlling indoor units which satisfy a condition that the operation efficiency of the second outdoor unit is increased among indoor units operating to satisfy the target temperature range of the first zone if the operating ratio of the second outdoor unit is not greater than the operating ratio at which the operation efficiency of the second outdoor unit is maximum.

Controlling the operations of the first indoor units includes determining whether an operating ratio of a second outdoor unit connected to at least one fourth indoor unit installed at the first zone is greater than an operating ratio at which an operation efficiency of the second outdoor unit is maximum if the indoor temperature is within the target temperature range, and controlling indoor units which satisfy a condition that the operation efficiency of the second outdoor unit is increased among indoor units operating to satisfy the target temperature range if the operating ratio of the second outdoor unit is greater than the operating ratio at which the operation efficiency of the second outdoor unit is maximum.

Controlling the operations of the first indoor units includes determining whether it is possible that an indoor temperature of the first zone is within the target temperature range when the operating ratio of the outdoor unit is decreased if the operating ratio of the second outdoor unit is not greater than the operating ratio at which the operation efficiency of the second outdoor unit is maximum, and decreasing the operating ratio of the outdoor unit if it is possible that the indoor temperature of the first zone is within the target temperature range when the operating ratio of the outdoor unit is decreased.

Controlling the operations of the first indoor units includes controlling indoor units operating for satisfying the target temperature range based on the operating ratio of the second outdoor unit such that the operation efficiency of the second outdoor unit is maximum if it is impossible that the indoor temperature of the first zone is within the target temperature range when the operating ratio of the outdoor unit is decreased.

Controlling the operations of the first indoor units includes determining whether an operating ratio of a second outdoor unit connected to at least one fourth indoor unit installed at the first zone is less than a threshold operating ratio if the indoor temperature is not within the target temperature range, and adjusting control setting of indoor units operating to satisfy the target temperature range if the operating ratio of the second outdoor unit is not less than the threshold operating ratio.

Controlling the operations of the first indoor units further includes determining whether the operating ratio of the second outdoor unit is equal to a maximum operating ratio if the operating ratio of the second outdoor unit is less than a threshold operating ratio, determining whether the operating ratio of the second outdoor unit is greater than the operating ratio of the second outdoor unit in a case that the operation efficiency of the second outdoor unit is increased according to increase of the operating ratio of the second outdoor unit if the operating ratio of the second outdoor unit is unequal to the maximum operating ratio, and controlling indoor units which satisfies a condition that the operation efficiency of the second outdoor unit is increased among the indoor units operating for satisfying the target temperature range if the operating ratio of the second outdoor unit is not greater than the operating ratio of the second outdoor unit in the case that the operation efficiency of the second outdoor unit is increased according to the increase of the operating ratio of the second outdoor unit.

Controlling the operations of the first indoor units further includes outputting a message indicating that capacity of an air conditioner is insufficient if the operating ratio of the second outdoor unit is the maximum operating ratio.

An embodiment of the disclosure provides a server in an air conditioning system. The server includes a communication unit configured to transmit or receive a signal, and a controller connected to the communication unit, and configured to determine a target temperature range to be applied to a first zone as a zone of which air conditioning is to be controlled, to predict an indoor temperature for each of a plurality of zones included in a second zone in which the first zone is included, to predict efficiency of at least one first outdoor unit connected to first indoor units installed at the second zone, and to control operations of the first indoor units based on the target temperature range, the indoor temperature for each of the plurality of zones, and the efficiency of at least one first outdoor unit.

The controller is configured to control the operations of the first indoor units such that the efficiency of the at least one first outdoor unit is increased.

The efficiency of the at least one first outdoor unit includes operation efficiency of the at least one first outdoor unit and an operating ratio of the at least one first outdoor unit, the operation efficiency of the at least one first outdoor unit includes a ratio of consumed power amount of the at least one first outdoor unit to difference between first temperature change amount and second temperature change amount of second indoor units connected to the at least one first outdoor unit, the first temperature change amount includes indoor-temperature change amount of a third zone at which the second indoor units are installed if the second indoor units do not operate, and the second temperature change amount includes indoor-temperature change amount of the third zone if the second indoor units operate.

The efficiency of the at least one first outdoor unit includes operation efficiency of the at least one first outdoor unit and an operating ratio of the at least one first outdoor unit, the operation efficiency of the at least one first outdoor unit is determined based on a COP of the at least one first outdoor unit, and the COP of the at least one first outdoor unit includes a ratio of consumed power amount of the at least one first outdoor unit to cooling/heating energy generated by the at least one first outdoor unit.

The controller is configured to determine a PMV difference value as difference between preset PMV and actual thermal vote, determine new PMV based on the preset PMV and the PMV difference value, and determine a range of an indoor temperature at which the new PMV is within a preset range as the target temperature range.

The PMV difference value is determined by applying at least one of an indoor temperature, indoor humidity, a Met, a Clo, and an outdoor temperature which are applied to the first zone to the preset PMV.

The first zone is determined based on at least one of a location of at least one user device located at the second zone, a mobile pattern of the at least one user device, and a use schedule for the second zone.

The controller is configured to control the operations of the first indoor units such that a COP of the at least one first outdoor unit is increased.

The controller is configured to determine a PMV difference value as difference between preset PMV and actual thermal vote, determine new PMV based on the preset PMV and the PMV difference value, and determine a range of an indoor temperature at which the new PMV is within a preset range as the target temperature range.

The PMV difference value is determined by applying at least one of an indoor temperature, indoor humidity, a Met, a Clo, and an outdoor temperature which are applied to the first zone to the preset PMV.

The first zone is determined based on at least one of a location of at least one user device located at the second zone, a mobile pattern of the at least one user device, and a use schedule for the second zone.

The indoor temperature for each of the plurality of zones includes a first indoor temperature as an indoor temperature at second time after first time, the first indoor temperature for each of the plurality of zones is predicted by considering at least one of a first outdoor temperature, and a second indoor temperature and heat insulation information of each of the plurality of zones, a number of user devices within each of the plurality of zones, and a first set temperature, a first operation mode, a first fan speed, and a first fan direction of each of at least one third indoor unit located at each of the plurality of zones, and the first outdoor temperature includes an outdoor temperature from third time before the first time to the first time, the second indoor temperature includes an indoor temperature from the third time to the first time, the first set temperature includes a set temperature from the third time to the first time, the first operation mode includes an operation mode from the third time to the first time, the first fan speed includes a fan speed from the third time to the first time, and the first fan direction includes a fan direction from the third time to the first time.

The controller is configured to predict the indoor temperature for each of the plurality of zones based on first indoor-temperature change amount and second indoor-temperature change amount of each of the first indoor units, and the first indoor-temperature change amount of each of the first indoor units includes indoor-temperature change amount of a fourth zone at which each of the first indoor units is installed if each of the first indoor units does not operate, and the second indoor-temperature change amount of each of the first indoor units includes indoor-temperature change amount of the fourth zone if each of the first indoor units operates.

The controller is configured to determine a part of the first indoor units as indoor units to be used if air conditioning for the first zone is controlled, and the part of the first indoor units are adjacent to at least one fourth indoor unit installed at the first zone, and an indoor temperature of the first zone changes if the part of the first indoor units operates.

The controller is configured to initialize control setting of at least one fourth indoor unit installed at the first zone, predict an indoor temperature of the first zone based on the indoor temperature for each of the plurality of zones, determine whether operation efficiency of a second outdoor unit connected to the at least fourth indoor unit is increased if the indoor temperature of the first zone is within the target temperature range, and an operating ratio of the second outdoor unit is increased, determine whether the operating ratio of the second outdoor unit is greater than an operating ratio at which the operation efficiency of the second outdoor unit is maximum if operation efficiency of the second outdoor unit is increased when the operating ratio of the second outdoor unit is increased, and control indoor units which satisfy a condition that the operation efficiency of the second outdoor unit is increased among indoor units operating to satisfy the target temperature range of the first zone if the operating ratio of the second outdoor unit is not greater than the operating ratio at which the operation efficiency of the second outdoor unit is maximum.

The controller is configured to determine whether an operating ratio of a second outdoor unit connected to at least one fourth indoor unit installed at the first zone is greater than an operating ratio at which an operation efficiency of the second outdoor unit is maximum if the indoor temperature is within the target temperature range, and control indoor units which satisfy a condition that the operation efficiency of the second outdoor unit is increased among indoor units operating to satisfy the target temperature range if the operating ratio of the second outdoor unit is greater than the operating ratio at which the operation efficiency of the second outdoor unit is maximum.

The controller is configured to determine whether it is possible that an indoor temperature of the first zone is within the target temperature range when the operating ratio of the outdoor unit is decreased if the operating ratio of the second outdoor unit is not greater than the operating ratio at which the operation efficiency of the second outdoor unit is maximum, and decrease the operating ratio of the outdoor unit if it is possible that the indoor temperature of the first zone is within the target temperature range when the operating ratio of the outdoor unit is decreased.

The controller is configured to control indoor units operating for satisfying the target temperature range based on the operating ratio of the second outdoor unit such that the operation efficiency of the second outdoor unit is maximum if it is impossible that the indoor temperature of the first zone is within the target temperature range when the operating ratio of the outdoor unit is decreased.

The controller is configured to determine whether an operating ratio of a second outdoor unit connected to at least one fourth indoor unit installed at the first zone is less than a threshold operating ratio if the indoor temperature is not within the target temperature range, and adjust control setting of indoor units operating to satisfy the target temperature, range if the operating ratio of the second outdoor unit is not less than the threshold operating ratio.

The controller is further configured to determine whether the operating ratio of the second outdoor unit is equal to a maximum operating ratio if the operating ratio of the second outdoor unit is less than a threshold operating ratio, determine whether the operating ratio of the second outdoor unit is greater than the operating ratio of the second outdoor unit in a case that the operation efficiency of the second outdoor unit is increased according to increase of the operating ratio of the second outdoor unit if the operating ratio of the second outdoor unit is unequal to the maximum operating ratio, and control indoor units which satisfies a condition that the operation efficiency of the second outdoor unit is increased among the indoor units operating for satisfying the target temperature range if the operating ratio of the second outdoor unit is not greater than the operating ratio of the second outdoor unit in the case that the operation efficiency of the second outdoor unit is increased according to the increase of the operating ratio of the second outdoor unit.

The controller is further configured to output a message indicating that capacity of an air conditioner is insufficient if the operating ratio of the second outdoor unit is the maximum operating ratio.

Embodiments of the disclosure enable to control an air conditioner in an air conditioning system.

Embodiments of the disclosure enable to control an air conditioner by considering a target temperature range in an air conditioning system.

Embodiments of the disclosure enable to control an air conditioner by considering outdoor unit-efficiency in an air conditioning system.

Embodiments of the disclosure enable to control an air conditioner by considering neighbor zones in an air conditioning system.

Embodiments of the disclosure enable to control an air conditioner by considering a predicted temperature for one or more neighbor zones in an air conditioning system.

Embodiments of the disclosure enable to control an air conditioner by considering indoor unit-efficiency in an air conditioning system.

Embodiments of the disclosure enable to control an air conditioner thereby decreasing consumed power in an air conditioning system.

Embodiments of the disclosure enable to control an air conditioner thereby setting an air conditioning-control zone to providing comfort to a user within in the set air conditioning-control zone in an air conditioning system.

Embodiments of the disclosure enable to control an air conditioner by considering target temperature ranges for a plurality of zones in an air conditioning system.

Embodiments of the disclosure enable to control an air conditioner thereby setting an air conditioning-control zone at which one or more indoor units are installed and enhancing outdoor unit-efficiency and indoor unit-efficiency on the air conditioning-control zone basis in an air conditioning system.

Embodiments of the disclosure enable to control an air conditioner thereby guaranteeing comfort per user in an open zone in an air conditioning system.

Embodiments of the disclosure enable to control an air conditioner by setting an air conditioning-control zone based on at least one of a user's location, a user's mobile pattern, and a default zone-use schedule, and considering at least one of a target temperature range, a default zone-predicted temperature, outdoor unit-efficiency, and indoor unit-efficiency in an air conditioning system.

Certain aspects of the disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

It can be appreciated that a method and apparatus according to an embodiment of the disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the disclosure may be implemented by a computer or a mobile terminal that includes a controller and a memory, and the memory may be an example of a non-transitory machine-readable (e.g., computer-readable), storage medium suitable to store a program or programs including instructions for implementing embodiments of the disclosure.

The disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the disclosure may include their equivalents.

An apparatus according to an embodiment of the disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the disclosure has been shown and described with reference to embodiments thereof, it will be understood by those skilled in the art that various changes in form and details may be made therein without departing from the scope of the disclosure as defined by the appended claims and their equivalents.

What is claimed is:

1. A method of a server in an air conditioning system, comprising:
   determining a target temperature range to be applied to a first zone, the first zone being a zone for which air conditioning is to be controlled, the first zone being at least one zone of a plurality of zones including in a second zone;
   predicting an indoor temperature for each of the plurality of zones;
   predicting an operation efficiency of at least one first outdoor unit connected to first indoor units installed at the second zone; and
   controlling operations of the first indoor units based on the target temperature range, the indoor temperature for each of the plurality of zones, and the predicted operation efficiency of the at least one first outdoor unit,
   wherein the operation efficiency of the at least one first outdoor unit includes a ratio of consumed power of the at least one first outdoor unit to a difference between a first temperature change amount and a second temperature change amount of second indoor units connected to the at least one first outdoor unit,
   wherein the first temperature change amount includes an indoor-temperature change amount of a third zone at which the second indoor units are installed if the second indoor units do not operate, and wherein the second temperature change amount includes the indoor-temperature change amount of the third zone if the second indoor units operate.

2. The method of claim 1, wherein controlling operations of the first indoor units comprises controlling the operations of the first indoor units such that the operation efficiency of the at least one first outdoor unit is increased.

3. The method of claim 1, wherein the operation efficiency of the at least one first outdoor unit is changed according to an operating ratio of the at least one first outdoor unit.

4. The method of claim 1,
wherein the operation efficiency of the at least one first outdoor unit is further determined based on a coefficient of performance (COP) of the at least one first outdoor unit, and
wherein the COP of the at least one first outdoor unit includes a ratio of consumed power of the at least one first outdoor unit to cooling/heating energy generated by the at least one first outdoor unit.

5. The method of claim 1, wherein the indoor temperature for each of the plurality of zones includes a first indoor temperature as an indoor temperature at a second time after a first time,
wherein the first indoor temperature for each of the plurality of zones is predicted by considering at least one of a first outdoor temperature, and a second indoor temperature and heat insulation information of each of the plurality of zones, a number of user devices within each of the plurality of zones, a first set temperature, a first operation mode, a first fan speed, and a first fan direction of each of at least one third indoor unit located at each of the plurality of zones, and
wherein the first outdoor temperature includes an outdoor temperature from a third time before the first time to the first time, the second indoor temperature includes an indoor temperature from the third time to the first time, the first set temperature includes a set temperature from the third time to the first time, the first operation mode includes an operation mode from the third time to the first time, the first fan speed includes a fan speed from the third time to the first time, and the first fan direction includes a fan direction from the third time to the first time.

6. The method of claim 1, wherein predicting the indoor temperature for each of the plurality of zones included in the second zone in which the first zone is included comprises predicting the indoor temperature for each of the plurality of zones based on a first indoor-temperature change amount and a second indoor-temperature change amount of each of the first indoor units, and
wherein the first indoor-temperature change amount of each of the first indoor units includes indoor-temperature change amount of a fourth zone at which each of the first indoor units is installed if each of the first indoor units does not operate, and the second indoor-temperature change amount of each of the first indoor units includes indoor-temperature change amount of the fourth zone if each of the first indoor units operates.

7. The method of claim 1, wherein controlling the operations of the first indoor units comprises determining a part of the first indoor units as indoor units to be used if air conditioning for the first zone is controlled, and
wherein the part of the first indoor units are adjacent to at least one fourth indoor unit installed at the first zone, and an indoor temperature of the first zone changes if the part of the first indoor units operates.

8. The method of claim 1, wherein controlling the operations of the first indoor units comprises:
initializing a control setting of at least one fourth indoor unit installed at the first zone;
predicting an indoor temperature of the first zone based on the indoor temperature for each of the plurality of zones;
determining whether an operation efficiency of a second outdoor unit connected to the at least fourth indoor unit is increased if the indoor temperature of the first zone is within the target temperature range, and an operating ratio of the second outdoor unit is increased;
determining whether the operating ratio of the second outdoor unit is greater than an operating ratio at which the operation efficiency of the second outdoor unit is maximum if operation efficiency of the second outdoor unit is increased when the operating ratio of the second outdoor unit is increased; and
controlling indoor units which satisfy a condition that the operation efficiency of the second outdoor unit is increased among indoor units operating to satisfy the target temperature range of the first zone if the operating ratio of the second outdoor unit is not greater than the operating ratio at which the operation efficiency of the second outdoor unit is maximum.

9. The method of claim 1, wherein controlling the operations of the first indoor units comprises:
determining whether an operating ratio of a second outdoor unit connected to at least one fourth indoor unit installed at the first zone is greater than an operating ratio at which an operation efficiency of the second outdoor unit is maximum if the indoor temperature is within the target temperature range; and
controlling indoor units which satisfy a condition that the operation efficiency of the second outdoor unit is increased among indoor units operating to satisfy the target temperature range if the operating ratio of the second outdoor unit is greater than the operating ratio at which the operation efficiency of the second outdoor unit is maximum.

10. The method of claim 1, wherein controlling the operations of the first indoor units comprises:
determining whether an operating ratio of a second outdoor unit connected to at least one fourth indoor unit installed at the first zone is less than a threshold operating ratio if the indoor temperature is not within the target temperature range; and
adjusting control setting of indoor units operating to satisfy the target temperature range if the operating ratio of the second outdoor unit is not less than the threshold operating ratio.

11. A server in an air conditioning system, comprising:
a communication unit configured to transmit or receive a signal; and
a controller connected to the communication unit, and configured to;
determine a target temperature range to be applied to a first zone, the first zone being a zone for which air conditioning is to be controlled, the first zone being at least one zone of a plurality of zones included in a second zone,
predict an indoor temperature for each of the plurality of zones,
predict an operation efficiency of at least one first outdoor unit connected to first indoor units installed at the second zone, and control operations of the first indoor units based on the target temperature range, the indoor temperature for each of the plurality of zones, and the predicted operation efficiency of the at least one first outdoor unit, wherein the operation efficiency of the at least one first outdoor unit includes a ratio of consumed power of the at least one first outdoor unit to a difference between a first temperature change amount and a second temperature change amount of the second indoor units connected to the at least one first outdoor unit, wherein the first temperature change amount includes an indoor-temperature change amount of a third zone at which the second indoor units are installed if the second indoor units do not operate, and wherein the second temperature change amount includes the indoor-temperature change amount of the third zone if the second indoor units operate.

12. The server of claim 11, wherein the controller is further configured to control the operations of the first indoor units such that the operation efficiency of the at least one first outdoor unit is increased.

13. The server of claim 11, wherein the operation efficiency of the at least one first outdoor unit is changed according to an operating ratio of the at least one first outdoor unit.

14. The server of claim 11,
wherein the operation efficiency of the at least one first outdoor unit is further determined based on a coefficient of performance (COP) of the at least one first outdoor unit, and
wherein the COP of the at least one first outdoor unit includes a ratio of consumed power of the at least one first outdoor unit to cooling/heating energy generated by the at least one first outdoor unit.

15. The server of claim 11, wherein the indoor temperature for each of the plurality of zones includes a first indoor temperature as an indoor temperature at a second time after a first time,
wherein the first indoor temperature for each of the plurality of zones is predicted by considering at least one of a first outdoor temperature, and a second indoor temperature and heat insulation information of each of the plurality of zones, a number of user devices within each of the plurality of zones, and a first set temperature, a first operation mode, a first fan speed, and a first fan direction of each of at least one third indoor unit located at each of the plurality of zones, and
wherein the first outdoor temperature includes an outdoor temperature from a third time before the first time to the first time, the second indoor temperature includes an indoor temperature from the third time to the first time, the first set temperature includes a set temperature from the third time to the first time, the first operation mode includes an operation mode from the third time to the first time, the first fan speed includes a fan speed from the third time to the first time, and the first fan direction includes a fan direction from the third time to the first time.

16. The server of claim 11, wherein the controller is further configured to predict the indoor temperature for each of the plurality of zones based on a first indoor-temperature change amount and a second indoor-temperature change amount of each of the first indoor units, and
wherein the first indoor-temperature change amount of each of the first indoor units includes indoor-temperature change amount of a fourth zone at which each of the first indoor units is installed if each of the first indoor units does not operate, and the second indoor-temperature change amount of each of the first indoor units includes indoor-temperature change amount of the fourth zone if each of the first indoor units operates.

17. The server of claim 11, wherein the controller is further configured to determine a part of the first indoor units as indoor units to be used if air conditioning for the first zone is controlled, and
wherein the part of the first indoor units are adjacent to at least one fourth indoor unit installed at the first zone, and an indoor temperature of the first zone changes if the part of the first indoor units operates.

18. The server of claim 11, wherein the controller is further configured to:
initialize control setting of at least one fourth indoor unit installed at the first zone;
predict an indoor temperature of the first zone based on the indoor temperature for each of the plurality of zones;
determine whether an operation efficiency of a second outdoor unit connected to the at least fourth indoor unit is increased if the indoor temperature of the first zone is within the target temperature range, and an operating ratio of the second outdoor unit is increased;
determine whether the operating ratio of the second outdoor unit is greater than an operating ratio at which the operation efficiency of the second outdoor unit is maximum if operation efficiency of the second outdoor unit is increased when the operating ratio of the second outdoor unit is increased; and
control indoor units which satisfy a condition that the operation efficiency of the second outdoor unit is increased among indoor units operating to satisfy the target temperature range of the first zone if the operating ratio of the second outdoor unit is not greater than the operating ratio at which the operation efficiency of the second outdoor unit is maximum.

19. The server of claim 11, wherein the controller is further configured to:
determine whether an operating ratio of a second outdoor unit connected to at least one fourth indoor unit installed at the first zone is greater than an operating ratio at which an operation efficiency of the second outdoor unit is maximum if the indoor temperature is within the target temperature range; and
control indoor units which satisfy a condition that the operation efficiency of the second outdoor unit is increased among indoor units operating to satisfy the target temperature range if the operating ratio of the second outdoor unit is greater than the operating ratio at which the operation efficiency of the second outdoor unit is maximum.

20. The server of claim 11, wherein the controller is further configured to:
determine whether an operating ratio of a second outdoor unit connected to at least one fourth indoor unit installed at the first zone is less than a threshold operating ratio if the indoor temperature is not within the target temperature range; and
adjust control setting of indoor units operating to satisfy the target temperature range if the operating ratio of the second outdoor unit is not less than the threshold operating ratio.

* * * * *